(12) United States Patent  (10) Patent No.: US 8,255,092 B2
Phillips et al.  (45) Date of Patent: Aug. 28, 2012

(54) AUTONOMOUS BEHAVIORS FOR A REMOTE VEHICLE

(75) Inventors: Emilie Phillips, Brookline, NH (US); Pavlo E. Rudakevych, Arroyo Grande, CA (US); Orjeta Taka, Peabody, MA (US); James Gordon Wolfe, Jr., Cambridge, MA (US); Tom Frost, Cambridge, MA (US)

(73) Assignee: Irobot Corporation, Bedford, MA (US)

( * ) Notice: Subject to any disclaimer, the term of this patent is extended or adjusted under 35 U.S.C. 154(b) by 773 days.

(21) Appl. No.: 12/102,838

(22) Filed: Apr. 14, 2008

(65) Prior Publication Data

US 2009/0037033 A1  Feb. 5, 2009

Related U.S. Application Data

(63) Continuation-in-part of application No. 11/748,363, filed on May 14, 2007.

(51) Int. Cl.
*G05D 1/10* (2006.01)
(52) U.S. Cl. ............... 701/2; 701/23; 348/113
(58) Field of Classification Search ............... 701/2, 23, 701/24, 200; 348/113
See application file for complete search history.

(56) References Cited

U.S. PATENT DOCUMENTS

| | | | |
|---|---|---|---|
| 4,588,348 A | 5/1986 | Beni et al. |
| 4,730,684 A | 3/1988 | Pedersen |
| 4,977,971 A | 12/1990 | Crane, III et al. |
| 5,022,812 A | 6/1991 | Coughlan et al. |
| 5,063,846 A | 11/1991 | Willis et al. |
| 5,174,405 A | 12/1992 | Carra et al. |
| 5,179,843 A | 1/1993 | Cohausz |
| 5,337,846 A | 8/1994 | Ogaki et al. |
| 5,416,712 A | 5/1995 | Geier et al. |
| 5,443,354 A | 8/1995 | Stone et al. |
| 5,448,479 A | 9/1995 | Kemner et al. |
| 5,451,135 A | 9/1995 | Schempf et al. |
| 5,465,525 A | 11/1995 | Mifune et al. |
| 5,511,147 A | 4/1996 | Abdel-Malek |
| 5,652,849 A | 7/1997 | Conway et al. |
| 5,675,229 A | 10/1997 | Thorne |
| 5,860,479 A | 1/1999 | LaFollette |
| 5,940,927 A | 8/1999 | Haegermarck et al. |
| 5,959,423 A | 9/1999 | Nakanishi et al. |

(Continued)

FOREIGN PATENT DOCUMENTS

DE  3404202  5/1987

(Continued)

OTHER PUBLICATIONS

Search Report for PCT/US07/68890.

(Continued)

*Primary Examiner* — Helal A Algahaim
(74) *Attorney, Agent, or Firm* — O'Brien Jones, PLLC

(57) ABSTRACT

A system for allowing an operator to switch between remote vehicle tele-operation and one or more remote vehicle autonomous behaviors. The system comprises: an operator control unit receiving input from the operator including instructions for the remote vehicle to execute an autonomous behavior; a control system on the remote vehicle for receiving the instruction to execute an autonomous behavior from the operator control unit; and a GPS receiver, an inertial measurement unit, and a navigation CPU on the remote vehicle. Upon receiving the instruction to execute an autonomous behavior, the remote vehicle executes that autonomous behavior using input from the GPS receiver, the inertial measurement unit (IMU), and the navigation CPU.

8 Claims, 34 Drawing Sheets

U.S. PATENT DOCUMENTS

| | | | |
|---|---|---|---|
| 5,984,880 | A | 11/1999 | Lander et al. |
| 6,088,020 | A | 7/2000 | Mor |
| 6,108,031 | A | 8/2000 | King et al. |
| 6,115,655 | A | 9/2000 | Keith et al. |
| 6,122,572 | A | 9/2000 | Yavnai |
| 6,339,735 | B1 | 1/2002 | Peless et al. |
| 6,374,155 | B1 | 4/2002 | Wallach et al. |
| 6,463,368 | B1 * | 10/2002 | Feiten et al. ............ 701/23 |
| 6,493,613 | B2 | 12/2002 | Peless et al. |
| 6,496,755 | B2 | 12/2002 | Wallach et al. |
| 6,535,793 | B2 | 3/2003 | Allard |
| 6,580,979 | B2 | 6/2003 | Payton et al. |
| 6,611,738 | B2 | 8/2003 | Ruffner |
| 6,624,744 | B1 | 9/2003 | Wilson et al. |
| 6,658,325 | B2 | 12/2003 | Zweig |
| 6,675,068 | B1 | 1/2004 | Kawasaki |
| 6,681,151 | B1 | 1/2004 | Weinzimmer et al. |
| 6,690,134 | B1 | 2/2004 | Jones et al. |
| 6,746,304 | B1 | 6/2004 | Liu |
| 6,748,297 | B2 * | 6/2004 | Song et al. ............ 700/259 |
| 6,778,097 | B1 * | 8/2004 | Kajita et al. .......... 340/12.5 |
| 6,836,701 | B2 | 12/2004 | McKee |
| 6,845,297 | B2 | 1/2005 | Allard |
| 6,860,206 | B1 | 3/2005 | Rudakevych et al. |
| 6,925,357 | B2 | 8/2005 | Wang et al. |
| 6,957,712 | B2 * | 10/2005 | Song et al. ............ 180/167 |
| 7,024,278 | B2 | 4/2006 | Chiappetta et al. |
| 7,054,716 | B2 | 5/2006 | McKee et al. |
| 7,246,567 | B2 | 7/2007 | Shelton et al. |
| 7,515,991 | B2 * | 4/2009 | Egawa et al. ............ 700/245 |
| 7,653,800 | B2 | 1/2010 | Zohar et al. |
| 7,756,614 | B2 * | 7/2010 | Jouppi ............ 701/25 |
| 7,761,954 | B2 | 7/2010 | Ziegler et al. |
| 7,813,835 | B2 | 10/2010 | Fujita et al. |
| 2001/0020200 | A1 | 9/2001 | Das et al. |
| 2001/0025183 | A1 | 9/2001 | Shahidi |
| 2001/0037163 | A1 | 11/2001 | Allard |
| 2002/0153185 | A1 * | 10/2002 | Song et al. ............ 180/167 |
| 2003/0025472 | A1 | 2/2003 | Jones et al. |
| 2003/0216834 | A1 * | 11/2003 | Allard ............ 700/245 |
| 2004/0078946 | A1 | 4/2004 | Nakamoto et al. |
| 2004/0088081 | A1 * | 5/2004 | Song et al. ............ 700/259 |
| 2004/0111184 | A1 | 6/2004 | Chiappetta et al. |
| 2004/0216931 | A1 | 11/2004 | Won |
| 2005/0067994 | A1 | 3/2005 | Jones et al. |
| 2005/0192721 | A1 * | 9/2005 | Jouppi ............ 701/24 |
| 2005/0216182 | A1 | 9/2005 | Hussain et al. |
| 2006/0058920 | A1 | 3/2006 | Matsunaga et al. |
| 2006/0089765 | A1 | 4/2006 | Pack et al. |
| 2006/0089800 | A1 | 4/2006 | Svendsen et al. |
| 2006/0178820 | A1 | 8/2006 | Eglington et al. |
| 2007/0003915 | A1 | 1/2007 | Templeman |
| 2007/0071311 | A1 | 3/2007 | Rovira-Mas et al. |
| 2007/0072662 | A1 | 3/2007 | Templeman |
| 2007/0078901 | A1 | 4/2007 | Satou et al. |
| 2007/0149214 | A1 | 6/2007 | Walsh et al. |
| 2007/0198144 | A1 * | 8/2007 | Norris et al. ............ 701/23 |
| 2007/0198145 | A1 | 8/2007 | Norris et al. |
| 2007/0273557 | A1 | 11/2007 | Baillot |
| 2007/0294032 | A1 | 12/2007 | Zumsteg et al. |
| 2008/0172531 | A1 | 7/2008 | Liu et al. |
| 2009/0177844 | A1 | 7/2009 | Naylor et al. |
| 2009/0301522 | A1 * | 12/2009 | Abehasera et al. ............ 134/18 |
| 2010/0082193 | A1 * | 4/2010 | Chiappetta ............ 701/24 |

FOREIGN PATENT DOCUMENTS

| | | |
|---|---|---|
| EP | 0 433 697 A2 | 6/1991 |
| EP | 433697 A2 | 6/1991 |
| EP | 1 331 537 A1 | 7/2003 |
| EP | 1331537 A1 | 7/2003 |
| GB | 2128842 | 5/1984 |
| JP | 11149315 | 6/1999 |
| JP | 20094373 | 4/2000 |
| WO | WO 9740734 A1 | 11/1997 |
| WO | WO 9905580 A | 2/1999 |
| WO | WO 2007/050407 A1 | 5/2007 |

OTHER PUBLICATIONS

Written Opinion for PCT/US07/68890.

Green et al., Telepresence Surgery, 1995, IEEE pp. 324-329.

Ohashi et al., The Sensor Arm and the Sensor Glove II—Haptic Devices for VR Interface, IEEE/ASME International Conference on Advanced Intelligent Mechatronics, Sep. 19-23, 1999, Atlanta, USA.

P. Cheng, R. Harper, P. Lee, Generation Stack Collection and Profile Driven Pretenuring, PLDI.

Shimoga et al., Touch and Force Reflection for Telepresence Surgery, 1994, IEEE, pp, 1049-1050.

Nilsson, Shakey the Robot, SRI International, Techinical Note 323, Apr. 1984.

Yanco et al., Improving Human-Robot Interaction for Remote Robot Operation, University of Massachusetts Lowell, Computer Science Department, 2005.

Yanco et al., Blending Human and Robot Inputs for Sliding Scale Autonomy, University of Massachusetts Lowell, Computer Science Department, 2005.

O'Reilly, Behavior-Based Robot Design, Lecture #2, Sep. 8, 2005.

Brooks, New Approaches to Robotics, Science (253), Sep. 1991, pp, 1227-1232.

Brooks et al, Fast, Cheap and Out of Control: A Robot Invasion of the Solar System, Journal of the British Interplanetary Society, Oct. 1989, pp. 478-485.

Brooks, A Robust Layered Control System for a Mobile Robot, IEEE Journal of Robotics and Automation, vol. 2, No. 1, Mar. 1986, pp. 14-23.

Jones, Robot Programming: A Practical Guide to Behavior-Based Robotics, Chapter 4, 2004.

Brooks et al., Sensing and Manipulating Built-for-Human Environments, International Journal of Humanoid Robotics, vol. 1, #1, 2004.

Bongard et al., Research: Robotic Introspection: Self Modeling, Nov. 21, 2006.

Yamauchi, Brian. "All-Weather Perception for Small Autonomous UGVs". In Proceedings of SPIE Defense and Security Conference, Orlando, FL, Mar. 2008.

Lenser, Scott et al., "Practical problems in sliding scale autonomy: A case study". In Proceedings of SPIE Defense and Security Conference, Orlando, FL, Mar. 2008.

Cheung, Carol et al., "UAV-UGV Collaboration with a PackBot UGV and Raven SUAV for Pursuit and Tracking of a Dynamic Target". In Proceedings of SPIE Defense and Security Conference, Orlando, FL, Mar. 2008.

Schoenfeld, Erik et al., "Door Breaching Robotic Manipulator", In Proceedings of SPIE Defense and Security Conference, Orlando, FL, Mar. 2008.

Yamauchi, Brian, "Daredevil: Ultra Wideband Radar Sensing for Small UGVs", In Proceedings of SPIE: Unmanned Systems Technology IX, Orlando, FL, Apr. 2007.

Rudakevych, Pavlo et al., "Integration of the Fido Explosives Detector onto the PackBot EOD UGV", In Proceedings of SPIE vol. 6561, Mar. 2007.

Rudakevych, Pavlo et al., "A man portable hybrid UAV/UGV system", In Proceedings of SPIE vol. 6561, Mar. 2007.

Jones, Chris et al., "Sentinel: An Operator Interface for the Control of Multiple Semi-Autonomous UGVs". In Proceedings of the Association for Unmanned Vehicles Systems International. Orlando, FL, Aug. 2006.

Yamauchi, Brian, "Autonomous Urban Reconnaissance Using Man-Portable UGVs", In Proceedings of SPIE: Unmanned Ground Vehicle Technology VIII, Orlando, FL, Apr. 2006.

Yamauchi, Brian, "Wayfarer: An Autonomous Navigation Payload for the PackBot", In Proceedings of AUVSI Unmanned Vehicles North America 2005, Baltimore, MD, Jun. 2005.

Barnes, Mitch et al., "ThrowBot: Design Considerations for a Man-Portable Throwable Robot", In Proceedings of SPIE vol. 5804, Mar. 2005.

Rudakevych, Pavlo et al., "PackBot EOD Firing System", In Proceedings of SPIE vol. 5804, Mar. 2005.

Yamauchi, Brian. "The Wayfarer Modular Navigation Payload for Intelligent Robot Infrastructure", In Proceedings of SPIE vol. 5804: Unmanned Ground Technology VII, Orlando, FL, Mar. 2005.

Yamauchi, Brian et al., "Griffon: a man-portable hybrid UGV/UAV", In Industrial Robot: An International Journal, vol. 31 No. 5, 2004.

Yamauchi, Brian. "PackBot: A Versatile Platform for Military Robotics", In Proceedings of SPIE vol. 5422: Unmanned Ground Vehicle Technology VI, Orlando, FL, Apr. 2004.

Sword, Lee et al., "Mobility Enhancements for Ballistically Deployed Sensors", In Proceedings of SPIE vol. 4393, Apr. 2001.

Rudakevych, Pavlo. "Wave Control: A Method of Distributed Control for Repeated Unit Tentacles", In Proceedings of SPIE vol. 3839, Aug. 1999.

Rudakevych, Pavlo et al., "Micro Unattended Mobility System (MUMS)", In Proceedings of SPIE vol. 3713, Jul. 1998.

Search Report for PCT/US08/60286.

Written Opinion for PCT/US08/60286.

Office Action dated Mar. 19, 2009 from co-pending U.S. Appl. No. 11/748,363.

Office Action dated Oct. 16, 2009 from co-pending U.S. Appl. No. 11/748,363.

Office Action dated Apr. 7, 2010 from co-pending U.S. Appl. No. 11/748,363.

Office Action dated Oct. 1, 2010 from co-pending U.S. Appl. No. 11/748,363.

Office Action dated Mar. 19, 2009 from co-pending U.S. Appl. No. 11/826,486.

Office Action dated Nov. 4, 2009 from co-pending U.S. Appl. No. 11/826,486.

Wen J. T. et al., "Nonlinear model predictive control based on predicted state error convergence," Proceedings of the 2004 American Control Conference, vol. 3, Jun. 30, 2004.

European Search Report dated Jan. 24, 2011 from related Application No. PCT/US2008/060286.

Nilsson, "Shakey the Robot," SRI International, Technical Note 323, Apr. 1984.

Yanco et al., "Improving Human-Robot Interaction for Remote Robot Operation," University of Massachusetts Lowell, Computer Science Department, 2005.

Yanco et al., "Blending Human and Robot Inputs for Sliding Scale Autonomy," University of Massachusetts Lowell, Computer Science Department, 2005.

Brooks, "New Approaches to Robotics," Science (253), Sep. 1991, pp. 1227-1232.

Brooks et al., "Fast, Cheap and Out of Control: A Robot Invasion of the Solar System," Journal of the British Interplanetary Society, Oct. 1989, pp. 478-485.

Jones, "Robot Programming: A Practical Guide to Behavior-Based Robotics," Chapter 4, 2004.

Brooks et al., "Sensing and Manipulating Built-for-Human Environments," International Journal of Humanoid Robotics, vol. 1, #1, 2004.

Horswill, Northwestern University, CS C95 Behavior-Based Robotics, Lecture 0, Introduction, 1999.

Bongard, J. et al., "Robotic Introspection: Self-modeling," Cornell Computational Synthesis Laboratory. [retrieved on Dec. 31, 2009]. Retrieved from the internet: <URL: http://ccsl.mae.comell.edu/emergent_self_models>.

O'Reilly, U., "Behavior-based Robot Design an Introduction," Lecture 2, Sep. 8, 2005. [retrieved on Dec. 31, 2009]. Retrieved from the internet: <URL: http://web.cecs.pdx.edu/~mperkows/SUMMER/I/X011.%20Behavior%20based%20robots%20and%20architectures.ppt>.

Brooks, R., "A Robust Layered Control System for a Mobile Robot," Sep. 1985. Massachusetts Institute of Technology 1985. [retrieved on Dec. 31, 2009]. Retrieved from the internet: <URL: http://dspace.mit.edu/bitstream/handle/1721.1/6432/AIM-864.pdf?sequence=2>.

Petrick, E. N. et al., "The Use of the NATO Reference Mobility Model in Military Vehicle Procurement," International Congress and Exposition, Detroit, MI, Feb. 23-27, 1981.

\* cited by examiner

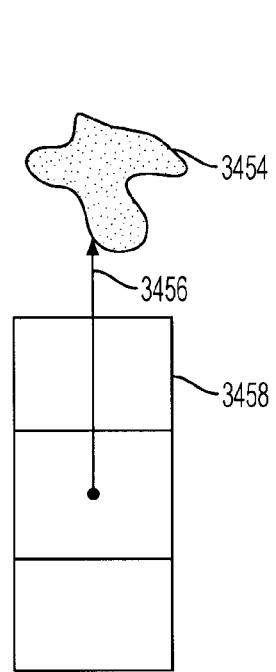
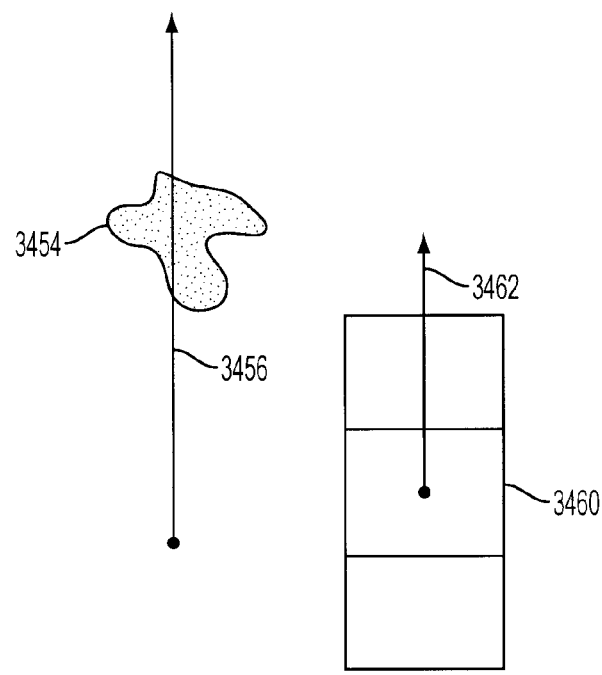
FIG. 34A  FIG. 34B
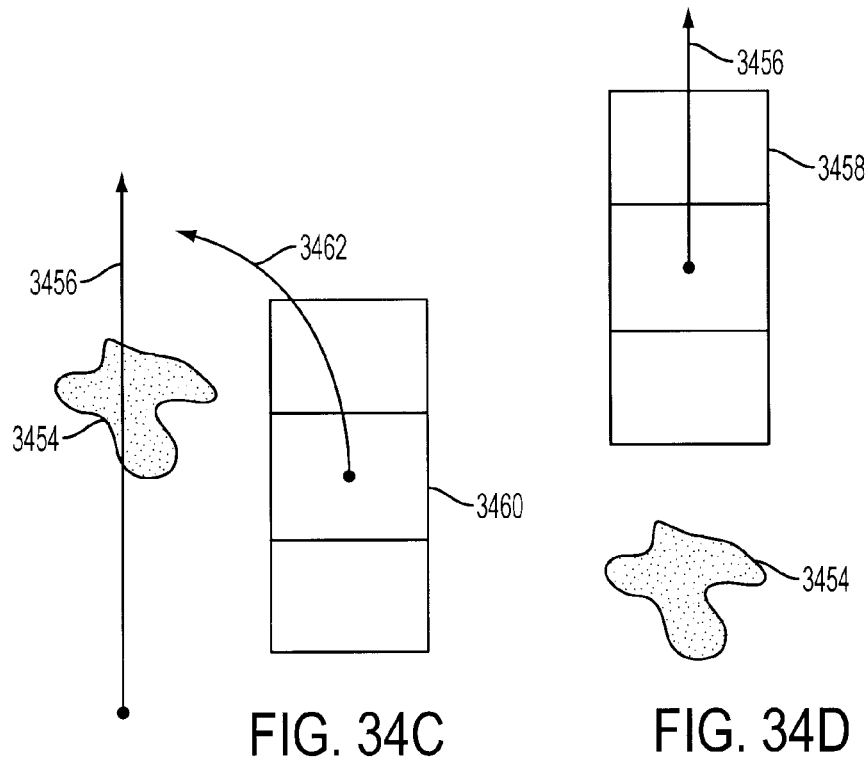
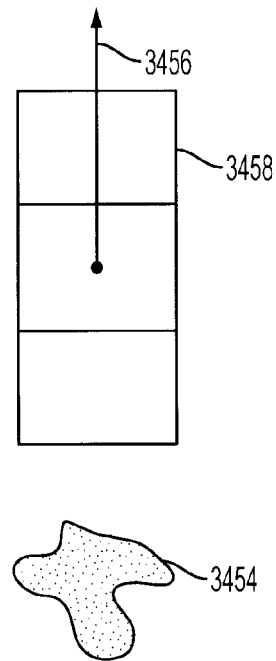
FIG. 34C  FIG. 34D

AUTONOMOUS BEHAVIORS FOR A REMOTE VEHICLE

This application is a continuation-in-part of U.S. patent application Ser. No. 11/748,363 entitled "Autonomous Behaviors for a Remote Vehicle," filed May 14, 2007.

FIELD OF THE INVENTION

The present invention relates to a method and device for simplifying control of a remote vehicle using autonomous behaviors.

BACKGROUND OF THE INVENTION

In typical remote vehicle operation, the operator controls the vehicle using a process known as tele-operation. Conventional remote vehicle tele-operation involves the use of operator control consoles, most commonly having joysticks, trackballs, mouse-type input devices, or some arrangement of physical switches and/or potentiometers and similar manual actuation input devices.

The electromechanical complexity of many remote vehicles has consequently made the manual control of such vehicles complex for human operators in a tele-operation process, requiring many function-specific knobs, joysticks and buttons to perform a task. A significant amount of operator training and experience can be required to develop sufficient manual dexterity and skill to be able to accurately navigate and control a remote vehicle.

It is therefore advantageous to provide a method and device that allow remote vehicles to accomplish certain behaviors autonomously, either continuously or upon user commands.

SUMMARY OF THE INVENTION

The present teachings provide system for allowing an operator to switch between remote vehicle tele-operation and one or more remote vehicle autonomous behaviors. The system comprises: an operator control unit receiving input from the operator including instructions for the remote vehicle to execute an autonomous behavior; a control system on the remote vehicle for receiving the instruction to execute an autonomous behavior from the operator control unit; and a GPS receiver, an inertial measurement unit, and a navigation CPU on the remote vehicle. Upon receiving the instruction to execute an autonomous behavior, the remote vehicle executes that autonomous behavior using input from the GPS receiver, the inertial measurement unit (IMU), and the navigation CPU.

The present teachings also provide a system for allowing an operator to switch between remote vehicle tele-operation and one or more remote vehicle autonomous behaviors. The system comprises: an operator control unit receiving input from the operator including instructions for the remote vehicle to execute an autonomous behavior; a control system on the remote vehicle for receiving the instruction to execute an autonomous behavior from the operator control unit; and a manipulator arm with a gripper and a camera for viewing gripper on the remote vehicle and in communication with the control system on the remote vehicle. Upon receiving the instruction to execute a click-to-grip autonomous behavior, the remote vehicle executes that autonomous behavior in a way that avoids collisions with its own frame using information received from the camera.

The present teachings further provide a system for implementing remote vehicle autonomous behaviors. The system comprises: an operator control unit receiving instructions for the remote vehicle to execute an autonomous behavior; a control system on the remote vehicle for one or more of executing a persistent autonomous behavior and receiving the instruction to execute an autonomous behavior from the operator control unit; and a stereo vision module on the remote vehicle and in communication with the control system on the remote vehicle. Upon receiving the instruction to execute an autonomous behavior, the remote vehicle executes that autonomous behavior using input from the stereo vision module. The autonomous behaviors include one of retro traverse and re-traverse.

BRIEF DESCRIPTION OF THE DRAWINGS

FIGS. 34A-34D illustrate an embodiment of an interaction between a cruise control behavior and an obstacle avoidance behavior.

DETAILED DESCRIPTION OF EMBODIMENTS OF THE INVENTION

In certain embodiments of the present teachings, autonomous behaviors are implemented with a operator control unit (OCU) that is an unobtrusive, highly mobile control system providing the user with a remote vehicle operating experience that seamlessly integrates with the user's other tasks and duties. The OCU allows the user to initiate autonomous behaviors for the remote vehicle, and to switch between teleoperation and such autonomous behaviors. Basic components of an exemplary OCU, illustrated in FIG. 1, include a display, an input device, a processor, an antenna/radio (for wireless communication), and software. In an embodiment of the invention, a head-mounted display provides video display from one or more remote vehicle cameras. A hand-held controller, preferably having a twin-grip design, includes controls to drive, manipulate, and monitor the robot and its payloads. Audio may additionally be provided via the hand-held controller, the display, or dedicated listening devices such as, for example, Bluetooth headsets commonly used with mobile phones. In an embodiment of the invention, a microphone is provided on the hand-held controller, the processor, the display, or separately from these components, and can be used with a speaker on the remote vehicle to broadcast messages. A button on the hand-held controller or a soft button within the GUI can be used to activate the speaker and microphone for broadcasting a message.

Figure 1:
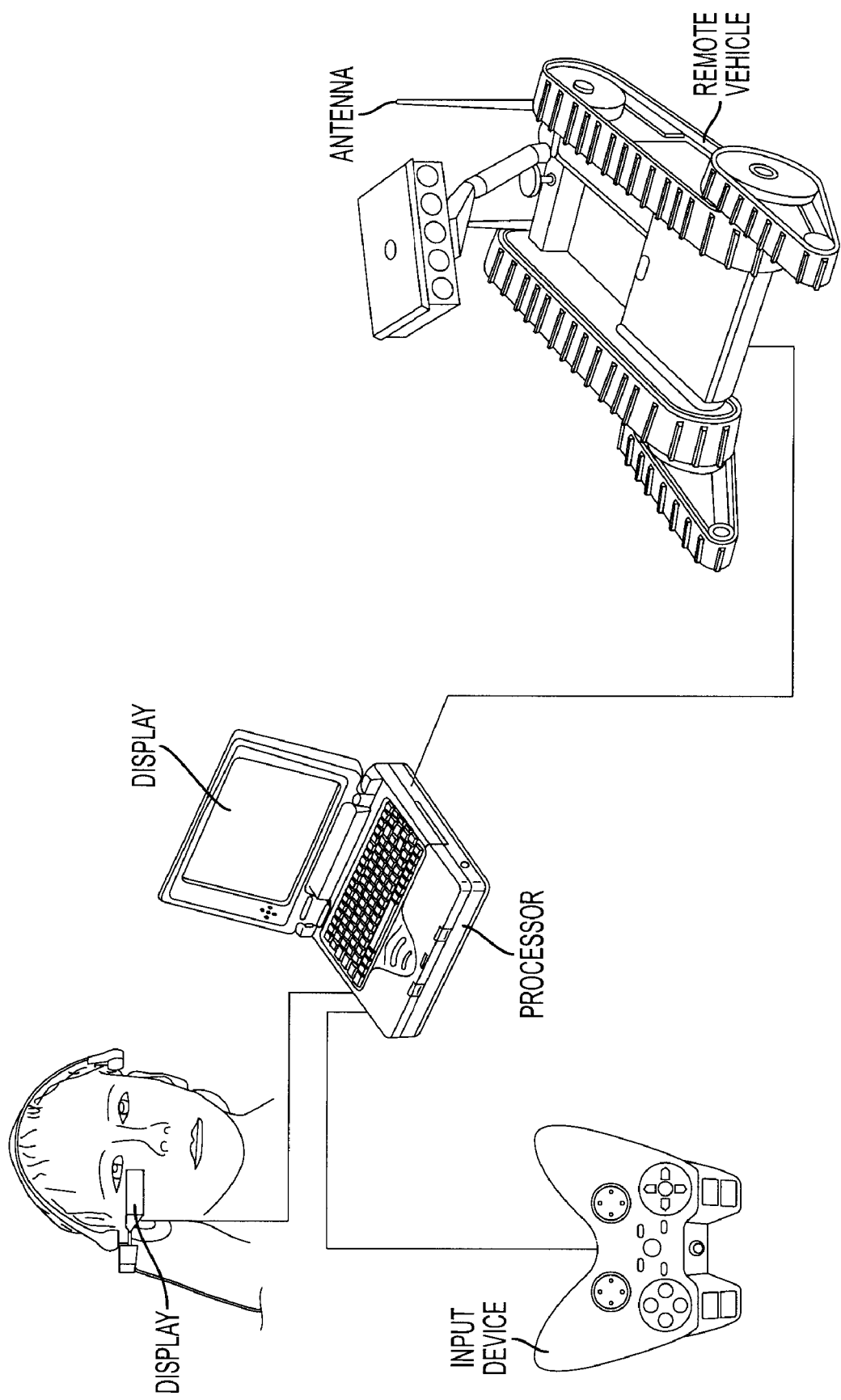
FIG. 1 illustrates a embodiment of a control system of the present invention and a remote vehicle.

The OCU illustrated in FIG. 1 includes a suitably powerful processor including, for example, a rugged laptop or a tablet PC. The processor communicates with the remote vehicle wirelessly or via a tether (e.g., a fiber optic cable). The processor additionally communicates with the hand-held controller and the display either wirelessly or using a tether.

The processor includes software capable of facilitating communication among the system elements and controlling the remote vehicle. In an embodiment of the invention, the software is a proprietary software and architecture, including a behavioral system and common OCU software, which provide a collection of software frameworks that are integrated to form a basis for robotics development. In certain embodiment of the present teachings, this software is built on a collection of base tools and the component framework, which provide a common foundation of domain-independent APIs and methods for creating interfaces, building encapsulated, reusable software components, process/module communications, execution monitoring, debugging, dynamic configuration and reconfiguration as well as operating system insulation and other low-level software foundations like instrument models, widget libraries, and networking code. In an embodiment of the invention, the processor performs all of the data processing for the control system.

In certain embodiments of the present teachings, the hand-held controller includes a button, toggle-type switch, or other similar mechanism for switching among button function modes. The button function modes can include, for example:

Drive Mode—the left joystick is used to steer the robot forward, back, left, and right, the left button array is used to control the attack camera (for a robot having, for example, a drive camera and an attack camera), the right joystick controls a spooler (for example containing fiber optic cable), the right button array controls a variety of functions such as the camera zoom, robot lights, robot speed, an camera choice (allows user to choose one or more cameras as, for example, primary and secondary), and the right shoulder is for flipper control.

Manipulate (Gripper) Mode—the left joystick is used to move the gripper forward, back, left, and right, the right joystick is used to move the gripper up and down and to fold or unfold the elbow, and the right shoulder buttons are used to rotate the gripper clockwise and counterclockwise.

Target (Attack Camera) Mode—The left joystick is used to move the attack camera forward, back, left, and right, and the right joystick is used to move the attack camera up and down.

Joint Mode—The left joystick folds and unfolds the gripper shoulder (e.g., using the top and bottom buttons), and rotates the turret clockwise and counterclockwise (e.g., using the right and left buttons). The right joystick folds and unfolds two gripper elbows. The left button array controls the attack camera, and the right button array controls a variety of functions such as the camera zoom, robot lights, robot speed, and camera choice. The right shoulder buttons are used to rotate the gripper clockwise and counterclockwise.

Menu (GUI Navigation) Mode—The left joystick navigates a cursor up, down, right, and left, the left button array moves the menu itself up, down, left, and right, and the right button array includes cancel and select functions.

Among the above exemplary button function modes, certain buttons may maintain the same functions, such as the top left button of the center button array being a pause/brake button, and the top right button of the center button array being a menu button. In addition, the button to change among the above functional modes may remain the same. In an embodiment of the invention, the left joystick is always used to drive the remote vehicle and the directional pad is always used to navigate soft buttons of a graphical user interface (GUI).

Figure 2:
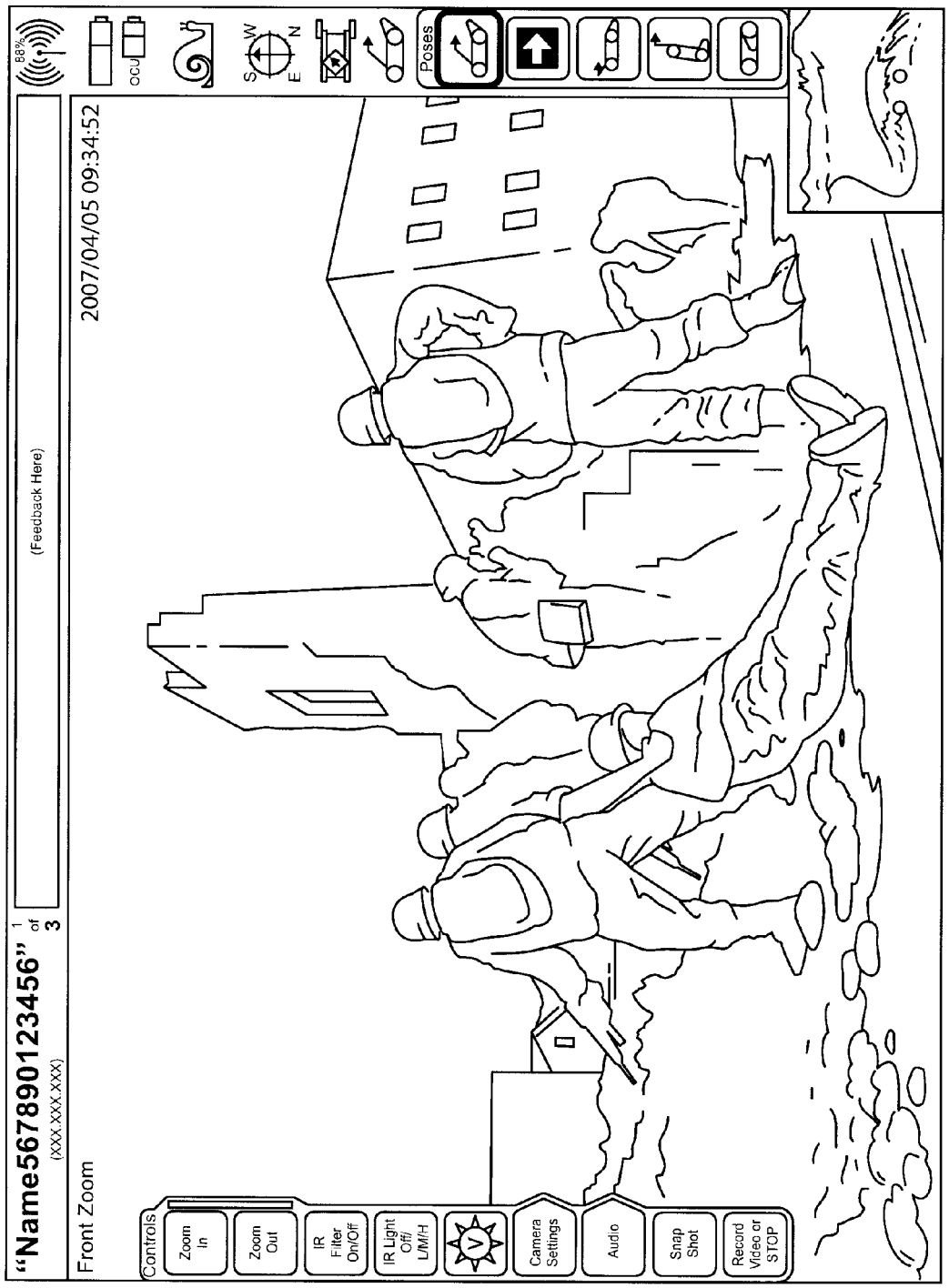
FIG. 2 is an embodiment of a user interface of the control system of the present invention.

In accordance with certain embodiments of the present teachings, a GUI facilitating simplified control of one or more remote vehicles is displayed to the operator on one or both of the processor display and/or the head-mounted display. FIG. 2 illustrates an exemplary embodiment of a displayed GUI. In this exemplary embodiment, the main image is a video stream from the robot's attack camera and the smaller image in the lower right corner is video stream from the robot's drive camera.

The status of the attack camera (e.g., front zoom) is displayed in the upper left corner, and certain camera control icons or soft buttons are presented under the camera status. In this embodiment, the icons include zoom in, zoom out, IR filter on/off, IR light off/low/medium/high, camera default position (designated in this embodiment as a V in a sun shape), camera setting choices, audio choices, snap shot, and video record on/off Upon choosing (by pressing the soft button or icon by manipulating the hand-held controller in the menu mode) camera settings and audio, the GUI pops up a screen to select among a variety of setting options. Above the status of the camera, the robot's name can be displayed (illustrated herein as "Name567890123456").

Additional icons or soft buttons can be displayed, for example on the right side of the GUI. The icons or soft buttons can include, from top to bottom, status of communication link (between the remote vehicle and the OCU), battery charge level (for the remote vehicle and the OCU), speed toggle (wherein the snail icon indicates that the remote vehicle is in a slow range of speed within the available scalable range of speed), robot heading, two icons indicating the robot's position and heading, and a variety of autonomous behavior options such as predefined poses.

In certain embodiments of the present teachings, the OCU has two states (on and off) and three modes: (1) training mode; (2) operation mode; and (3) maintenance mode. In various embodiments, most of the system functions, including the exemplary functions listed in the table below, are performed in all three modes.

| | |
|---|---|
| Power | On/off |
| | Status |
| Communicate | communicate with robot |
| | status of communications |
| | tethered and wireless communication |
| Control | drive/stop |
| | brake engage/release |
| | speed control |
| | flipper control |
| | head/neck control |
| | pose selection |
| | camera selection |
| | camera zoom |
| | camera control options including |
| | aperture/exposure/resolution/black and white/color/etc. |
| | microphone control on/off/speak |
| | speaker control on/off/volume |
| | request information/status/data |
| | illumination on/off/other |
| | select options |
| | select robot |
| | payload control |
| | map controls (autonomous robots or assistance) |
| | autonomy controls |
| Display | display video |
| | display health and status (system) |
| | display options |
| | GPS location/navigational information |
| Audio | Emit |
| | Send |
| | adjustment options |
| Process | process data/audio/video |

Remote vehicles can utilize a number of autonomous behaviors that can be implemented automatically or via the control system, such as via the GUI icons described above. Such behaviors, illustrated in FIG. 3, can be categorized as: (1) ballistic behaviors that autonomously execute once within a defined operating period; (2) semi-ballistic behaviors that execute once within a defined operating period and that operate autonomously while allowing for manual control during execution; or (3) persistent behaviors that execute continuously and autonomously while allowing the operator to manually control other behavior(s) of the remote vehicle. In certain embodiments of the present teachings, the autonomous behaviors may begin by either responding to sensor output and autonomously starting the behavior, responding to operator input via the depression of a key, soft key, or other actuator included the control system described above, or by responding to other behavior output.

An embodiment of the present invention provides the operator with varying levels of autonomy so that the operator may control the remote vehicle at times and choose to allow the remote vehicle to operate autonomously at times or concurrently.

Figure 3:
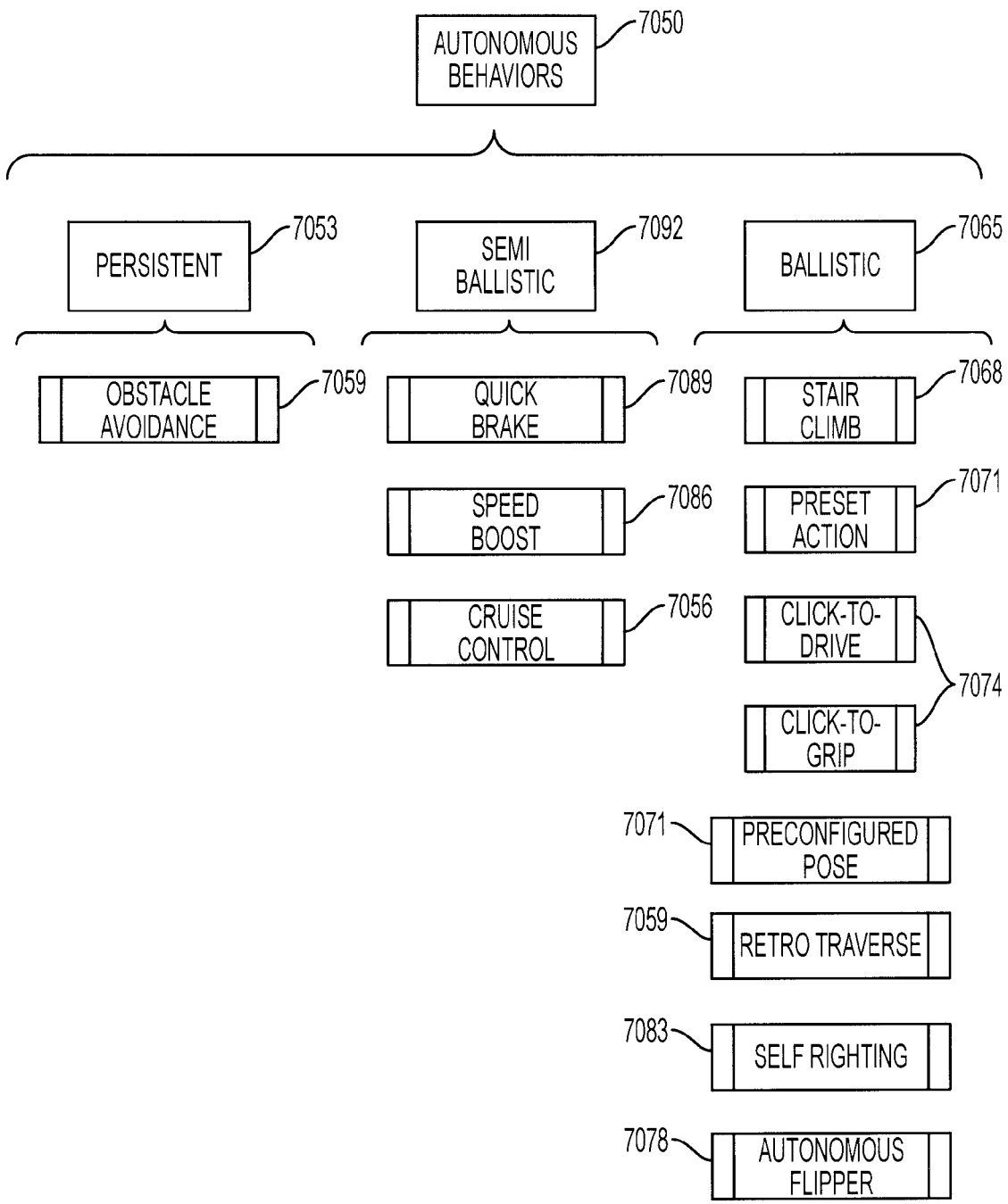
FIG. 3 is a block diagram illustrating an exemplary embodiment of autonomous behaviors.

FIG. 3 is a block diagram illustrating an exemplary embodiment of various autonomous behaviors. The main autonomous behavior 7050 identifies in memory three main subtypes of behaviors: ballistic behaviors 7065, semi-ballistic behaviors 7092 and persistent behaviors 7053. Ballistic behaviors 7065 comprise a particular behavior routine that executes for a finite period of time when the behavior is activated. Exemplary ballistic behaviors 7065 include: stair climbing 7068, preset action sequence 7071, click-to-drive or click-to-grip 7074, custom pose presets 7077, autonomous flipper routine 7078, retro traverse 7080, and self-righting 7083. Click-to grip, retro traverse, and self-righting behaviors are described in further detail below.

Figure 4:
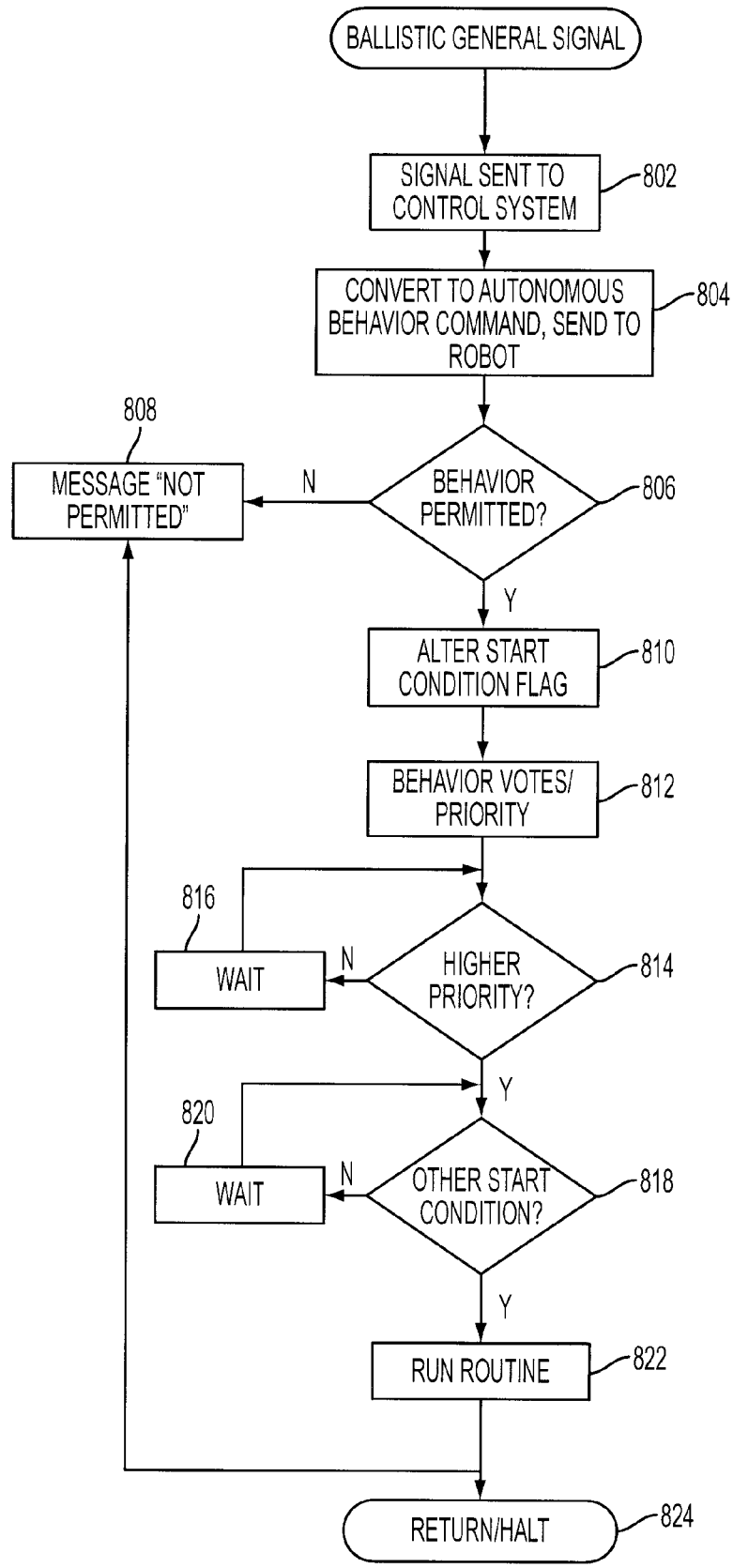
FIG. 4 is a flow diagram illustrating an activation routine used to activate a ballistic behavior and its associated routines.

FIG. 4 is a flow diagram illustrating an activation routine used to activate a ballistic behavior and its associated routines. To activate the behavior, the operator can select the behavior using the OCU, for example by pressing a button. The OCU then calculates a command 804 representative of the pressed button and sends the command to the remote vehicle. Once the command is received by the remote vehicle, the remote vehicle's control system 1155 (see FIG. 9) executes a routine to determine if the behavior is compatible 806 with the remote vehicle's current state. Determining compatibility can include evaluating all sensor data to determine whether or not the remote vehicle's position within its environment, the current internal state of the remote vehicle, the current operational behavior on the remote vehicle, and/or the remote vehicle's environment are incompatible with the chosen behavior. If the behavior is not okay to run (not permitted), the remote vehicle can generate feedback information 808 that is sent to the user, alerting the user to the behavior's incompatibility. The behavior activation routine is then exited 824.

If the behavior is compatible (permitted), the remote vehicle can change the start condition of the chosen behavior to a positive value 810, causing the behavior to turn on. Once turned on, the behavior sends a vote to the arbiter 812 requesting control of its associated actuators. If the behavior has a higher priority than the behavior currently in control of the actuators 814, the remote vehicle will gain control of the actuators and wait for a second start condition (explained further below). If the behavior doesn't have a higher priority than the behavior currently in control of the actuators 814, the behavior will wait 816, and send another vote 812 to the arbiter. The behavior will continue to do this until it gains control of the actuator. Should the behavior have control of the actuator, and its second start condition is true 818, then the software routines included within the behavior will execute 822. When finished executing, the routines will alter the behavior's start conditions to a false or stop status effectively halting the behavior 824.

If the remote vehicle's second start condition 818 is not true, the behavior will wait 820 until such a condition is true. A second start condition check 818 is included to accommodate those behaviors that may be in a perpetual start mode, but that are not activated until they receive particular sensor information. Alternatively, the second start condition check 818 could be used to activate routines within behaviors that are currently in an "on" state.

Also included within the autonomous behaviors 7050 are persistent behaviors 7053, which include behaviors that can be turned on and kept on via an always true first start condition. A persistent behavior is activated via a proper second start condition. Persistent behaviors 7053 start when the remote vehicle is powered up and can be stopped via an OCU command. An embodiment of the invention includes a persistent behavior set 7053 including an obstacle avoidance 7059 behavior. While shown as a semi-ballistic behavior in FIG. 3, cruise control can alternatively be a persistent behavior.

Figure 5:
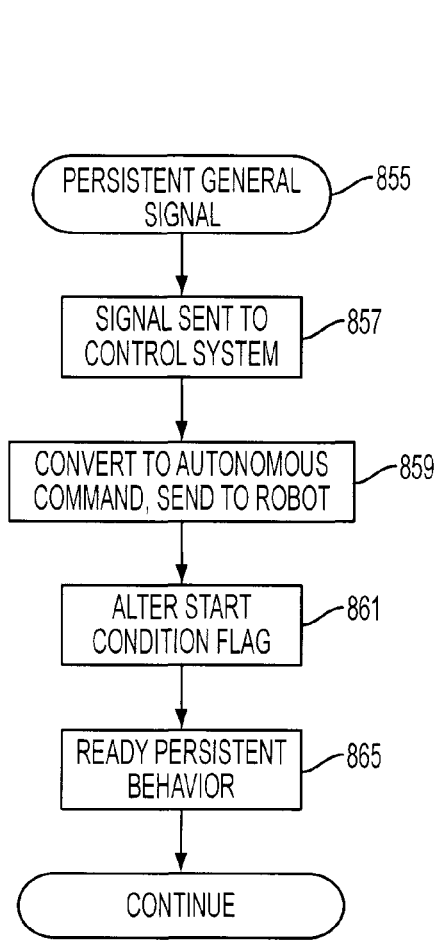
FIG. 5 is a flow chart illustrating a routine to activate or de-activate a persistent behavior.

FIG. 5 is a flow chart illustrating a routine to activate or de-activate a persistent behavior. To de-activate a currently activated persistent behavior, the operator actuates an OCU button, switch, etc. generating a signal that is used to calculate a representative command that is sent to the remote vehicle via a communication connection. Once the command is received by the remote vehicle, the remote vehicle's control system 1155 relays the command to the proper behavior, which causes the behavior's first start condition to be altered. When the command indicates that the persistent behavior should be turned on, the start condition will be changed to a positive or "on" condition. When the command indicates that the persistent behavior should be turned off, the start condition will be changed to a negative or "off" condition. Depending on whether the condition was made positive or negative, the persistent behavior will either start or stop 865. In an embodiment where persistent behaviors have an initial positive start condition, an operator will need to turn off the behaviors after the remote vehicle is powered up to keep the persistent behaviors from executing in response to system and sensor output.

Figure 6:
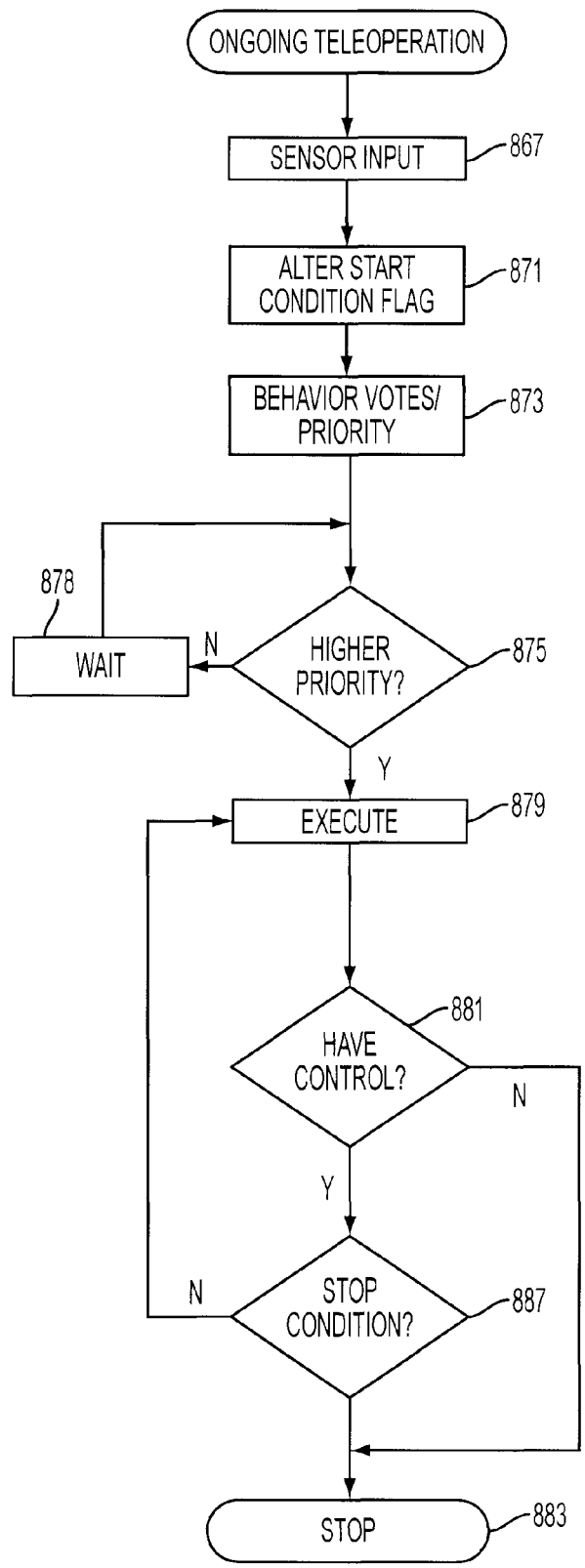
FIG. 6 illustrates the execution of routines within a persistent behavior.

FIG. 6 illustrates the execution of routines within a persistent behavior when the routines' second start condition is activated by system or sensor output. The flowchart in FIG. 6 assumes that the persistent behavior's first start condition is true, and has been true as a function of its "always on" characteristic. To initiate the execution of the persistent behavior, sensor or system output must be sent 867 to the persistent behavior by the remote vehicle's control system 1155. If such output is of the type that will cause the remote vehicle's second start condition to become positive, the persistent behavior's second start condition flag will be changed 871 to a positive or start value and the persistent behavior will begin to send votes 873 to the arbiter to gain control of the behavior's associated actuators and manipulators. If the behavior has a higher priority than the behavior currently in control of the actuators 873, then the behavior will gain control of the actuators.

If the behavior doesn't have a higher priority than the behavior currently in control of the actuators 875, then the behavior will wait 878, and send another vote 873 to the arbiter. The behavior will continue to do this until it gains control of the actuators or manipulators. Should the behavior have control of the actuator, the routine within the behavior will execute 879. The routine will continue to execute until it loses control over the actuators 885, in which case one of the first or second start condition flag is changed to a negative or stop value 887 which causes the behavior to stop 883. If the first start condition flag changes to a negative or stop value, the behavior is disabled. In an embodiment of the invention, the behavior can thereafter be restarted using the routine displayed in FIG. 5. If the second start condition flag is changed to a negative or stop value, the behavior will stop until it detects sensor or system output that causes the behavior to start again.

The above description of ballistic, semi-ballistic and persistent behaviors is exemplary. The present invention contemplates implementing other versions of the behaviors. For example, steps 879 through 887 of FIG. 6 may be substituted into the ballistic and semi-ballistic routines for steps 848 and/or 822.

Robot Structure

Figure 7A:
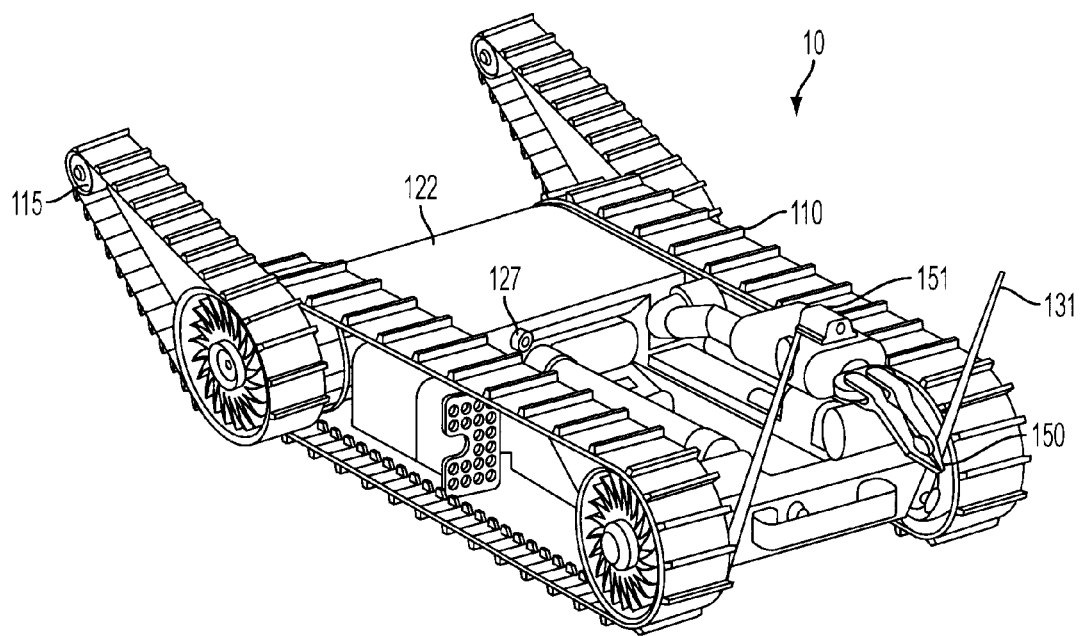
FIGS. 7A and 7B illustrate an embodiment of a remote vehicle of the present invention.
Figure 7B:
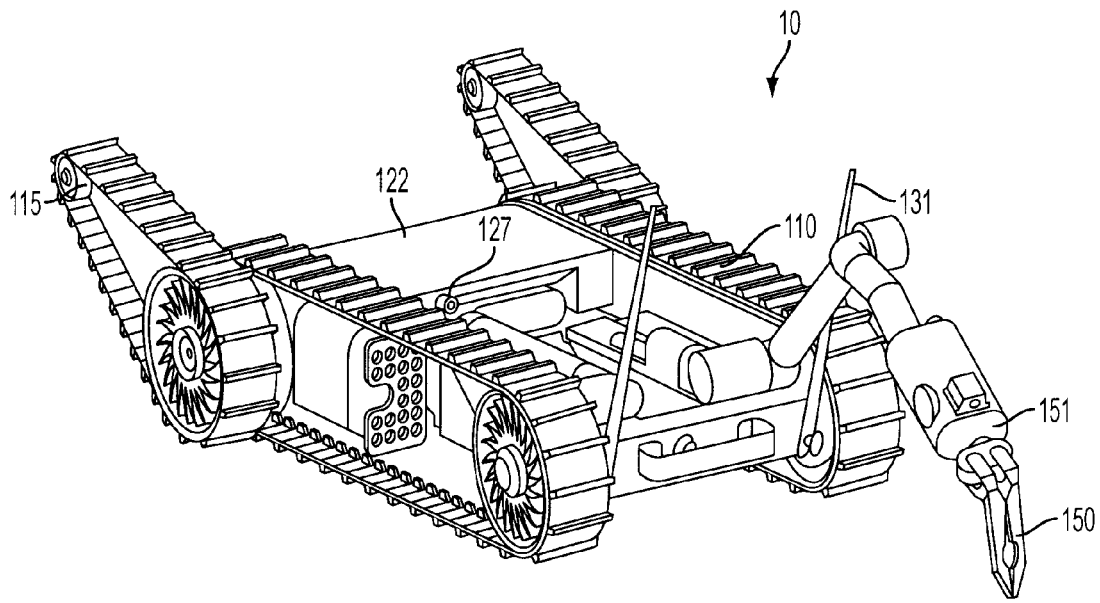

FIGS. 7A and 7B illustrate an embodiment of a remote vehicle of the present invention. A mobile robot 10 has a head 122 that includes a drive camera 127 mounted thereon to provide visual information regarding the environment of the mobile robot 10, an electro-optic infrared (EO/IR) module 4165 which uses LIDAR to map the environment and detect possible obstacles, main drive treads 110 for propelling and steering the mobile robot 10, and robot-mounted antennae 131 for communicating with an operator via the control system. The mobile robot 10 also includes rotatably extensible, treaded flippers 115 that can be deployed to augment traction and to overcome obstacles, and a robotic gripper 150 for grasping or manipulating objects in the mobile robot's environment. The mobile robot 10 further includes an attack camera 151 to aid in navigation of the mobile robot and the robotic gripper 150.

Figure 8:
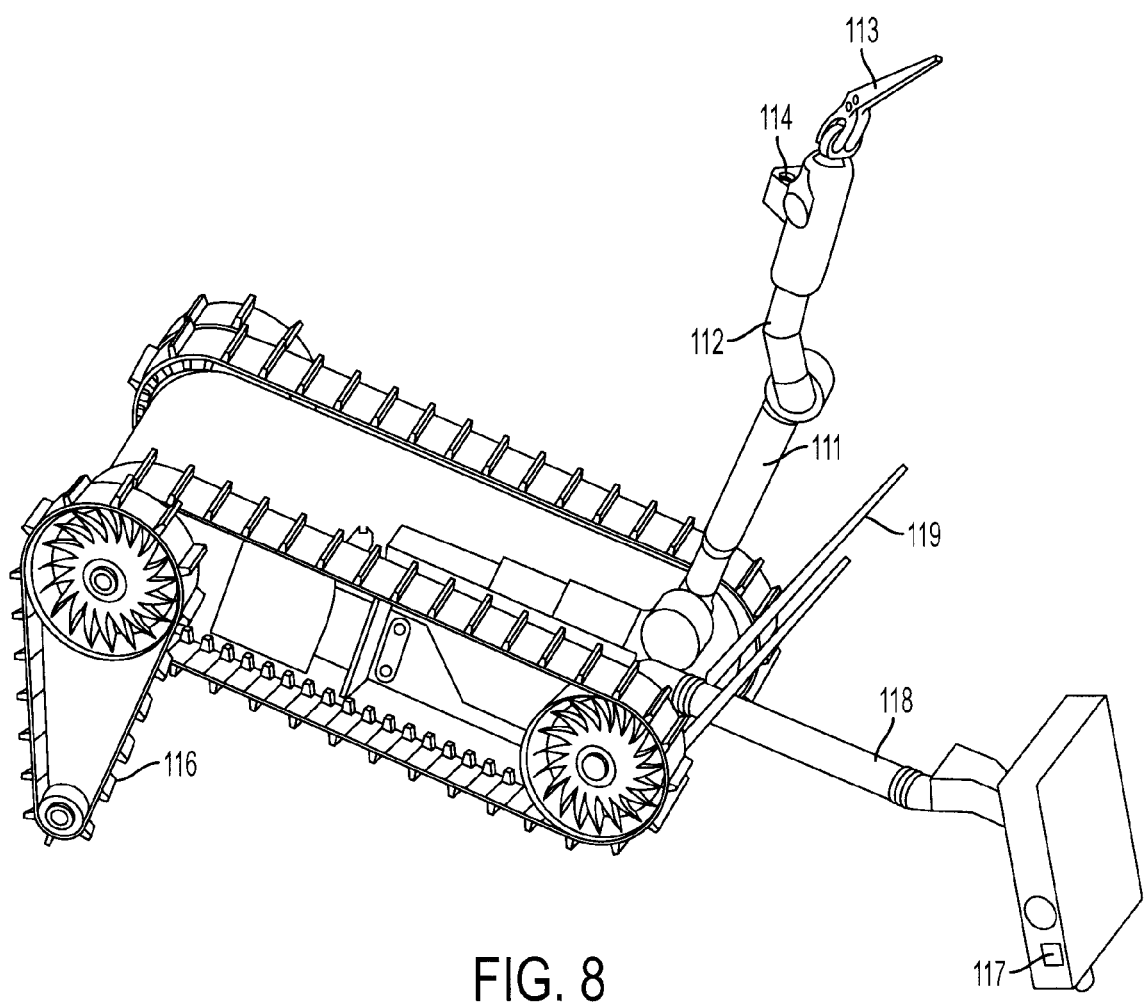
FIG. 8 illustrates a mobile robot for use with an embodiment of the present invention.

FIG. 8 illustrates a mobile robot with both its robotic gripper 113 and attached upper arm 112 and lower arm 111 extended. Further shown is the extension of an arm 118 connected to the head 117, and the extension of the head 117 from the arm 118. Also shown is the advantage of having an attack camera 114 attached to the gripper's upper arm 112. The attack camera 114 is able to display the gripper's position within its environment in relation to the position of the gripper's upper arm 112. Using this information, the user can adjust the upper arm 112 to reposition the gripper 113 in its environment. Further shown is an extended flipper 116 which shifts the mobile robot's center of gravity.

Figure 9:
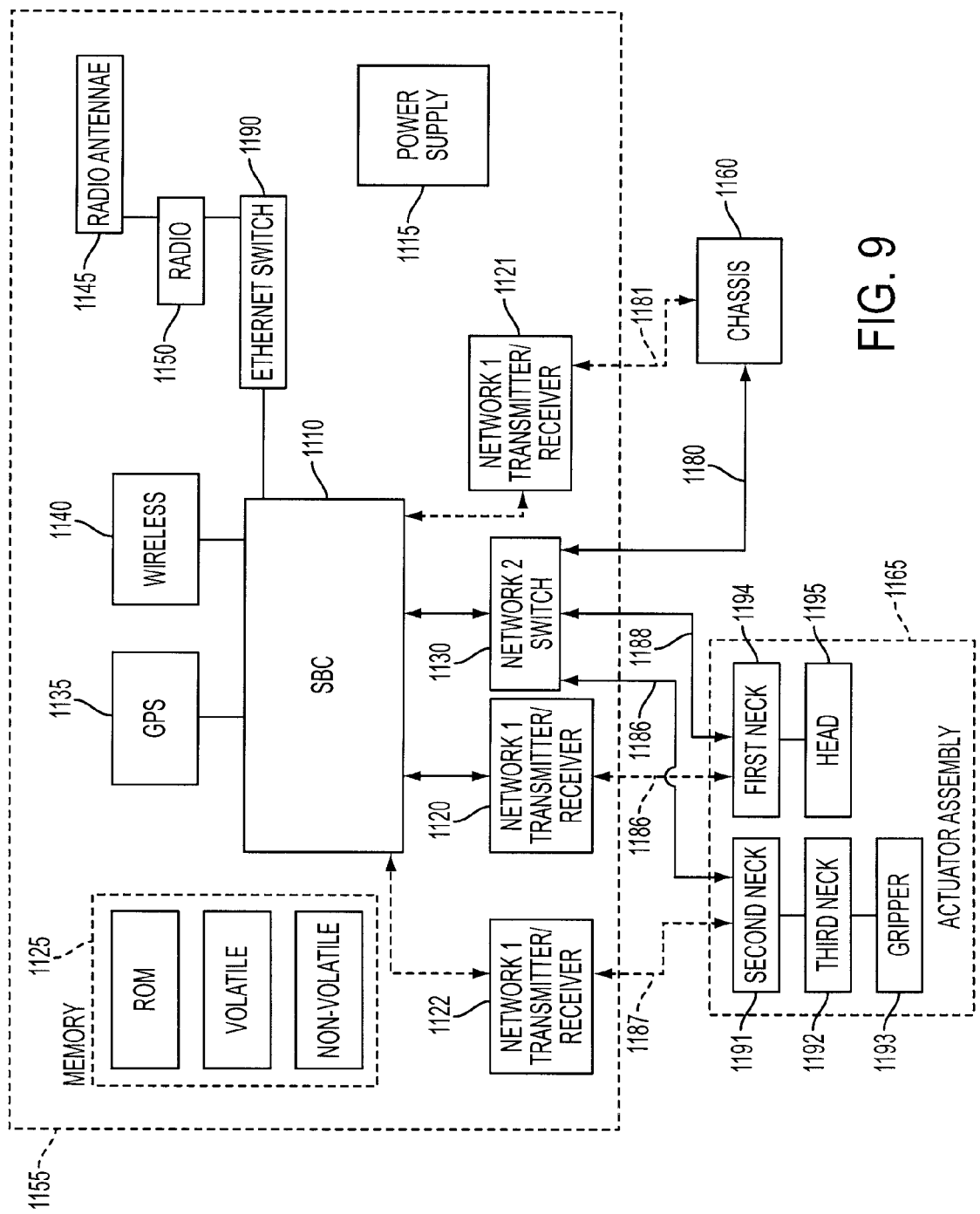
FIG. 9 is a block diagram depicting an embodiment of a mobile robot control system.

FIG. 9 is a block diagram depicting an exemplary implementation of a mobile robot control system. Included in the control system 1155 is a single board computer (SBC) 1110. A microprocessor can be used in lieu of the single board computer 1110. Connected to the SBC 1110 is a global positioning system (GPS) module 1135, a radio module 1150, and a wireless Ethernet transmitter and receiver 1140. A radio module 1150 is connected to the SBC 1110 via an Ethernet switch 1190, and is further connected to a radio antenna 1145. The user can control the control system 1155 using a radio communicating over a secure connection created by the radio module 1150 and the radio antenna 1145.

Further included in the control system 1155 is a power supply 1115 and memory 1125 including any combination of ROM, volatile, and non-volatile memory. Also connected to the SBC are network 1 transmitter and receivers 1120, 1121, 1122 and a network 2 switch 1130. The network 1 transmitter and receivers 1120, 1121, 1122 provide communication between the control system 1155 and an actuator assembly 1165 via a first connection wire 1187 installed between the first network 1 transmitter and receiver 1122 and second neck 1191 and a second connection wire 1186 installed between the second network 1 transmitter and receiver 1120 and first neck 1194. The network 1 transmitter and receivers 1120, 1121, 1122 also provide communication between the control system 1155 and the chassis 1160 via a third connection wire 1181 installed between the third network 1 transmitter and receiver 1121 and the chassis 1160. The network 2 switch 1130, on the other hand, provides communication between the network 2 switch 1130 and each of the chassis 1160, the first neck 1194, and the second neck 1191 via a first connection link 1180, a second connection link 1188, and a third connection link 1180, between the chassis 1160, first neck 1194, and second neck 1191, and the network 2 switch 1130.

Connected to the control system 1155 is a chassis assembly 1160 as well as an actuator assembly 1165. In the illustrated implementation, the actuators included in the actuator assembly 1165 are a first neck 1194 connected to a head module 1195, and a second neck 1191 connected to a third neck 1192 which is further connected to a gripper module 1193. Each of the necks 1194, 1191, 1192, can include a substantially similar hardware circuit and software routine architecture 4301.

The actuator modules within the actuator assembly 1165 are connected to the control system 1155 via connection wires 1187, 1186, and connection links 1189, 1188. The chassis 1160 is connected to the control system 1155 via a connection wire 1181, and a connection link 1180.

Figure 10:
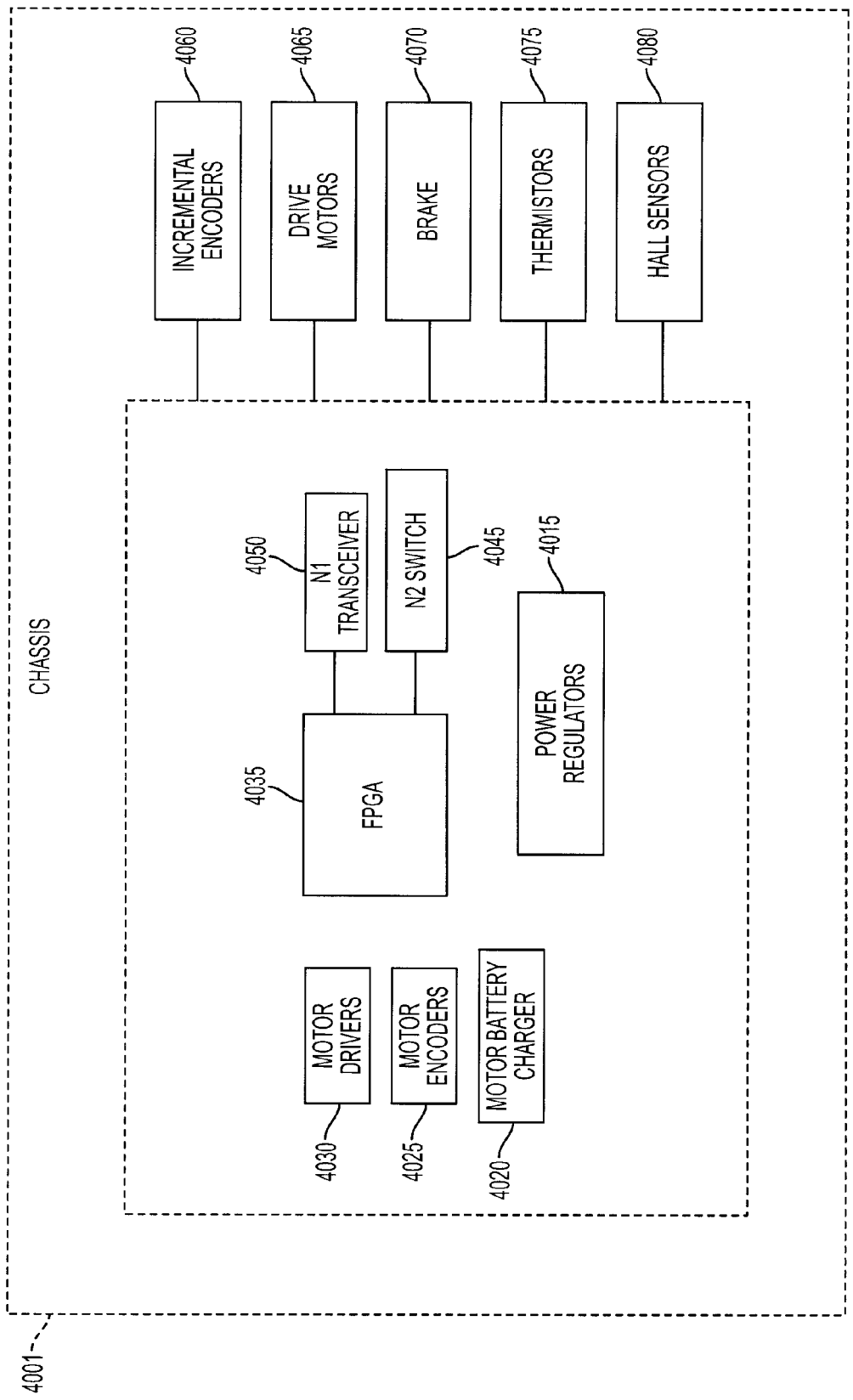
FIG. 10 illustrates an embodiment of a chassis assembly.

An exemplary implementation of a chassis assembly 1160 is described in the block diagram shown in FIG. 10. Included within the chassis 4001 base circuit 4055 is an FPGA 4035 connected to a network 1 transmitter and receiver 4050, and a network 2 switch 4045. Further included within the base circuit 4055 are power regulators 4015 including circuits configured to manage power within the chassis 4001. Additionally, included in the base circuit 4055 for motion control are motor drivers 4030, motor encoders 4025, and a motor battery charger 4020. The chassis 4001 also includes a number of motion control components connected to the base circuit 4055, including incremental encoders 4060, drive motors 4065, a brake 4070, thermistors 4075, and hall sensors 4080.

Figure 11:
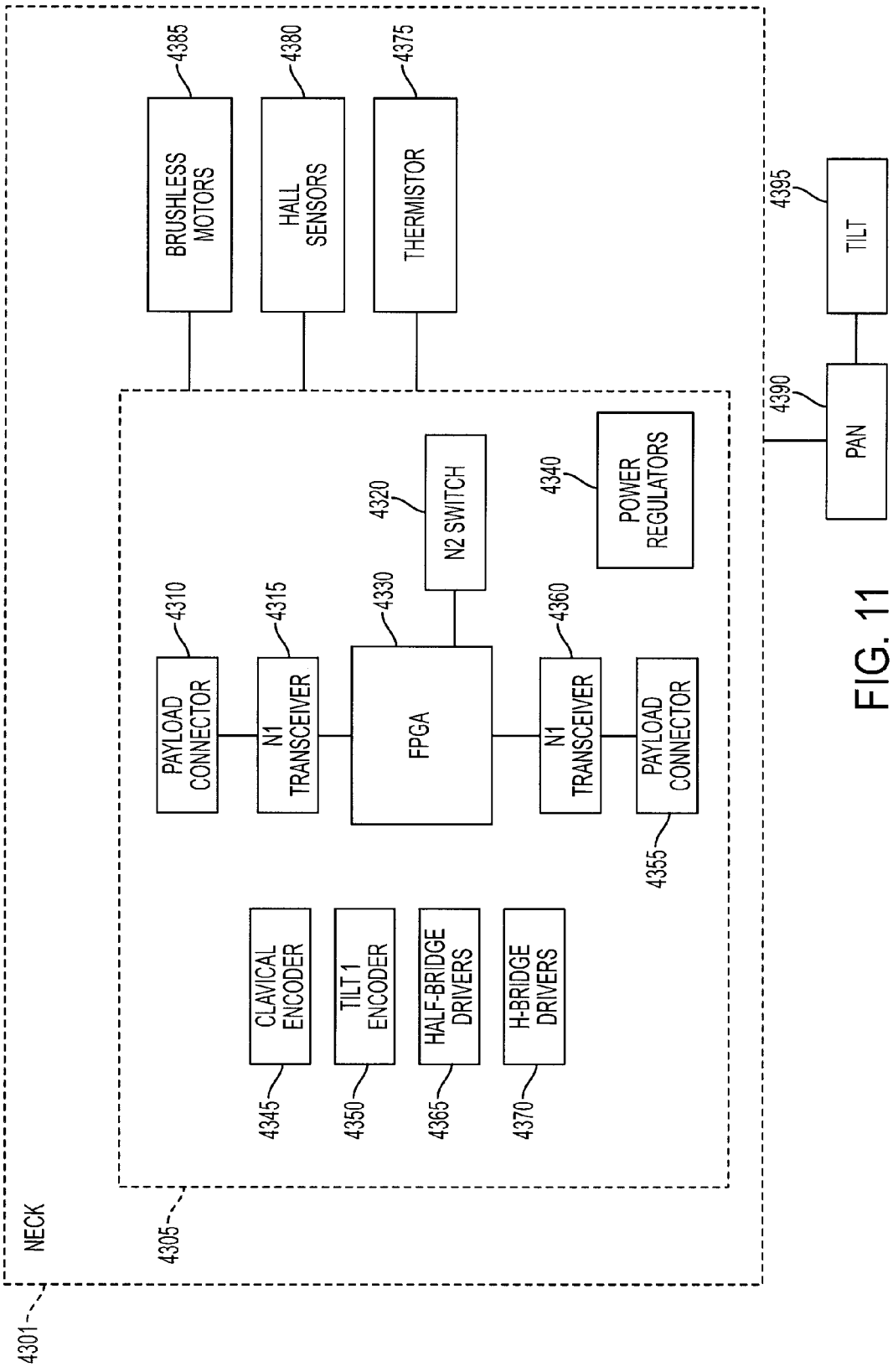
FIG. 11 illustrates an embodiment of a neck module.

A block diagram of an exemplary implementation of a neck module 4301 is shown in FIG. 11. The neck module 4301 includes a base circuit 4305 having an FPGA 4330 connected to a first network 1 transmitter and receiver 4315, a second network 1 transmitter and receiver 4360, and a network 2 switch 4320. Included within the base circuit 4305 are power regulators 4340 that are circuits configured to regulate power within the neck module. The first and second network 1 transmitter and receivers 4315, 4360 are connected to a payload connector 4310, 4355. The payload connectors 4310, 4355 are plugs configured to mate with a corresponding plug on a payload such as an additional neck module 1191, 1192, a head module 1195, or a gripper module 1193. Further included within the base circuit 4305, to aid in motion control, are a clavical encoder 4345, a tilt 1 encoder 4350, half-bridge drivers 4365, and h-bridge drivers 4370. Additional motion control components included within the neck module 4301 and connected to the base circuit 4305 are brushless motors 4385, hall sensors 4380, and a thermistor 4375.

The neck module 4301 is also connected to a pan module 4390 and a tilt module 4395. The pan module 4390 allows the user to pan the distal portion of the neck about the neck's pivot point, while the tilt module 4395 allows the user to tilt the distal portion of the neck about the neck's pivot point. A slip ring and magnet assembly for the connections between the pan module 4390 and the neck module 4301, between the pan module 4390 and the tilt module 4395, and between the tilt module 4395 and a further connection.

Figure 12:
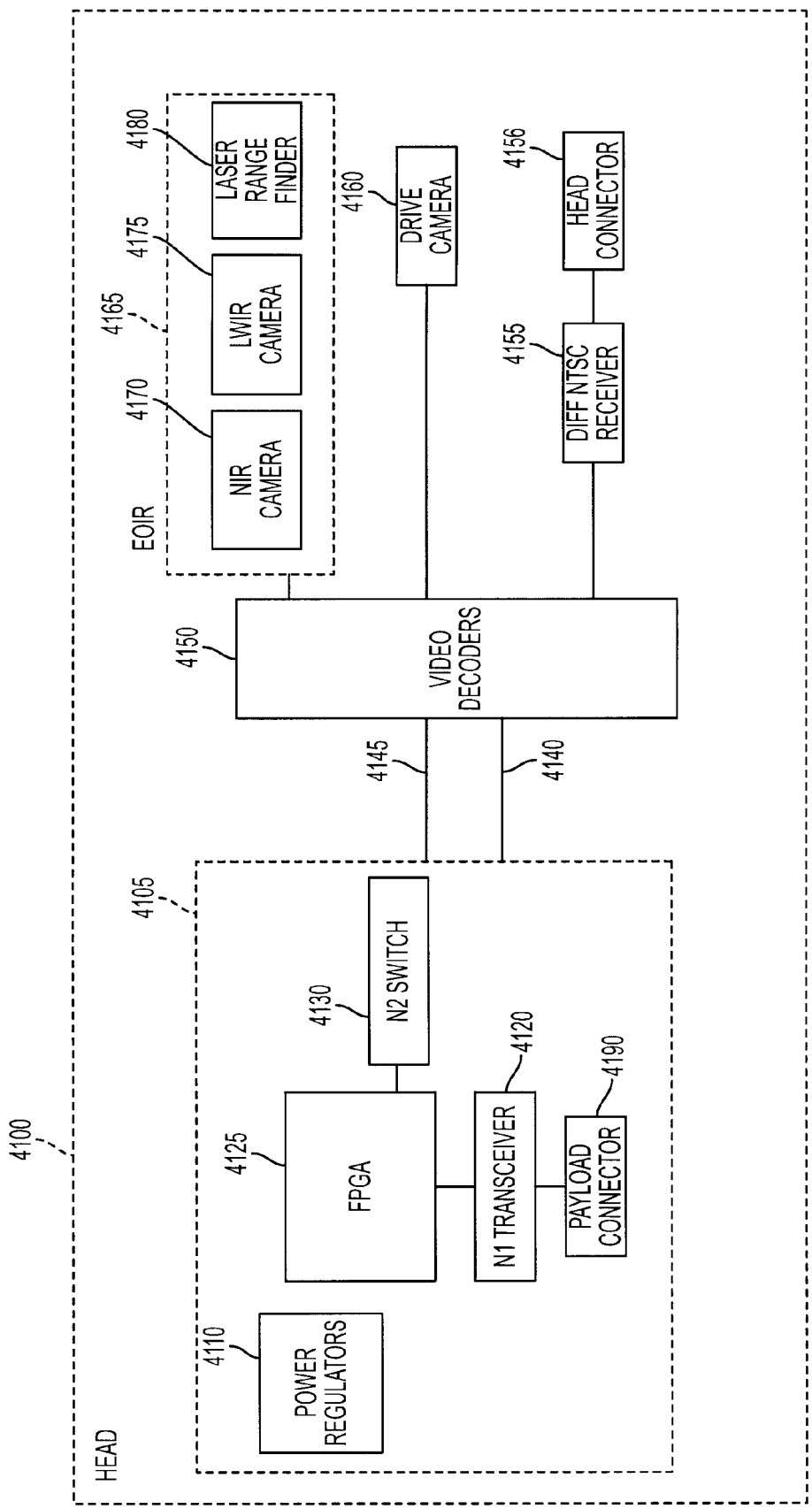
FIG. 12 illustrates an embodiment of a head module.

A block diagram of an exemplary implementation of a head module 4100 is shown in FIG. 12, and includes a base circuit 4105 with a centrally located FPGA 4125. Connected to the FPGA 4125 are a network 2 switch 4130, and a network 1 transmitter and receiver 4120 which is further connected to a payload connector 4190. The payload connector 4190 is a plug configured to mate with a corresponding plug on a neck module 4301 such as neck module 1 1194. Included in the base circuit 4105 are power regulators 4110 that are circuits configured to manage power within the head module 4100. The base circuit 4105 is connected to a set of video decoders 4150 via a CCIR-656 video communication bus 4145 and a serial bus 4140. Input to the video decoders 4150 includes: (1) the output from a drive camera 4160; (2) the output from a differential NTSC receiver 4155 which is further connected to the head module connector 4156; and (3) the output from the electro-optic infrared (EOIR) module 4165. Output from the EOIR module 4165 includes a near infrared (NIR) 4170 camera, a long wave infrared (LWIR) 4175 camera, and a laser range finder 4180.

Figure 13:
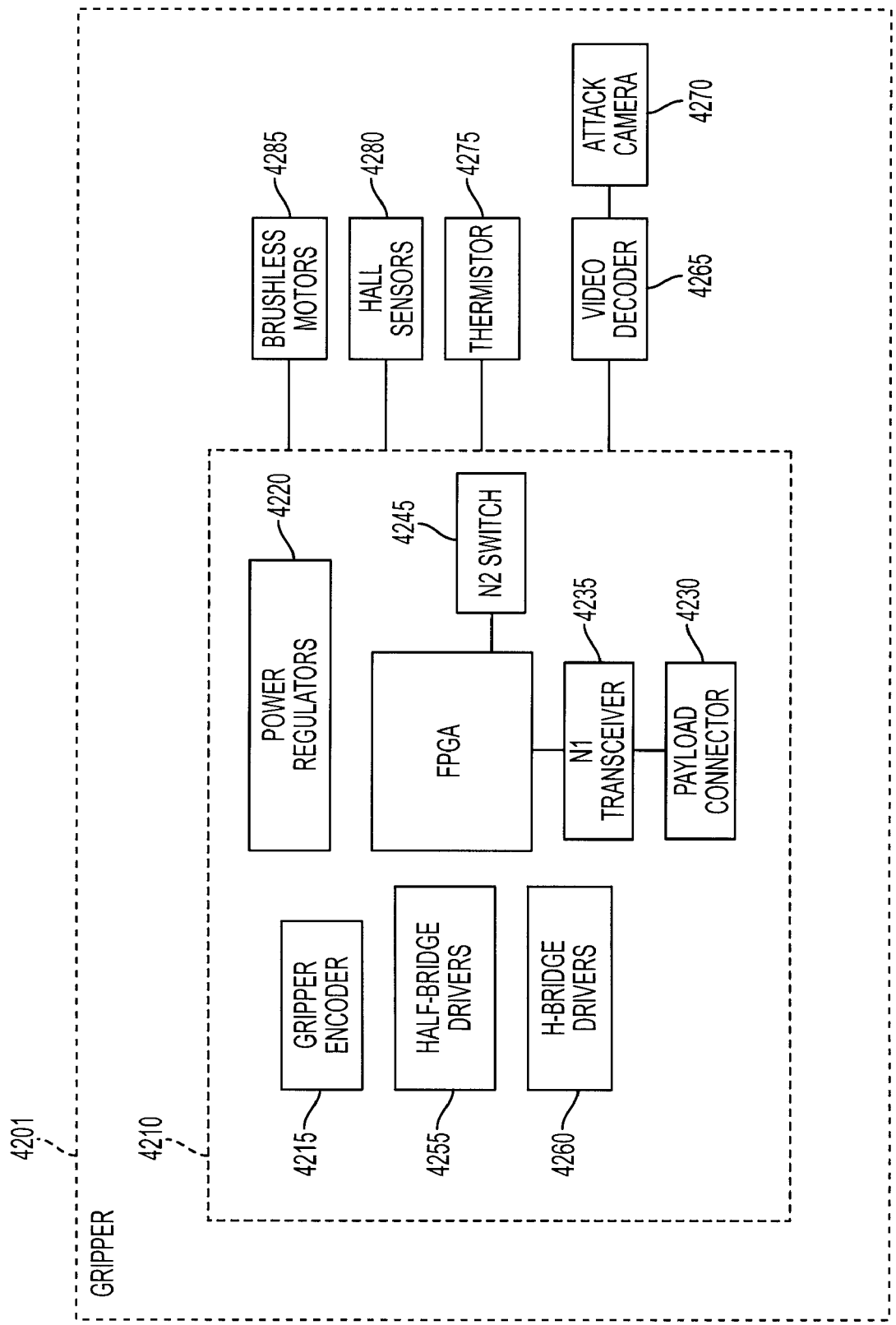
FIG. 13 illustrates an embodiment of a gripper module.

An exemplary implementation of a gripper module 1193 is shown in the block diagram of FIG. 13. Located within the base circuit 4210 of the gripper module 4201 is a FPGA 4240 connected to a network 2 switch 4245, and network 1 transmitter and receiver 4235 that is further connected to a payload connector 4230. The payload connector 4230 is preferably a plug configured to mate with a corresponding plug on neck module 3 1192. Also included within the base circuit are power regulators 4220 including circuits for regulating power within the gripper module 4201, and the following components for motion control: gripper encoders 4215; half-bridge drivers 4255; and h-bridge drivers 4260. Additional motion control components connected to the base circuit 4210 and included within the gripper module 4201 are brushless motors 4285, hall sensors 4280, and a thermistor 4275. A video decoder 4265 is also connected to the base circuit 4210. An attack camera 4270 located proximate to the gripper 4201 creates input to the video decoder 4265 so that the user can view the gripper 4201 actions.

Network Configuration

Figure 14:
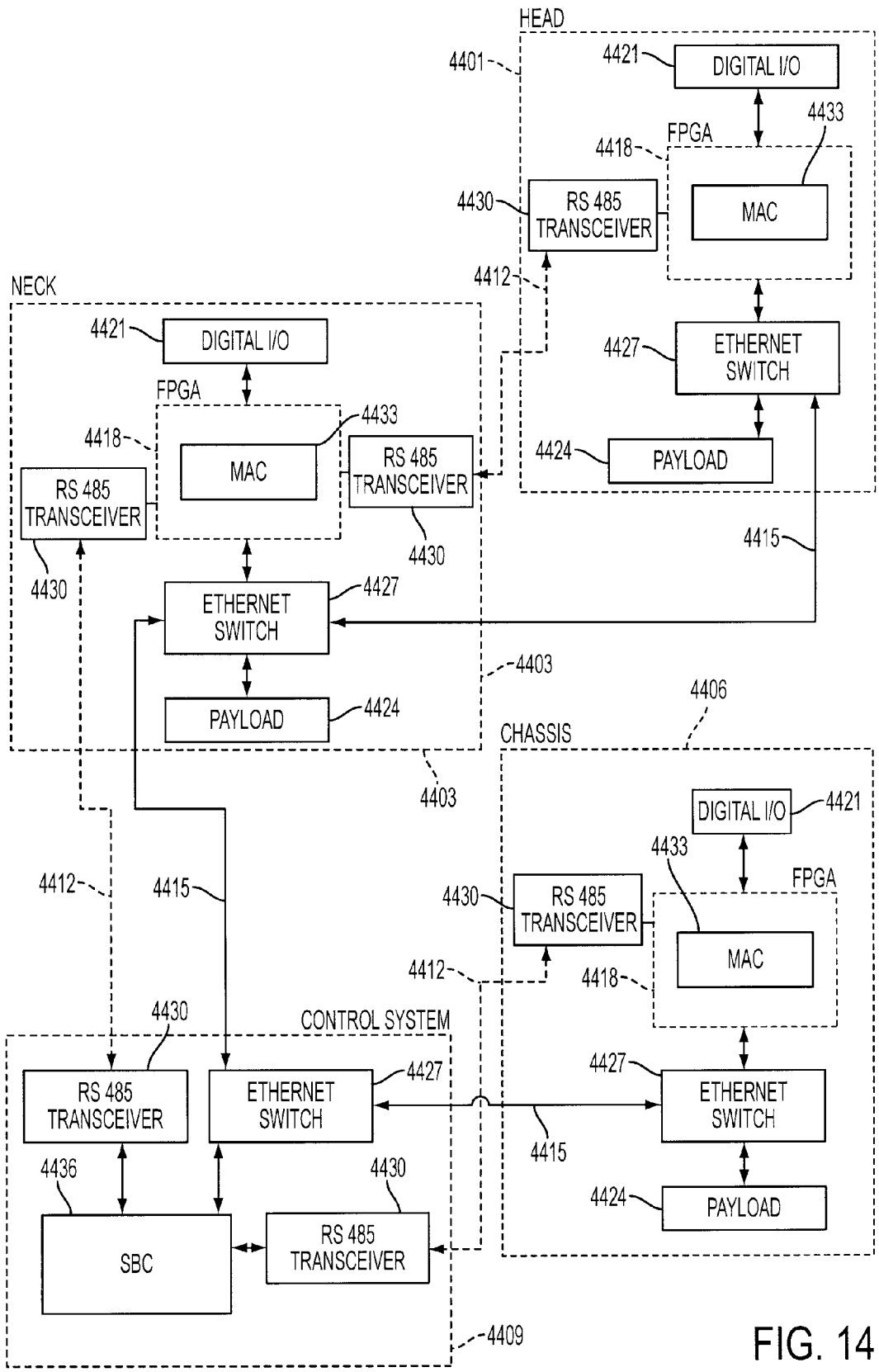
FIG. 14 illustrates an embodiment of a network installed between a head, a neck, a control system, and a chassis.

FIG. 14 illustrates an exemplary implementation of a network installed between the head 4401 and the control system 4409 and the chassis 4406. There are two sub-networks included within the network: (1) the Ethernet network created by the Ethernet switches 4427 included within each module and the communication link 4415 that connects each Ethernet switch to a corresponding switch; and (2) the RS485 network created by the RS485 transmitter and receivers 4430 and the connection wires 4412 that connect each RS485 transmitter and receiver to a corresponding transmitter and receiver.

The network includes a control system 4409 with a SBC 4436 for processing information transmitted to the computer 4436 by each network. To gather such information, the SBC 4436 is connected to a single Ethernet switch 4427 which in turn is linked to an Ethernet switch 4427 within the neck 4403 via a communication link 4415 and an Ethernet switch 4427 within the chassis 4406 via a communication link 4415. The SBC 4436 connects to two RS485 transmitter and receivers 4430, one transmitter and receiver 4430 is connected to a RS485 transmitter and receiver 4430 in the neck 4403 via a connection wire 4412, and a second transmitter and receiver 4430 is connected to a RS485 transmitter and receiver 4430 in the chassis 4406 via a connection wire 4412.

Each actuator assembly can include a core circuit capable of implementing an alternative network that includes only an Ethernet network. The core circuit includes a field programmable gate array 4418 with a media access controller 4433, where the FPGA is capable of managing multiple digital input 4421 and is further programmed to interface with the media access controller (MAC), which includes information or commands generated either by the FPGA or the digital I/O 4421 to generate frames of data to be sent to other modules within the robot via packets sent by the Ethernet switch 4427. The MAC is able to parse frames of data included within packets it receives from the Ethernet switch and extract information or commands that are either processed by routines included within the FPGA or relayed to the digital I/O 4421. Due to the full duplex communication network created by the Ethernet switch 4427, the MAC is able to simultaneously transmit and receive packets of data. The RS485 transmitter and receiver 4430, on the other hand, is half duplex communication meaning that the transmitter and receiver 4430 cannot transmit data and receive data simultaneously. "Actuator assembly" refers to the head 4401, the neck 4403 or the chassis 4406. "Module" refers to a component within the head 4401, the neck 4403, the control system 4409, or the chassis 4406.

Each Ethernet switch 4427 is also connected to a payload 4424, wherein payload can include a drive assembly, an EO/IR, or other assembly. Use of an Ethernet switch 4427 allows for simultaneous communication between the payload 4424 and other modules within the network including the head 4401, neck 4403, and chassis 4406. An example of this would include video information transmitted from a payload 4424 such as the video decoders 4150. The form of such information is a constant stream of video feedback from the drive camera 4160. The exemplary network created using the Ethernet switch 4427 allows for simultaneous receiving of video information from the drive camera 4160 and transmitting and receiving of information from the single board computer 4436.

Figure 15:
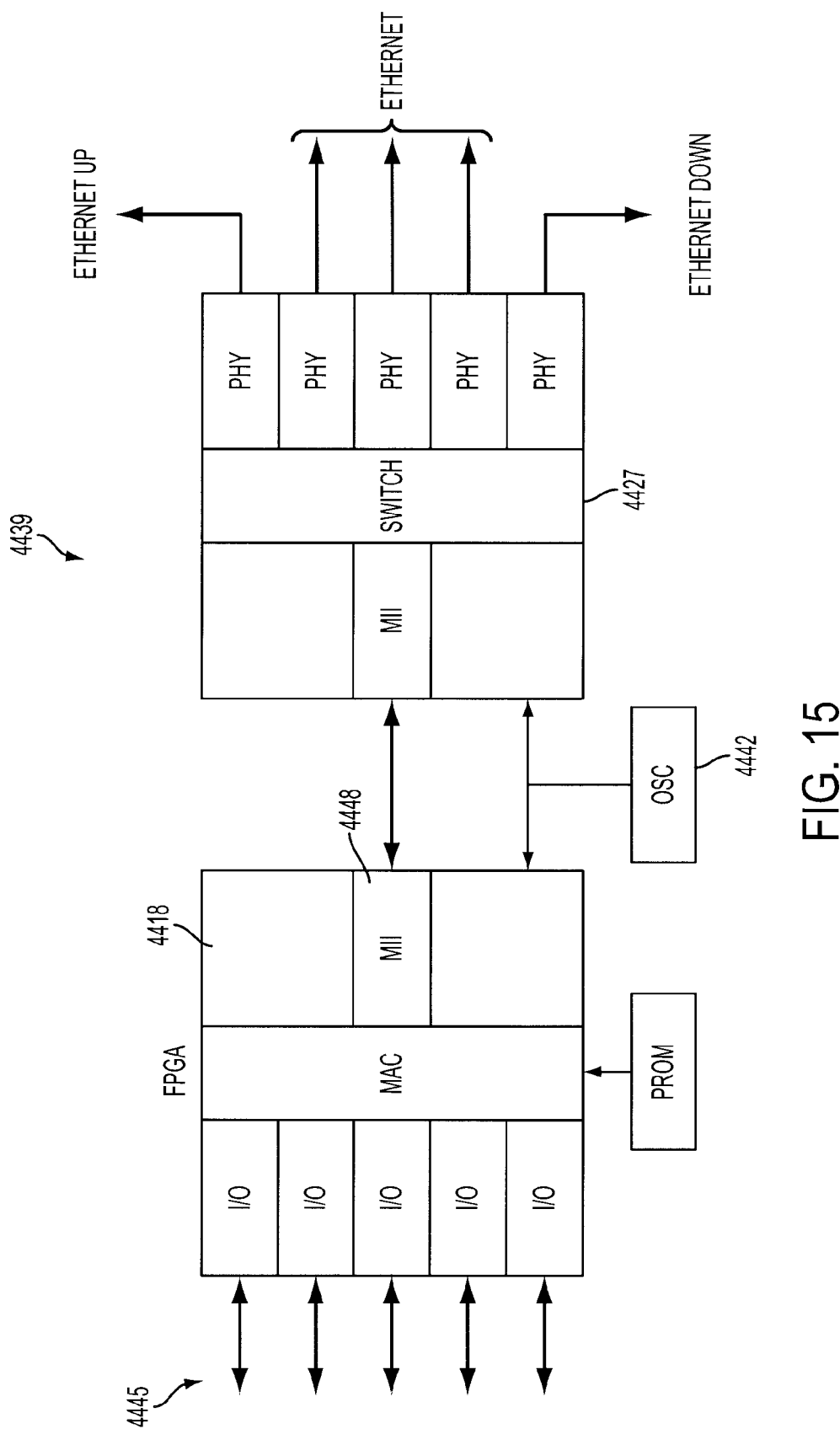
FIG. 15 illustrates an embodiment of an Ethernet endpoint block.

FIG. 15 illustrates an embodiment of an Ethernet endpoint block 4439 including an FPGA 4418 configured to include a MAC and connected to an Ethernet switch 4427. The Ethernet switch 4427 is connected to the MAC included on the FPGA 4418 via a medium independent interface bus that provides a logical interface with a communication protocol selecting the line speed and whether the connection is in a half or full duplex mode. The MAC parses the I/O ports 4445 included on the FPGA and generates frames of data to be included in packets. The packets are transmitted out through the Ethernet switch 4427 to the rest of the modules in the network. Included on the Ethernet switch 4427 are physical devices or line interfaces that handle the transfer of data from the Ethernet cable to the Ethernet switch 4427. An oscillator 4442 is included to facilitate the exchange of information between the MII buses.

Figure 16:
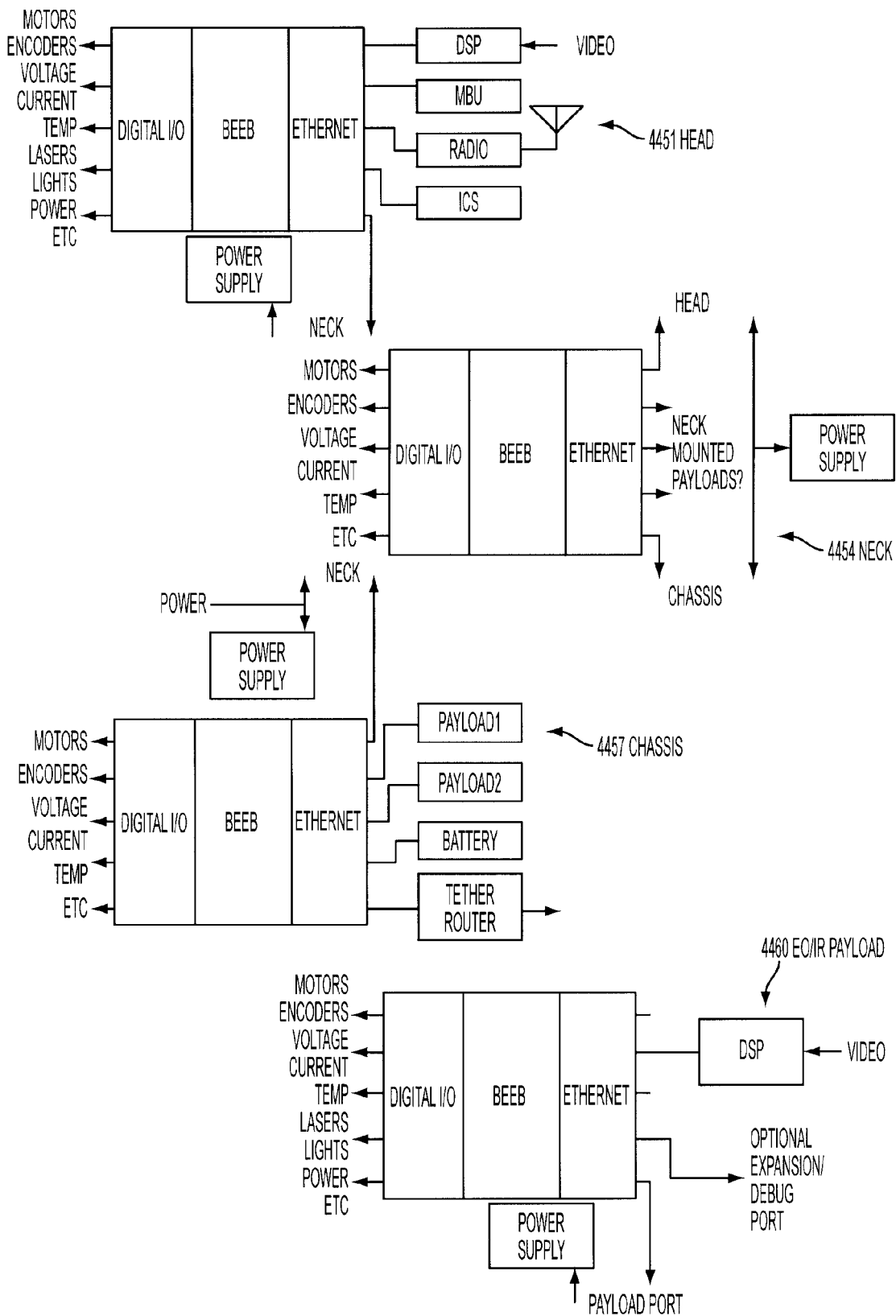
FIG. 16 illustrates an embodiment of the invention using the Ethernet endpoint block in the chassis, neck, head and EO/IR payload.

FIG. 16 illustrates an exemplary embodiment of the present teachings using the Ethernet endpoint block in the chassis, neck, head and EO/IR payload. Also shown is the connection of various payloads to the Ethernet endpoint block as well as the running of Ethernet to other modules.

Gripper Manipulator

Figure 17A:
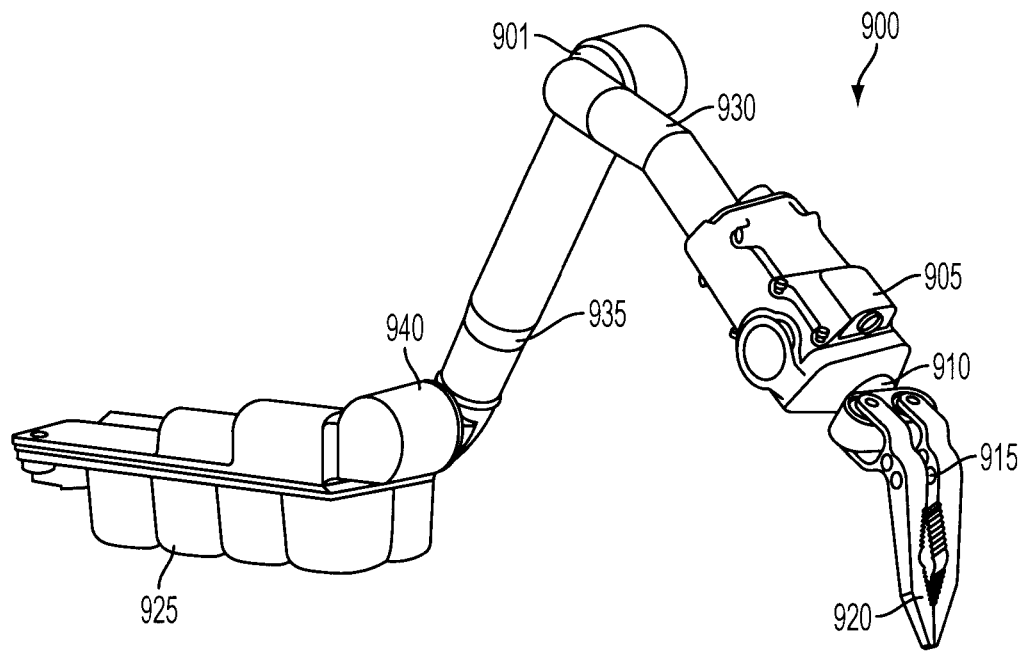
FIGS. 17A and 17B illustrate an embodiment of a robotic arm.
Figure 17B:
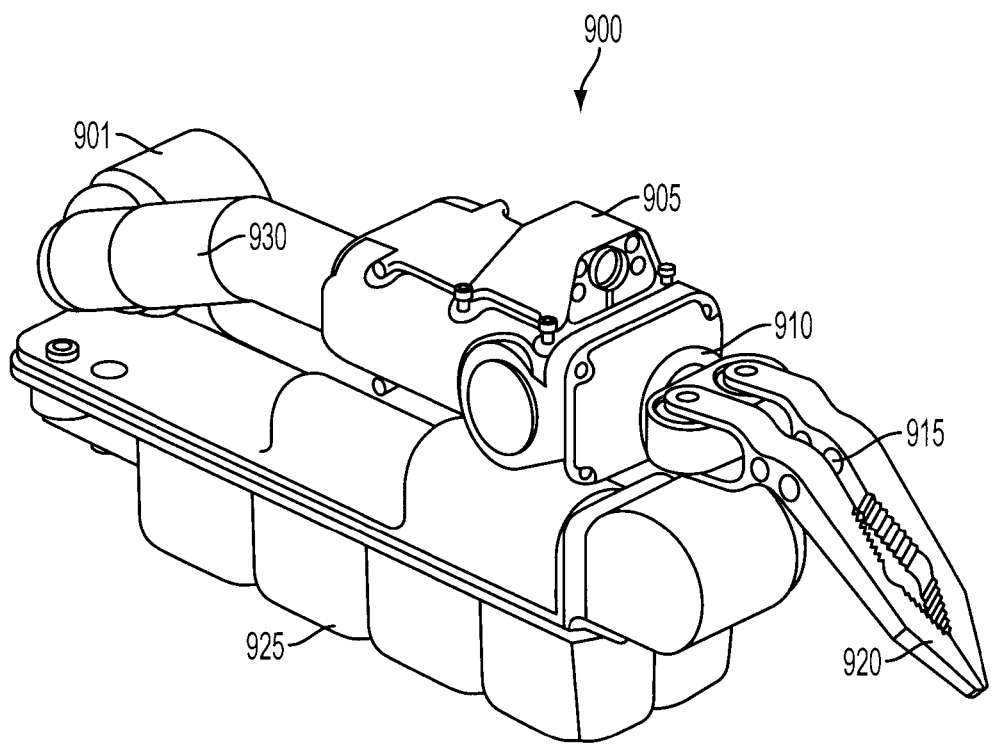

FIGS. 17A and 17B illustrate an embodiment of a robotic arm 900 for functioning as a gripper affixed to the mobile robot 10. The illustrated robotic arm 900 includes a base 925 with circuitry required to control the arm. Additionally, the arm 900 includes a pair of actuators 920 installed toward the end of the arm and able to grip and manipulate objects. Further included near the actuators 920 are joints 915, 910 which may be mobilized to alter the position of the actuators 920 in space, and a camera 905 installed proximate the actuators 920 so that the operator may control actuator 920 movement based on video feedback. The actuators are connected to a secondary arm 930 that pivots at a joint 901 and is connected to a main arm that pivots at a joint 940.

The joint 940 connected to the arm base 925 and the primary arm 935 can be controlled by the operator via an OCU outlined above. When drive commands are sent to the mobile robot 10 indicating that the joint 940 should be actuated, a drive command is sent to the drive assembly located proximate the joint 940 which in turn causes a motor located in the drive assembly to mobilize actuators connected to the joint 940 via gears and subsequently mobilize the primary arm 935. Similarly, drive commands sent to the drive assembly located proximate the joint 901 connecting the primary arm 935 to the secondary arm 930 can cause a motor located in the drive assembly to mobilize actuators connected to the joint 901 via gears and subsequently mobilize the secondary arm 930. Joints 915, 910, capable of mobilizing the manipulators 920 located on the gripper, can also be actuated via drive commands sent to a drive assembly proximate the joint 915 and including a motor. Additionally, the camera 905 installed near the gripper actuators 920 can input video data regarding the gripper's environment and transmit the data to the OCU 1155 where it is further transmitted so that the operator can view the gripper's environment.

Software Architecture

Behavior System Overview

Figure 18:
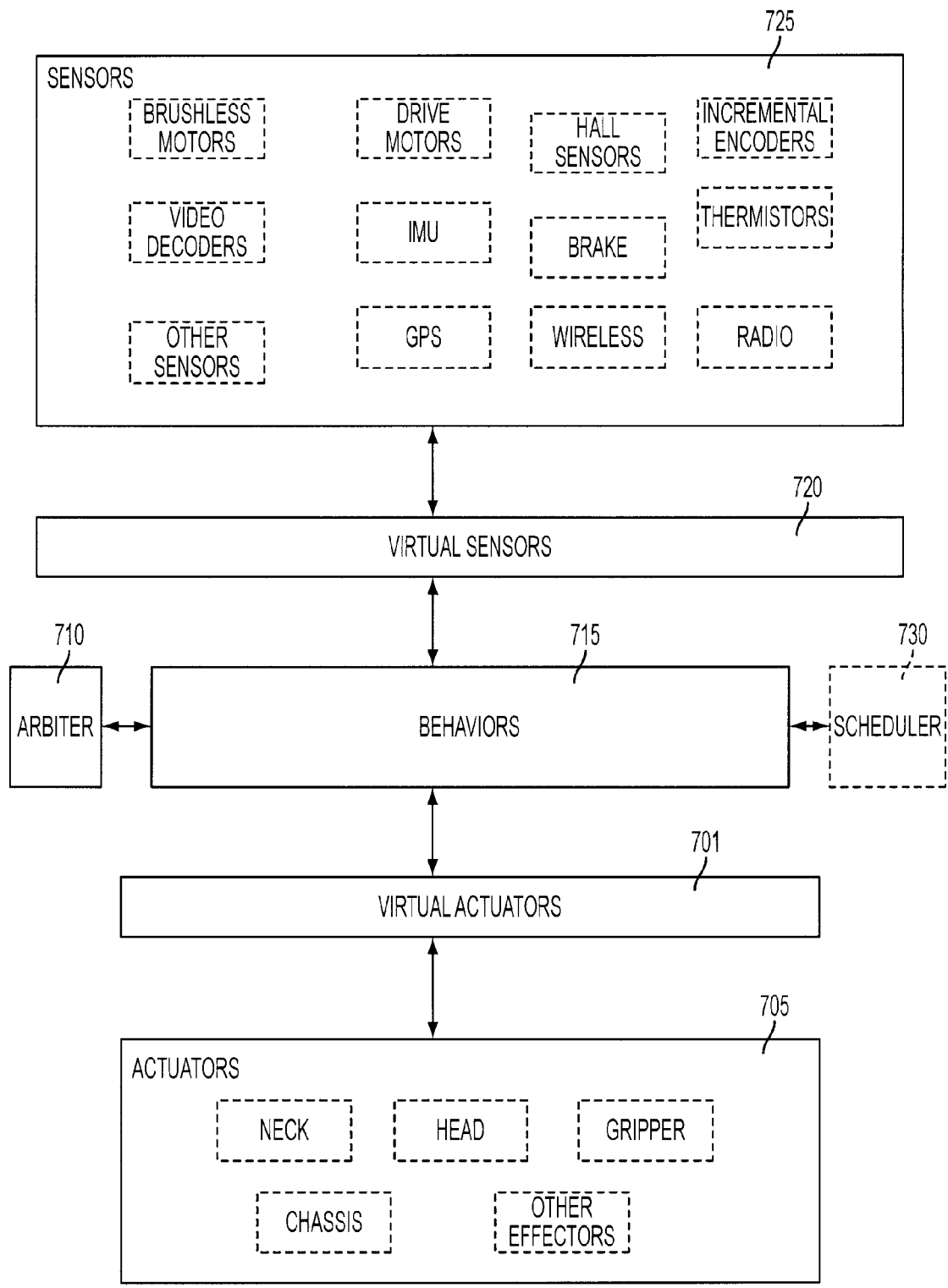
FIG. 18 illustrates an embodiment of a behavior system to be included within a remote vehicle.

In accordance with the present invention, a remote vehicle has included within its control system 1155 a behavior system comprising software routines and circuits. FIG. 18 illustrates an exemplary implementation of a behavior system for a remote vehicle. At the heart of the system are behaviors 715 including different behavior software routines and subroutines.

In certain embodiments of the present teachings, each behavior includes a status check routine that constantly checks sensor input to determine a change in start condition. When the start condition is a positive value, the behavior initiates a routine, included within the behavior, that sends software commands to an arbiter (coordinator) 710. The commands sent to the arbiter 710 are votes telling the arbiter 710 that the behavior would like control of the actuators used by the behavior's routines.

Figure 19:
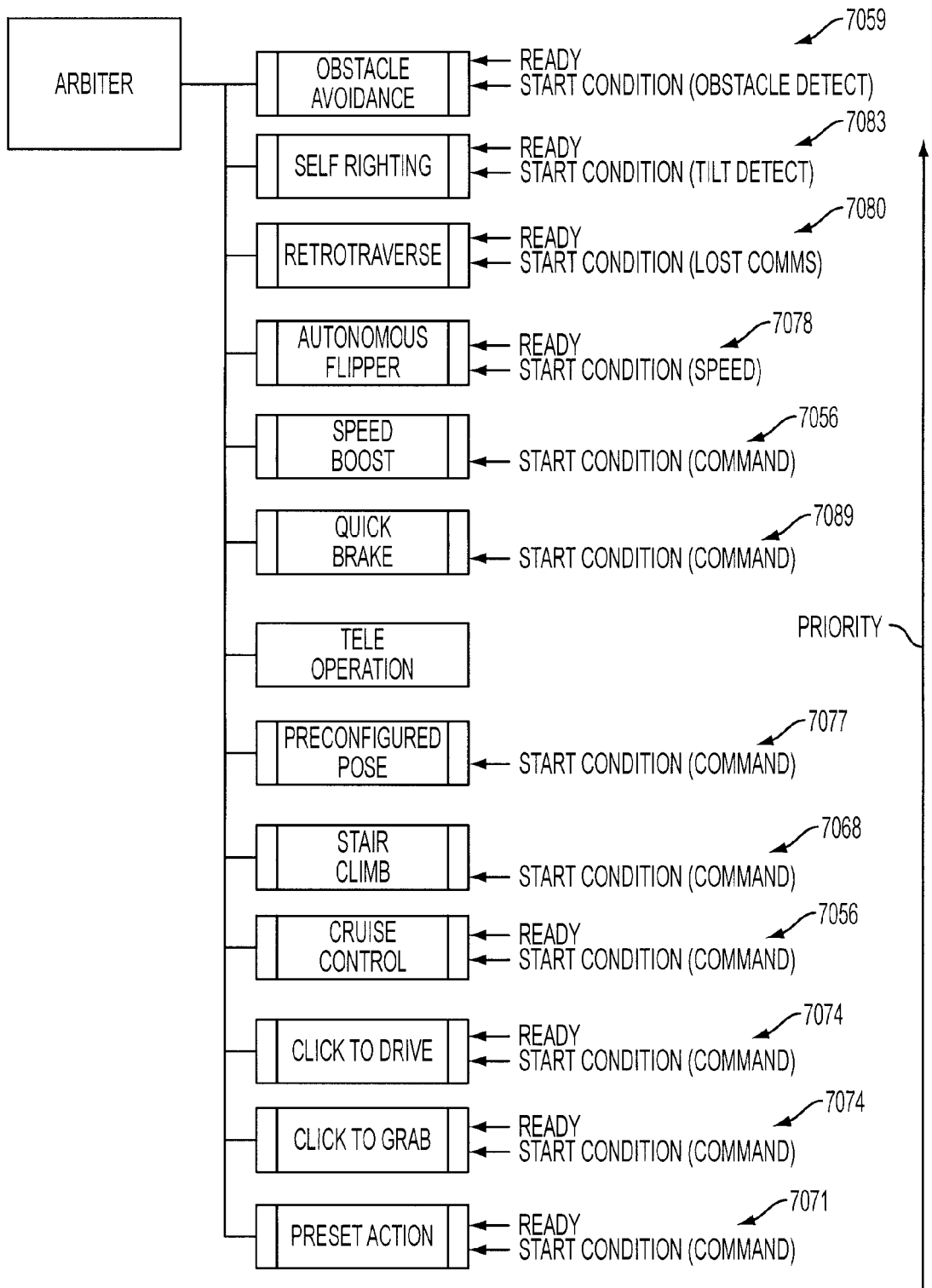
FIG. 19 illustrates a listing of behaviors within the behavior system in an exemplary order of priority.

FIG. 19 illustrates an exemplary priority listing for behaviors within a system in accordance with certain embodiments of the present teachings. As shown, a behavior such as obstacle avoidance 7059 has a higher priority than stair climbing 7068 as it can be more important that the remote vehicle avoid an obstacle than climb a stair.

The arbiter 710 is a software routine that manages the votes and priorities of the individual behaviors 715 in conjunction with a scheduler 730, to determine when and in what order the behaviors 715 will gain control over the remote vehicle's actuators and manipulators. To accomplish this, the arbiter 710 reviews the behaviors 715 currently voting for control and each behavior's priority level. Optionally, the arbiter may also review a scheduler's indication of which behavior should gain control based on the length of time that a current behavior or past recorded behavior had control of the actuators and manipulators.

Certain embodiments of the present teachings include virtual sensors 720 in communication with sensors 725 that can include sensor components and related circuitry and software routines providing feedback representing the remote vehicle's current external and internal environment. Sensor output can be conditioned by virtual sensors 720, which can include circuits and software able to receive and process sensor signals and provide outputs representative of each signal, but in a form able to be processed by the behavior routines.

Included within the behavior system are actuators 705 able to respond to output from virtual actuators 701 by mobilizing and performing actions. To control the actuators 705 within the robot 10, the behaviors 715 output control commands that can include drive commands, communication commands, and other commands to control robot actuators. Each actuator is able to receive drive commands in a particular format. The virtual actuators 701 include software routines and circuits that can convert the software control commands to control commands receivable by the actuators 705.

Autonomous Remote Vehicle Behaviors

Various exemplary autonomous remote vehicle behaviors are discussed below. In certain embodiments of the present teachings, the autonomous behaviors are included on the remote vehicle in memory, and are executed by the SBC. The present teachings contemplate employing autonomous behaviors on a variety of remote vehicle types, although an exemplary implementation including a mobile robot is describe below.

Click-to-Grip

Figure 20:
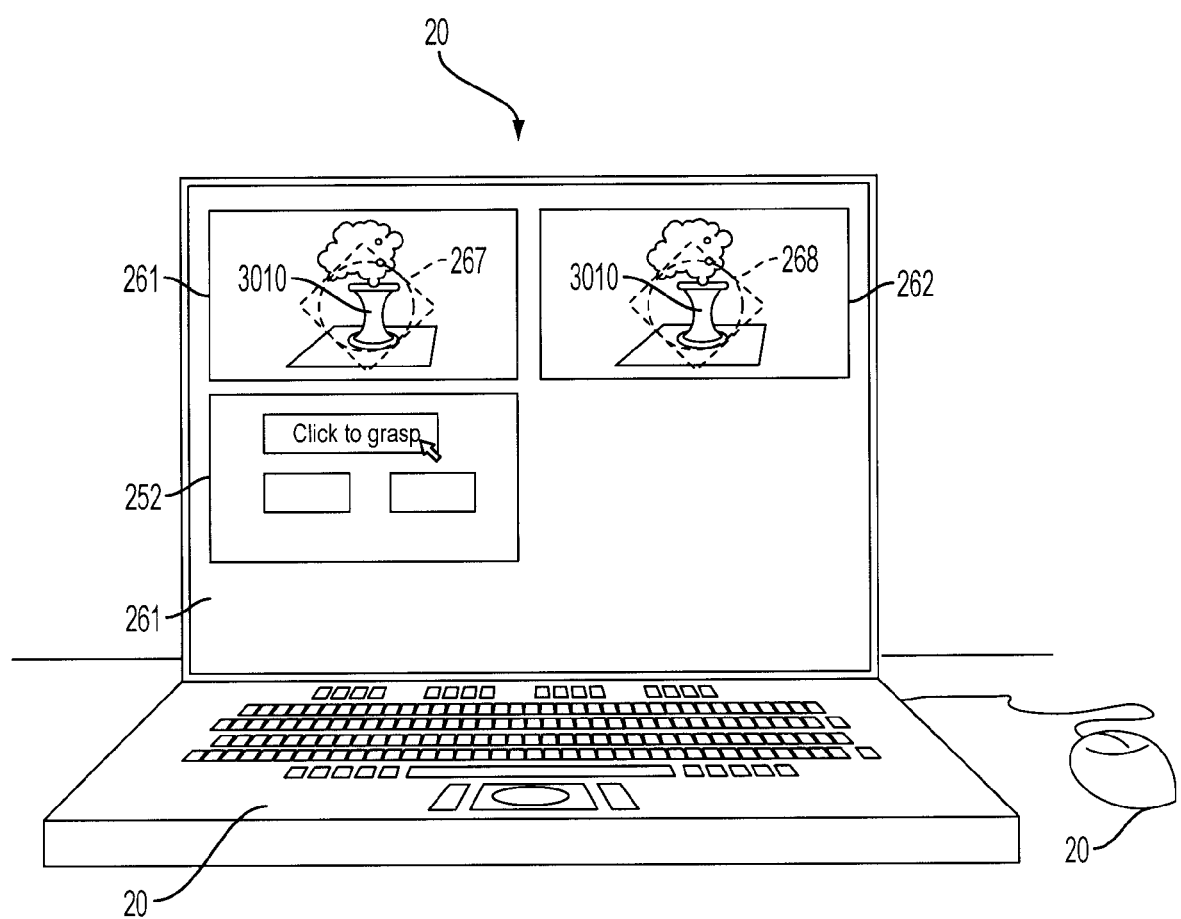
FIG. 20 illustrates an embodiment of a control system display for a click-to-grip behavior.

In certain embodiments of the present teachings, the robot includes two "fire and forget" behaviors allowing an operator to chose a displayed destination pixel and either drive toward the destination or grip an item at that location. These behaviors allow an operator to accomplish complex actuation and driving with less intervention. The click-to-grip behavior uses image data from first and second cameras displayed in respective first and second windows 261, 262 (see FIG. 20) to identify a target object to be gripped. In the embodiment illustrated in FIG. 20, the operator actuates a click-to-grip behavior and positions the first and second selectors 267, 268 to identify the target object 3010 in a drive camera display 261 and an attack camera display 262.

Figure 21:
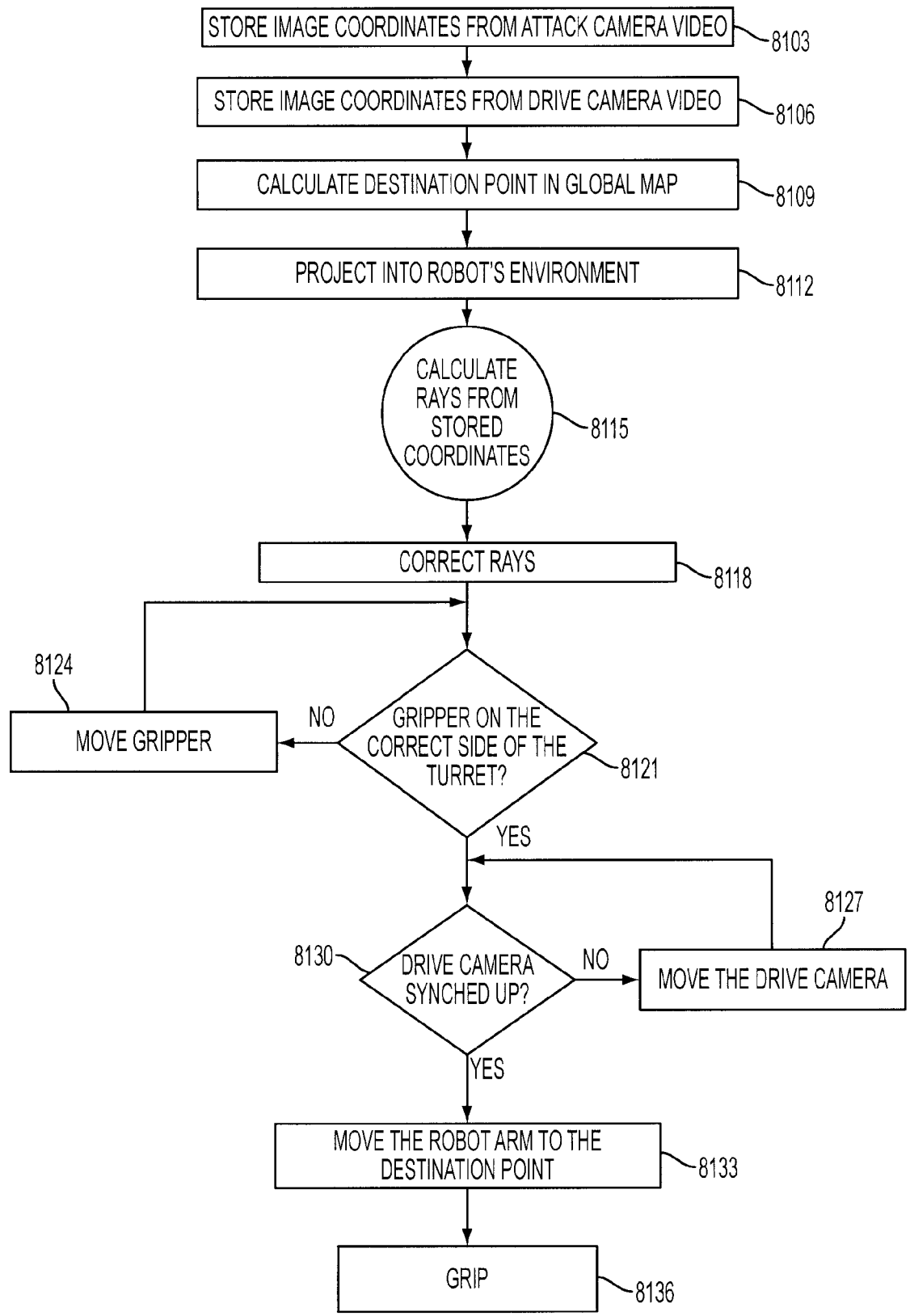
FIG. 21 illustrates an embodiment of a click-to-grip routine.

Once the object is selected, the position of the object within the displays is used to calculate its coordinates. FIG. 21 illustrates an embodiment of a click-to-grip routine. Upon operator selection of the object, the routine stores the image coordinates from the attack camera video display 8103 and the drive camera video display 8106. Using these image coordinates and stored values corresponding to the resolution of the cameras, the routine calculates the destination point 8109. The coordinates are projected into the robot's current environment 8112 and a set of rays are calculated 8115 from the projected coordinates. The rays represent travel vectors from the robot's current position to the destination position. The rays are corrected 8118 and a check is done to ensure that the gripper is on the correct side of the turret 8121. If the gripper is not on the correct side of the turret, the robot moves the gripper 8124. Once the gripper is correctly positioned, a check is done to ensure that the drive camera is synched with the object to be gripped 8130. If the drive camera is not synched, the robot can reposition the camera 8127, which may include moving the camera to a position included within the newly-calculated travel vector. Once the drive camera is synched, the robot moves the gripper to the destination point 8133 and grips the object 8136.

In certain embodiments of the present teaching, the remote vehicle can sense and avoid collision of the manipulator arm with the frame. To do so, collision avoidance determines the end effector motion that best matches the user's command while avoiding remote vehicle self collision. In certain embodiments, the remote vehicle maintains a 3D geometric model of itself to know its current state and what component is potentially colliding with what. To prevent unintended manipulator arm-ground collisions, parts of the manipulator arm typically not visible to the operator are maintained above an artificial ground plane. Because obstacle avoidance can sacrifice a user's intended spatial trajectory to avoid collision, a potential field strategy can be employed to create a gradient with a positive attraction to the user's goals and a negative attraction to self collision. Such automated collision avoidance allows the user to operate a gripper more intuitively with respect to the viewers own coordinates rather than those of the remote vehicle chassis. To do so, a lower tilt camera of the remote vehicle automatically tracks the gripper, freeing the user from manual adjustment.

Gripper motion in the viewer perspective contemplates commands being given to the remote vehicle in the camera's coordinate frame, which creates a consistent, intuitive interface for manipulator control. Rather than mentally calculating what motion would be required to move toward or away from an object, the user can center the object in his or her own viewscreen using a consistent 2D up/down, left/right control.

Once the object is centered, the operator can use a forward/back command to move the manipulator toward or away from the object. This interface can remain the same regardless of manipulator configuration, so gripping objects on the ground can seem the same as opening a door. Movements in the camera's frame for any camera configuration are converted to end-effector movement. Certain embodiments accomplish this using basic forward kinematics to obtain the camera's frame orientation relative to the remote vehicle's root frame. The camera frame movement is rotated into the remote vehicle's root frame and the root frame movement is applied to the end effector's frame.

Autonomous camera following adds autonomous control of the secondary (e.g., lower tilt) camera, enabling it to keep the end-effector in sight. This can give the user depth perception by presenting triangulated viewpoints of the end effector on the PCC. The camera can track constantly or minimize movement while keeping the end effector centered. The system must determine both the position of the end effector and where to aim the camera to point at the end effector. To do this, in accordance with certain embodiments, the dot product is used to obtain the angle between the vector representing where the camera is pointing and the vector from the camera to the end effector. That angle is then minimized.

The present invention contemplates embodiments wherein the click-to-grip behavior is operable in a high degree of precision mode and a low degree of precision mode. The high degree of precision mode allows the operator to choose the object's corresponding pixel image on the display screen and responds to the actuation of a button triggering a gripping sequence that takes the precise pixel location and converts it to a destination point. The low degree of precision mode, on the other hand, allows the operator to choose a heading direction and responds to actuation of button triggering a sequence that flies the gripper in the general direction of the objects included within the heading.

In accordance with certain embodiments, the gripper can move using a "fly in motion," in which the gripper moves forward in a single fluid motion actuating all necessary joints to keep the direction of movement uniform. In certain embodiments, the robot can choose a path within an approved heading that provides the most direct route and avoids obstacles. The gripper will stop if it encounters unexpected obstacles, and will move forward 50% of the estimated distance to reduce the risk of over-travel. After moving 50% of the estimated distance, the operator may reposition the gripper and trigger the click-to-grip behavior again. The present teachings contemplate moving away from the object using the same path that was used to move the gripper forward. An alternative embodiment moves forward 100% of the estimated distance. Further alternatives include a robot that:

uses sensors to identify the basic shape of the object and orients the wrist joint of the manipulator arm accordingly;

has motors that can fine tune the manipulator arm;

has a pre-programmed manipulator arm motion routine;

uses analysis of the object's dimensions to close the gripper's fingers until the aperture is the required size or until torque sensors in the gripper indicate that the fingers have a required amount of resistance;

has a gripper that grips the object until the grip routine exits;

has an emergency halt routine that halts the gripper and awaits instructions if an unexpected obstruction is encountered;

uses camera triangulation, camera depth-of-field, and object size estimation to estimate the range to the target; and/or has a distance sensor to provide distance feedback used by the routine to adjust movement toward the object to be gripped.

Retro Traverse

Retro traverse behavior autonomously navigates a remote vehicle back along a return path interconnecting various previously traversed coordinates. The retro traverse behavior may be activated by user request or automatically when trigger conditions are detected by the remote vehicle 10, such as when no control signal has been received after a threshold period of time. If automatically triggered, retro traverse acts as a persistent behavior.

Figure 22:
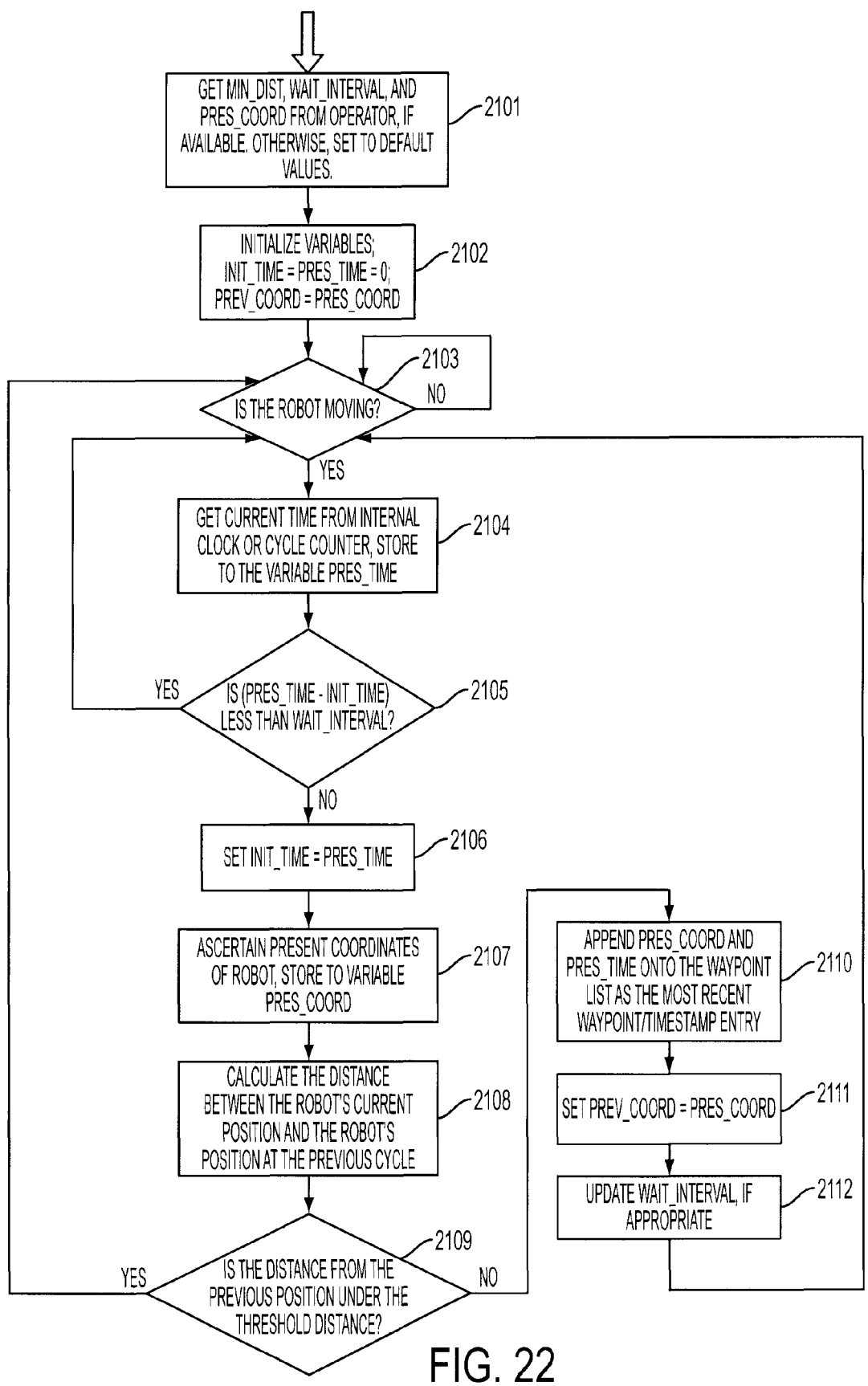
FIG. 22 illustrates an embodiment of a waypoint routine.

To perform retro traverse according to accordance with certain embodiments of the present teachings, a mobile robot 10 records waypoints at intermittent times while it is moving. FIG. 22 illustrates an embodiment of a waypoint routine. At step 2101, the routine receives the values for variables min_dist (the minimum distance by which successive waypoints should be separated), wait_interval (the period of time the routine should wait before recording a next waypoint) and pres_coord (the present coordinates of the mobile robot 10, as provided by a position reckoning system), and step 2102 initializes several variables, setting init_time (the initial timestamp) and pres_time (the current time of the present execution cycle) to zero, and prev_coord (the coordinates ascertained for the previous execution cycle) and pres_coord (the currently ascertained coordinates of the mobile robot 10) to zero, as well.

It is determined at step 2103 whether the robot is moving and, if not, the process loops back to step 2103. Otherwise, step 2104 gets the current time (such as from a clock or cycle counter) and stores it to the variable pres_time. It is then determined at step 2105 whether sufficient time has passed since the initial time and, if not, the process returns to step 2103. If sufficient time has passed, then step 2106 assigns the value of pres_time to the variable init_time; step 2107 ascertains the present coordinates of the mobile robot 10 and stores them to the variable pres_coord; and step 2108 calculates the distance between the mobile robot's current position and the position of the mobile robot 10 ascertained at the immediately previous cycle.

If step 2109 determines that not enough distance has been traversed since the previous cycle, then the process returns to step 2103. Otherwise, step 2110 appends the values of pres_coord (as a positional record) and pres_time (as the corresponding timestamp) to the list of recorded waypoints; step 2111 sets the value of prev_coord to the same value as pres_coord; and step 2112 updates the variable wait_interval, if necessary or appropriate, before returning to step 2103.

Accordingly, the waypoint routine maintains a list of recorded waypoints separated by at least minimum permitted differences in time and distance. The retro traverse behavior can then utilize the list of recorded waypoints to generate a return path interconnecting the waypoints, in reverse order of timestamps.

Figure 23:
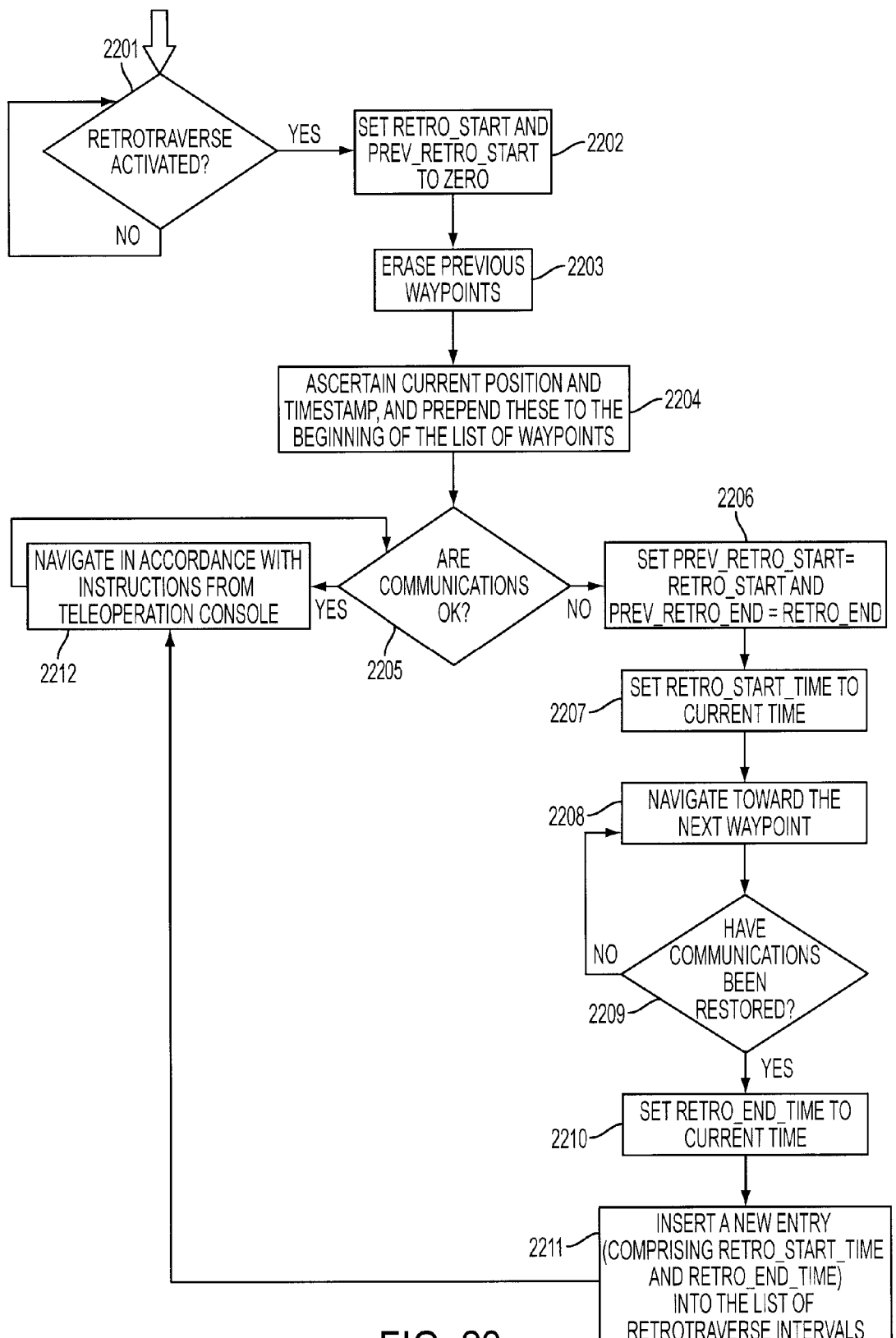
FIG. 23 illustrates an embodiment of a retro traverse behavior.

FIG. 23 illustrates an exemplary embodiment of a method for performing a retro traverse behavior. At step 2201, it is checked whether the behavior is active and, if so, the behavior proceeds to step 2202 (otherwise looping back to step 2201). Step 2202 sets the values of retro_start and prev_retro_start to zero. Step 2203 erases any previously used waypoints, and step 2204 ascertains the current position of the robot 10 and the current time, which are prepended to the list of recorded waypoints.

At step 2205, it is determined whether a control signal has been properly received. If so, then step 2212 proceeds to navigate the robot based on the instructions received from the operator. Otherwise, step 2206 sets the value of prev_retro_start to retro_start, and prev_retro_end to retro_end. Step 2207 sets the value of retro_start_time to the current time, and step 2208 navigates the robot 10 toward the next previous waypoint retrieved from the list of recorded waypoints for one execution cycle. If step 2209 determines that communication has not been restored, the behavior returns to step 2208 and continues navigating toward the waypoint. Otherwise, step 2210 sets retro_end_time to the current time and step 2211 inserts a new entry (comprising the values of retro_start_time and retro_end_time) into a list of retro traverse intervals before proceeding to step 2212.

By maintaining a list of previously-performed retro traverses (for example, by recording a list of start/end time pairs for each period of time the retro traverse behavior is activated and deactivated), the retro traverse behavior can ignore any waypoints that are recorded during retro traverse operation, as these are spurious for future retro traverse purposes. That is, after the robot 10 has finished a retro traverse, it records the range of timestamps on the points it retraced and that it created on its path back. On its next retro traverse, it may ignore those points.

Figure 24:
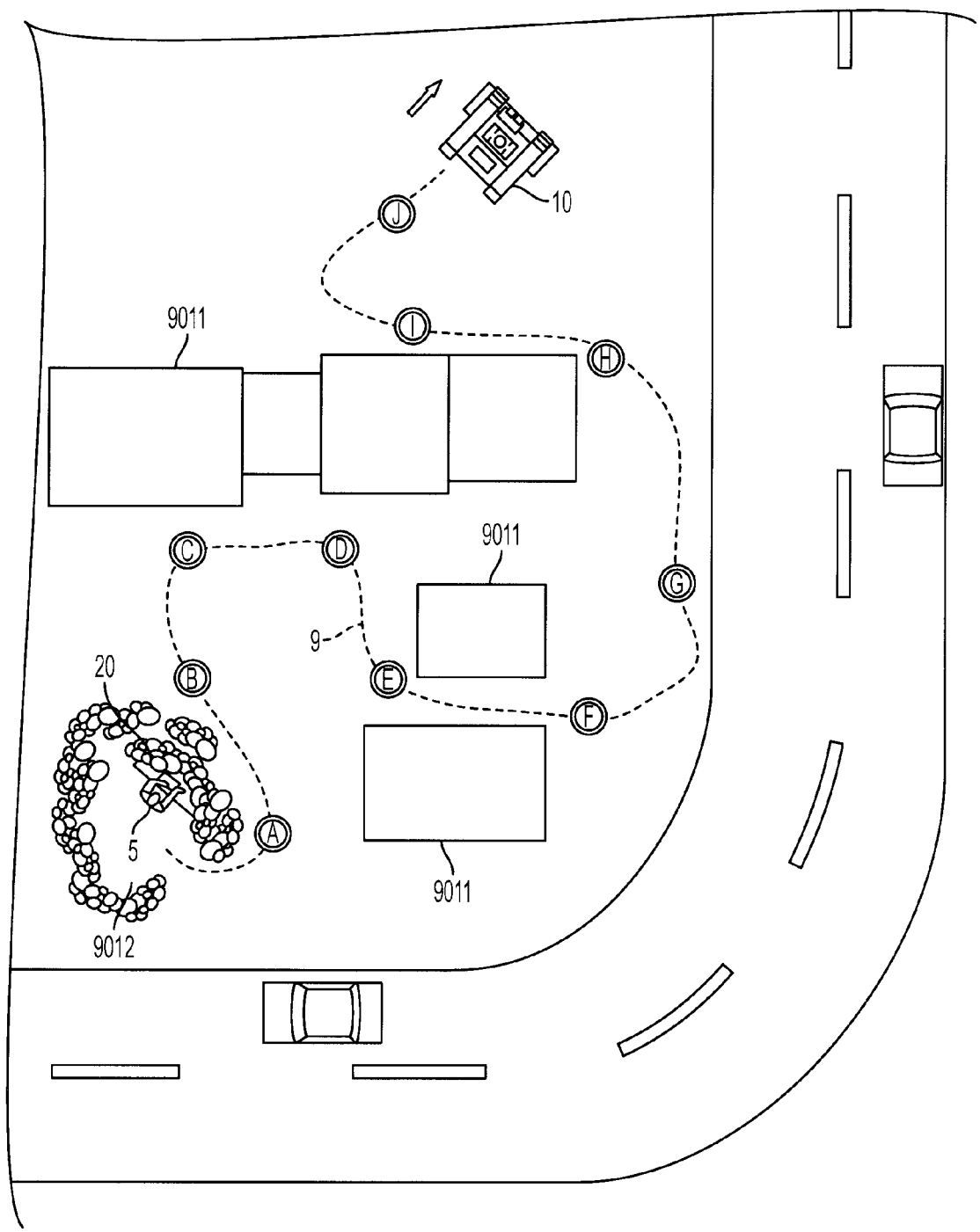
FIG. 24 illustrates an embodiment of remote control operation of a remote vehicle in an urban combat zone.

An exemplary remote control operation of the mobile robot 10 in an urban combat zone is shown in FIG. 24. An operator 5 is positioned within a sandbag-enclosed bunker 9012 adjacent a roadway. The mobile robot 10 proceeds out from the bunker 9012, under control of the navigation commands transmitted, preferably wirelessly, by the operator. As shown by the curved dotted line, the mobile robot 10 then traverses a path between various buildings 9011.

At various times during navigation of the mobile robot 10, waypoints A through J are recorded. Each recorded waypoint includes information regarding the position of the mobile robot and a timestamp indicating when the position was sampled. The waypoints may be recorded in the memory of the mobile robot 10 in a suitable data structure (e.g., as a doubly-linked, indexed list, sorted chronologically by timestamp) to permit forward and reverse list traversal as well as indexed access to the waypoints.

As the mobile robot 10 proceeds further away from the operator, or when an obstacle such as the buildings 9011 sufficiently impede wireless communication, the mobile robot 10 may fail to receive control signals transmitted by the operator. Therefore, as an example of a persistent autonomous behavior, the retro traverse behavior may be activated by the robot 10 when it determines that communication is lost.

Figure 25A:
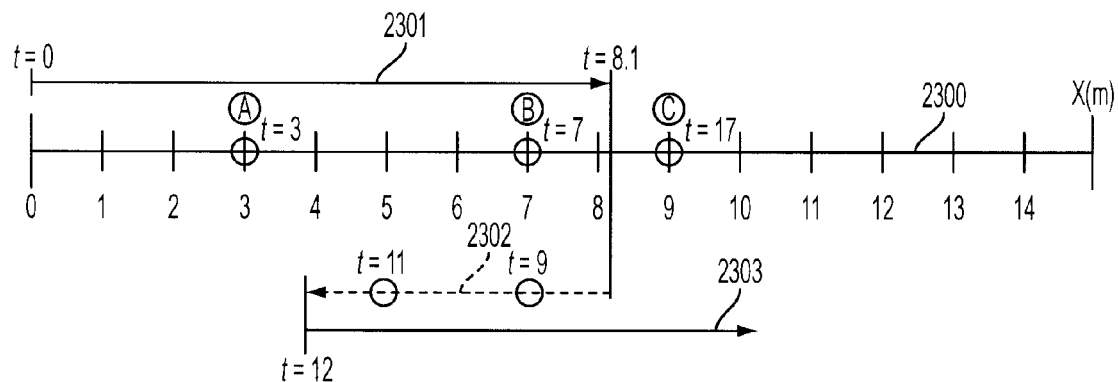
FIGS. 25A and 25B illustrate a retro traverse behavior.

Another embodiment of a retro traverse behavior is illustrated in FIG. 25A, in which the robot traverses either forward or backward along a single line 2300. The robot 10 initially proceeds out along the line 2300 during a first outbound leg 2301. The waypoint routine records waypoints A and C at positions x=3 and 7. When the mobile robot 10 starts retro traverse, it uses these waypoints because no previous retro traverse has yet been performed.

In the embodiment of FIG. 25A, the first outward leg 2301 stops just after t=8 (at which time the mobile robot 10 may have lost radio contact with the operator or received instructions to stop). The first retro traverse leg 2302 then begins at t=8.1 and continues until t=12, at which time the mobile robot 10 stops retro traversing and resumes outbound traversal along the second outbound leg 2303 (e.g., after regaining communications with the operator). During the first retro traverse leg 2302, the mobile robot 10 again travels over point B, but does not proceed all the way back to t=0. Also during the first retro traverse leg 2302, the waypoint routine generated waypoints at t=9 and t=11

The retro traverse interval t=8.1 to 12, representing the start time (t=8.1) and end time (t=12) of the retro traverse leg 2302 is then added to the list of retro traverse intervals, and any waypoints having a timestamp within this range (in this case, the waypoints at t=9, 11) are excluded on any subsequent retro traverse.

Figure 25B:
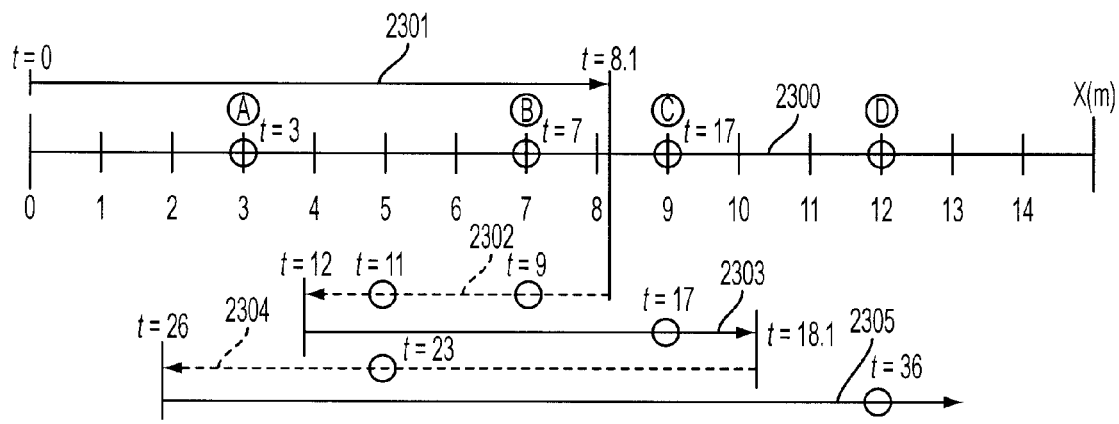

FIG. 25B illustrates an embodiment of the invention that continues from the example shown in FIG. 25A. The mobile robot 10 proceeds along the second outbound leg 2303 until t=18.1, when retro traverse is activated again. When this second retro traverse leg 2304 starts, the retro traverse behavior retrieves the list of waypoints having timestamps t=17, 11, 9, 7, 3, 0.

From the list of waypoints, the behavior removes from consideration all recorded waypoints having a timestamp within the interval t=8.1 to 12, resulting in a pruned list t=17 (corresponding to C), t=7 (corresponding to B), t=3 (corresponding to A) and t=0 (an implicit, unnamed timestamp corresponding to the beginning of the robot's movement). This pruned list corresponds to the desired straight path back to the beginning of the journey. Following the second retro traverse leg 2304 ending at t=26, a second retro traverse interval t=18 to 26 is appended to the list of recorded retro traverse intervals (resulting in a list of intervals comprising the two entries [8.1, 12] and [18, 26]) and the third outbound leg 2305 then starts (resulting in a third waypoint D recorded at t=36).

If a third retro traverse leg (not shown) were to start, it would accordingly ignore all waypoints with timestamps within the intervals 8.1 to 12 and 18 to 26.

To ensure smooth navigation and avoid abrupt veering or swerving in the vicinity of corner points along an intended path of travel, the mobile robot 10 may base its navigation on a lookahead vector. A lookahead vector can be defined in the following way: a starting point lies at the closest point on the path to the mobile robot 10, and an ending point is a point farther along the path that is either at a maximum distance away, or at a shorter distance as determined by the curvature of the path and/or other factors. For example, the mobile robot 10 may continuously drive toward a virtual point approximately 1 meter in front of it along the intended path. In some implementations, the distance that the mobile robot 10 looks ahead may be variable, depending upon the geometry of the lookahead vector.

In addition, rather than always manipulating the x-y coordinates of points directly, navigation of the mobile robot 10 may utilize a line-segment abstraction of the intended path. First, when retro traversing, the return path can be represented as a set of piecewise continuous, conjoining line segments rather than a set of points. The mobile robot 10 may perform most of its calculations in terms of the tangent and perpendicular to the line segment the mobile robot 10 is traversing instead of based on the vector difference to the next waypoint. Accordingly, the mobile robot 10 may reduce or eliminate sharp turning when it approaches waypoints conjoining two path line segments at acute angles.

Secondly, once the robot has pre-computed the tangents and lengths of the line segments, a point can be expressed as a distance along the path. For example, letting $\lambda$ represent the tangent unit vector to the $i^{th}$ line segment, then a point r with path length l has a position $$r = \sum_{i=0}^{n} a_i \lambda$$

where $a_i$ represents the length of the $i^{th}$ segment for i=0 to n−1 and $$a_n = l - \sum_{i=0}^{n-1} a_i.$$

Further, the retro traverse behavior may implement a predetermined cycle of calculations to follow a return path:

Determine on which line segment the robot is currently traversing;
Calculate the end of the lookahead vector; and
Calculate motion commands.

The calculations may be done in the listed order during a cycle of the behavior system because the mobile robot 10 moves after all of the calculations have been completed.

The retro traverse behavior may use a radius of interception to determine whether the mobile robot 10 has reached a waypoint, or a perpendicular plane to determine when the mobile robot 10 has passed a waypoint. Preferably, however, the mobile robot 10 keeps track of which line segment of the return path it is traversing. Since the lookahead vector keeps track of the local area that the robot's motion is based on, the only line segments of the retro traverse path that the robot needs to consider are those spanned by the lookahead vector. The retro traverse behavior then determines the closest of these line segments and sets that as its reference.

Figure 26A:
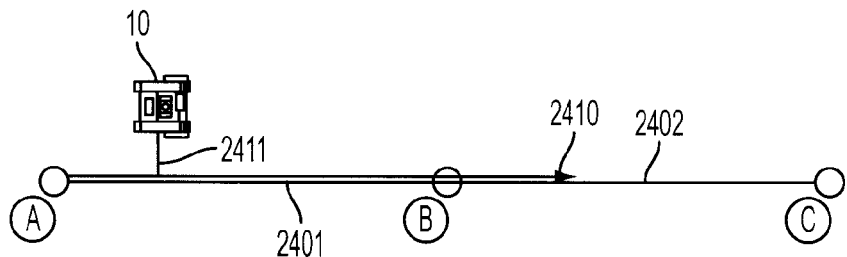
FIGS. 26A-26C illustrate a retro traverse behavior.

FIG. 26A illustrates an embodiment of the invention where the lookahead vector 2410 extends from the mobile robot 10 along a linear return path including a first line segment 2401 and second line segment 2402 interconnecting waypoints A, B and C. The mobile robot 10 computes its distance to all the line segments between the beginning and the end of the lookahead vector 2410. The line segment closest to the mobile robot 10 is the one it associates with. In the embodiment of FIG. 26A, the robot associates to the first line segment 2401 via the perpendicular line 2411.

Figure 26B:
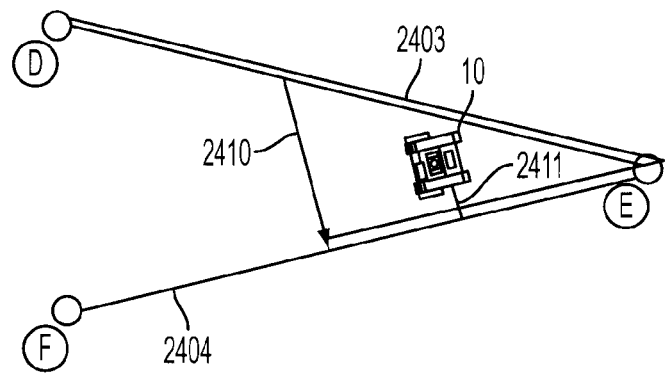

In an embodiment illustrated in FIG. 26B, third and fourth line segments 2403, 2404 interconnecting waypoints D, E and F, form an angle with waypoint E as the corner. Here, on the previous iteration, the mobile robot 10 determined it was closest to the third line segment 2403, and thus the lookahead vector 2410 starts there for the present cycle. However this time it finds that it is closest to the fourth line segment 2404, meaning it has passed waypoint E.

Figure 26C:
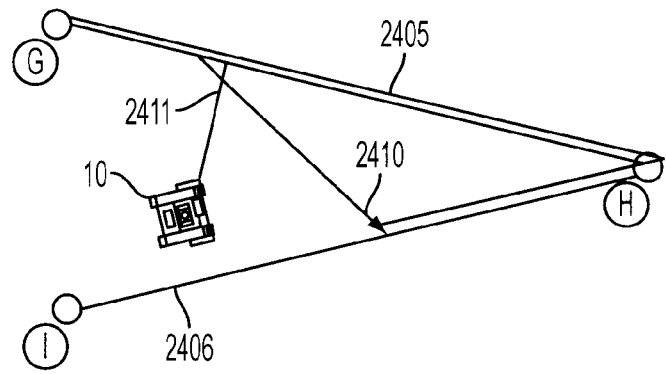

FIG. 26C illustrates a situation similar to the arrangement of FIG. 26B; however, in FIG. 25C, the lookahead vector—which is rooted in the fifth line segment 2405—does not extend all the way out to the closest point on the sixth line segment 2406. In this case, the mobile robot 10 should not associate with the sixth line segment 2406 because then the mobile robot 10 would short cut the desired path. Accordingly, the lookahead vector preferably gets shortened in order to avoid taking short cuts that bypass waypoints. To achieve proper paths without shortcutting, the retro traverse behavior does not accept any line segments for which the closest point to the mobile robot 10 is beyond the end of the lookahead vector.

In the embodiment of FIG. 26C, the mobile robot 10 stays on the fifth line segment 2405 despite it being farther away than the sixth line segment 2406. Once the mobile robot 10 has determined which line segment it is on, it calculates the closest point to the mobile robot 10 on that line segment. This point is then used as the origin of the lookahead vector for the subsequent iteration.

After determining the beginning of the lookahead vector, the retro traverse behavior next determines where the end of the lookahead vector is. Referring to an embodiment of the invention illustrated FIGS. 46A through 46D, the lookahead vector 2510 may have a length established by default to a predetermined value (e.g. one meter long). However, the retro traverse behavior may be implemented so as to ensure that the mobile robot 10 drives at least within a maximum permitted distance of each waypoint. If the lookahead vector 2510 were to always stay at its full default length, the mobile robot 10 might traverse a route with all the curves excessively smoothed out in some circumstances.

Figure 27A:
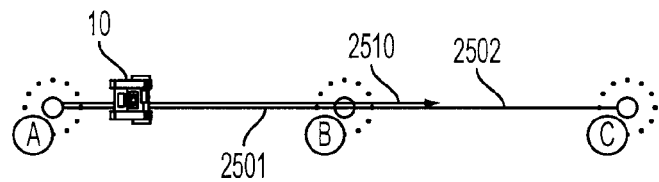
FIGS. 27A-27D illustrate a retro traverse behavior.

In view of this, the embodiment of FIGS. 27A through 27D demonstrate a system for determining when and how to shorten the lookahead vector 2510 to keep the mobile robot 10 aligned with the intended path. FIG. 27A shows a straight-line path comprising first and second line segments 2501, 2502. In this case, the path of mobile robot 10 passes well within the permitted distance from waypoint A and accordingly, the lookahead vector 2510 may remain at its full default length.

Figure 27B:
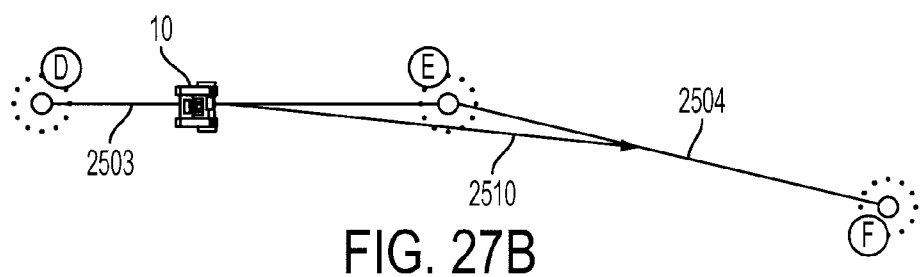

In FIG. 27B, the mobile robot 10 has moved farther along the path to a section where it angles slightly at waypoint E between the third line segment 2503 and fourth line segment 2504. Because the mobile robot 10 will attempt to drive toward the end of the lookahead vector 2510, the appropriate approximation of the mobile robot's path is the vector extending from the mobile robot 10 to the end of the lookahead vector 2510.

To ascertain whether the mobile robot's route will lie within the permitted distance from a waypoint, the retro traverse behavior checks whether the perpendicular distance from a waypoint to is less than the maximum permitted distance (which may be a predetermined, constant value—such as one meter, for example). The mobile robot 10 repeats this check for every waypoint disposed orthogonally to the lookahead vector (i.e., waypoints for which there exists an orthogonal projection onto the lookahead vector). Alternatively, the mobile robot 10 may repeat the distance check for every waypoint that is associated with any of the retro traversal path line segments intersected by the lookahead vector 2510, to simplify the calculation of whether a waypoint "lies along" the lookahead vector 2510. In the example shown in FIG. 46B, the distance is within the permitted range; therefore, the lookahead vector 2510 extends to its full length.

Figure 27C:
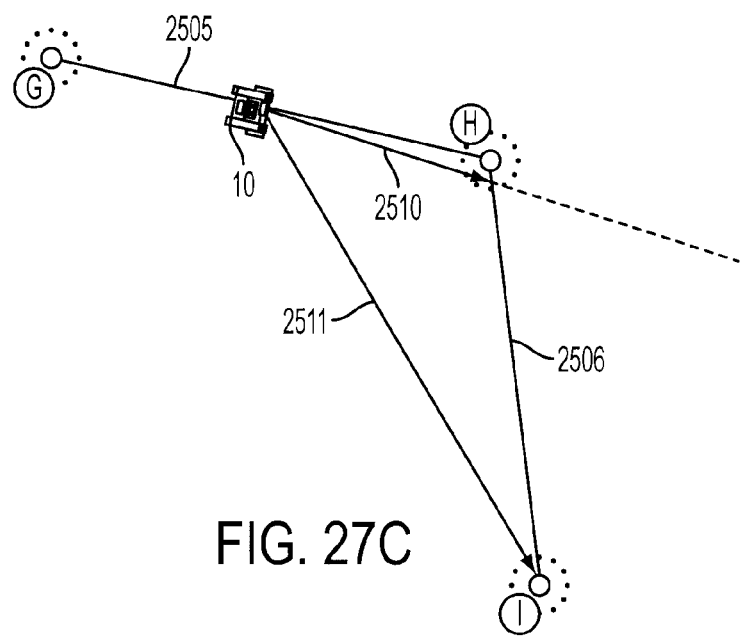

FIG. 27C shows a similar situation; however, the full-length lookahead vector 2510 does not lead to a path that is within the permitted distance of one of the waypoints (waypoint I) that projects orthogonally onto the lookahead vector 2510. The mobile robot 10 therefore sets the end of the lookahead vector 2510 (which will be used in the subsequent cycle) to be the mean of the current end point and the end point of the previous lookahead vector 2511 used in the preceding cycle of the behavior. The retro traverse behavior running on the mobile robot 10 will continue to decrement the length of the lookahead vector 2510 for several iterations in a similar manner until it either finds an acceptable end point or performs a maximum threshold number of iterations without success. Because the end point of the lookahead vector 2510 should always be on a line segment in the intended path, the mean of the old and new end points are preferably calculated in terms of the respective path lengths of the two and then transformed into x-y coordinates, rather than averaging the x-y coordinates of the two points.

Figure 27D:
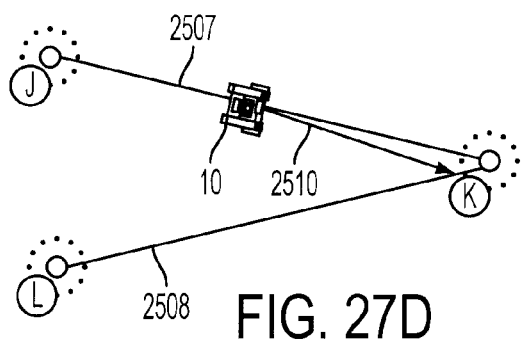

FIG. 27D illustrates a situation with a sharp angle between the seventh and eighth line segments 2507, 2508. The waypoint K does not project orthogonally onto the lookahead vector 2510 shown in FIG. 27D. Accordingly, the retro traverse behavior preferably ensures that the closest point is actually within, to obviate this situation.

Figure 28:
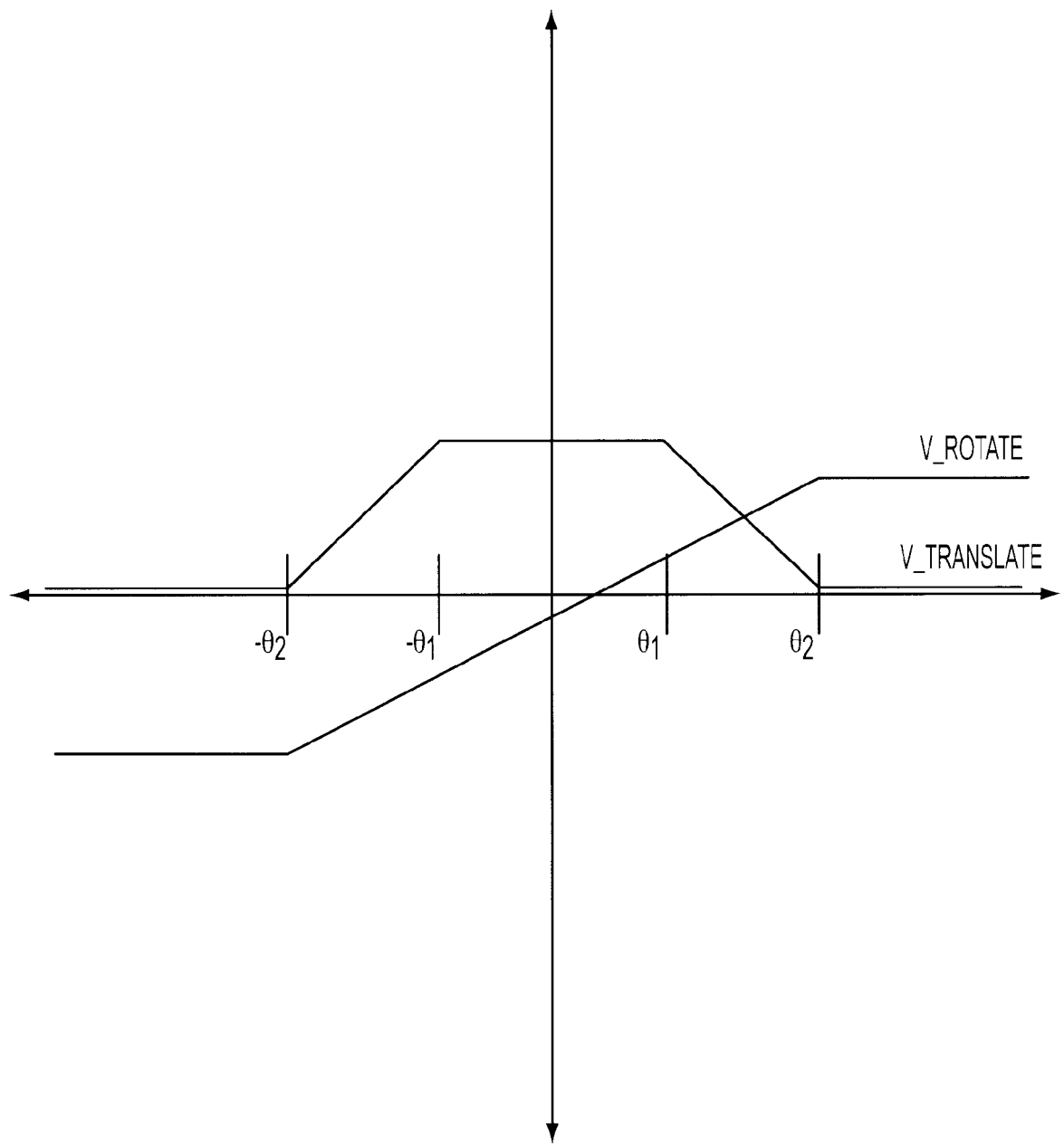
FIG. 28 illustrates a retro traverse behavior.

FIG. 28 illustrates an embodiment of a relationship between two output values, v_rotate and v_translate, that may be issued by the retro traverse behavior. The translational (v_translate) and rotational speeds (v_rotate) are calculated based on the angle by which the mobile robot 10 needs to turn to be heading toward the end of the lookahead vector. The rotational speed may be determined as a PID loop on the function v_rotate shown in FIG. 28, for example. The function characteristics may be adjusted to ensure the mobile robot 10 does not overshoot waypoints.

In various embodiments of the present teachings, the remote vehicle can operate in three different modes: "always drive forward;" "always drive backward;" or "drive in which ever direction requires the least rotation."

For "always drive forward," the speeds are calculated based on the angle between the mobile robot's heading and the direction to the end of the lookahead vector. For "always drive backward," they are based on $\theta_2$, and the translational speed is multiplied by $-1$. For "driving the direction of least rotation," when $\theta$ in between $\theta_1$ and $\theta_2$ then the mobile robot 10 drives forward; otherwise, it drives backwards.

In accordance with various embodiments, upon detecting degraded communications by examining the signal strength of a connection between the OCS and the remote vehicle and/or examining properties of the data flow between the remote vehicle and the OCU, such as percentage of dropped packets for one or more communication streams (e.g., video, telemetry, etc.), the remote vehicle can initiate a retro traverse behavior. Retro traverse can be used to return the remote vehicle to a place where communications are restored, or it can be used to return the remote vehicle to where it started.

Retro traverse can be implemented in the following exemplary manners:

- the remote vehicle tracks odometry and determines position based on the odometry;
- the remote vehicle tracks odometry and compass heading (an, in some instances attitude) and determines position based on the odometry and compass heading, using a Kalman filter to integrate odometry from the track and compass heading to keep track of the remote vehicle's position and orientation;
- the remote vehicle maintains a global map and place the coordinates within a global map;
- the remote vehicle maintains a far off destination point within a global map and adjust its heading to move towards that point;
- the remote vehicle uses some sort of navigation point (i.e. GPS, inertial measurement, or other satellite or landmark easily detected from most points within the environment); or
- the remote vehicle communicates with navigation beacon points (signal repeaters, etc.) and use those to determine position within the environment.

Alternative methods of implementing retro traverse include following a reduction in chemical scent or a chemical scent, and following a trail left by the robot such as a fiber optic cable, a line of spray paint, setting a destination point in a global map and traveling towards that destination point.

Two alternative methods of implementing retro traverse include collecting odometric data and using it to calculate the return path and GPS waypoint collection.

Waypoint indication is only possible when a suitable input device is available. If the system detects a suitable input device, such as, for example, a mouse or a touch screen, the user will be able to indicate a waypoint on the OCU display and the system will provide the necessary commands to enable the remote vehicle to drive autonomously to the waypoint. The user can input a new waypoint and it will override the old waypoint. In accordance with certain embodiments, teleoperation commands also override such supervisory control. In accordance with certain embodiments where no suitable input device is detected, the vehicle can be capable of autonomously driving forward until commanded to stop or until a communication limit or maximum distance parameter is reached.

In one exemplary implementation of a remote vehicle utilizing autonomous behaviors, GPS, an IMU, and a navigation CPU are added to a man transportable robotic system, (MTRS) PackBot EOD robot to implement GPS-based retro traverse re-traverse and leader/follower behaviors. GPS receivers are typically capable of determining the robot's position accurately to within approximately 2-4 meters. IMU typically can determine the orientation of the robot and has a drift rate of less than 1 degree per minute. The navigation CPU may be part of a navigation payload such as an iRobot Navigator Payload that can include additional computational and sensor hardware to perform semi-autonomous behaviors such as GPS retro traverse. The Navigator Payload attaches to two of the modular payload bays of a PackBot EOD in a plug-and-play fashion. The Navigator Payload typically comprises an Intel Core Duo 1.2 GHz processor, 1 GB of RAM, and an 8 GB solid-state flash memory hard drive. This CPU is used to run perception and autonomy software. In addition, each payload includes a Ublox Antaris 4 GPS receiver and a Microstrain 3DM-GX1 six-axis MEMS IMU. GPS receivers are typically capable of determining the robot's position accurately to within approximately 2-4 meters. IMU typically can determine the orientation of the robot and has a drift rate of less than 1 degree per minute.

The IMU determines the robot's rotation relative to Earth's gravitational field. An Unscented Kalman Filter (UKF) filters the accelerometer and angular rate information from the three-axis IMU to determine the direction of Earth's gravitational field relative to the robot. The UKF is an extension of the Kalman Filter to non-linear systems.

The original Kalman Filter is a provably optimal technique for state estimation in the face of uncertainty for linear systems with Gaussian error distributions. It works by tracking the uncertainty of the system and updating both state and uncertainty using linear algebra. The UKF extends the filter to non-linear system by using the Unscented Transform to approximate the result of state propagation through a non-linear system by a Gaussian. The UKF produces superior results to older linearization techniques such as the Extended Kalman Filter.

The angular rate from the IMU around Earth's gravitational field is then used to estimate of the robot's rotation. Track odometry from the robot is used as a coarse measure of the robot's translation. By this method, a good estimate of the robot's motion.

The estimated motion, GPS data, and magnetometer data can then be combined using a particle filter. A particle filter is a general state estimation technique that works for non-linear systems and non-Gaussian error models and state distributions. A particle filter works by generating a number of particles, each of which is an exact hypothesis about the state of the system. The distribution of particles mirrors the probably distribution over possible system states with more particles near likely states. The particles are updated for motion and sensor input as the system evolves. The particle filter produces the final estimate of the robot's pose (both location and orientation) along with error estimates.

Certain embodiments of the GPS-based leader/follower behavior assume that the leader (a person or a vehicle) is equipped with a GPS receiver, and continuously transmits its latitude-longitude position to the robot. The robot will automatically home-in on the leader's current positioning using its own GPS-based localization system. The robot will maintain a specified following distance from the leader.

When GPS is not employed or available, retro traverse and re-traverse can be implemented with a stereo vision camera (e.g., a Tyzx G2 stereo vision camera) or the robot's attack and driver cameras. Integrate a Tyzx G2 stereo vision system with the robot. The G2 provides 500×312 high-resolution 3D range data at 30 frames per second with a maximum range of 50 meters and with a range accuracy of 0-3% over a range of 0-5 meters. Error increases beyond 5 meters up to 222.4 cm at 20 meters.

The Tyzx G2 communicates with the Navigator Payload over Ethernet. The Tyzx stereo cameras can be mounted in an enclosure custom-designed for use with the MTRS EOD.

GPS-denied retrotraverse and re-traverse behaviors function substantially identically to the behaviors developed for GPS-based retrotraverse and re-traverse, but use odometry combined with the IMU orientation estimate to determine the robot's position.

Stereo vision-based obstacle avoidance behavior can detect obstacles in the 3D range image. Obstacles can be limited to those that the remote vehicle is unable to climb over or pass under. The obstacles can be stored as points in a remote vehicle-centered local perceptual space (LPS). The LPS can store the locations of recently-seen obstacles, and these points can decay over time.

Self-Righting

A self-righting behavior can also be persistent, in a sense that it may constantly be running in the background to right the robot if it is up-ended. Robots traveling over very rough terrain or through opposing fire can end up flipped on their sides or even upside down. Self-righting behavior allows the remote vehicle to turn itself back over and onto its tracks so it can continue with its mission objective or return back to the operator, as desired. When self righting, the robot senses its orientation, for example using tilt sensors, and determines a strategy for turning itself upright. The robot will perform a progression of arm and flipper motions until it has levered itself back onto its tracks. Damage to the manipulator arm must be prevented while the remote vehicle is upside down and righting itself.

Self righting has two modes. In the first mode, it will be autonomously initiated when the robot detects that it has flipped upside down. In the second mode, the operator explicitly commands the robot to start or stop self righting. The advantage of enabling persistent autonomous self righting is that should communications be degraded, for example because the antennae are beneath the unit to the point where the operator cannot directly command it, the robot can rescue itself without explicit direction, and without the need for hands-on human intervention.

Cruise Control

A cruise control behavior can receive information from the OCU regarding an intended constant speed and heading for the mobile robot 10. In certain embodiments of the present teachings, the information sent from the OCU can include an acceleration value and a rotational velocity, both of which can be used by the mobile robot 10 to determine a drive velocity and heading. The cruise control behavior can allow the operator to drive the robot 10 for a distance without necessary intervention by the operator. In certain embodiments of the present teachings, the operator uses a left and right joystick or puck of the OCU to control the robot's movement. For example, the left joystick or puck can be dedicated to the cruise control behavior such that when the left joystick or puck is actuated, the cruise control behavior commences, and when the right joystick or puck is actuated, the cruise control behavior halts. Alternatively, the cruise control behavior could commence following the actuation of a button or other actuator of the control system. Alternatively, a third joystick or puck may be included in the control system that is dedicated to cruise control.

Figure 29:
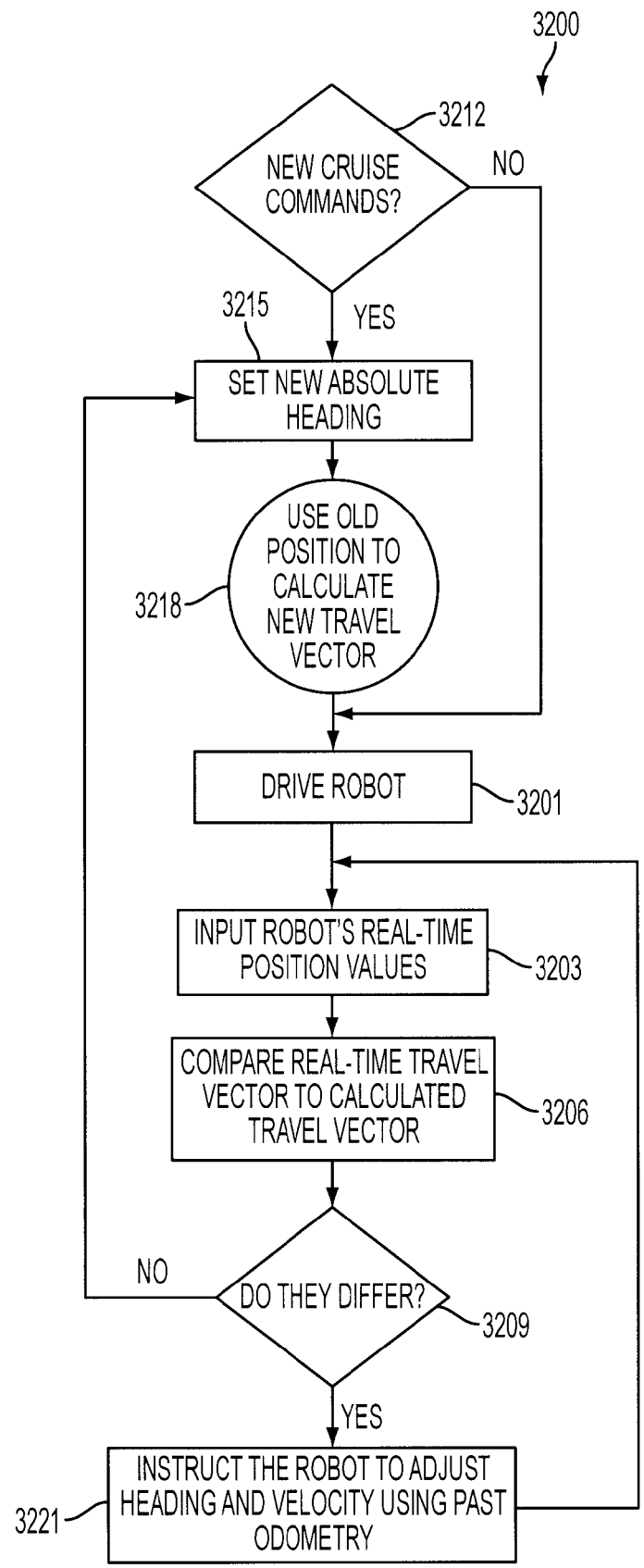
FIG. 29 illustrates an embodiment of a cruise control routine included within a cruise control behavior.

FIG. 29 illustrates an exemplary embodiment of a cruise control routine 3200 included within a cruise control behavior. When in control of its corresponding actuators, the cruise control behavior executes the cruise control routine 3200, which commences by scanning for a new set of cruise commands 3212 from the operator. Should the routine sense a new set of cruise commands, the routine inputs the commands as an absolute heading 3215.

In certain embodiments of the present teachings, to eliminate the possibility of discrepancies caused by a time lag between when the robot's cameras record video information and the time that such information is displayed to the operator, the robot calculates its new heading and velocity upon receiving the absolute heading and velocity, using the absolute heading and velocity and the positional and velocity values at the time the robot's camera detected the image, rather than the current real-time positional and velocity values. Upon calculating the new travel velocity and heading, the robot 10 uses real-time positional and velocity values to calculate a new travel vector 3218.

Once a travel vector is calculated 3218, the robot will then drive at the specified velocity using the specified heading 3201. While driving, the cruise routine gathers real-time positional and velocity values from the sensors 3203 and compares these values to the chosen travel vector 3206. Should there be a significant difference between the current travel vector and the chosen travel vector, the routine will instruct the robot 10 to adjust its heading and velocity 3221 using past odometry values. Otherwise, if there is little difference between the current travel vector and the chosen travel vector, the routine will instruct the robot 10 to continue driving 3201.

In certain embodiments of the present teachings, a single camera is used with a compass to perform automatic heading control.

Figure 30A:
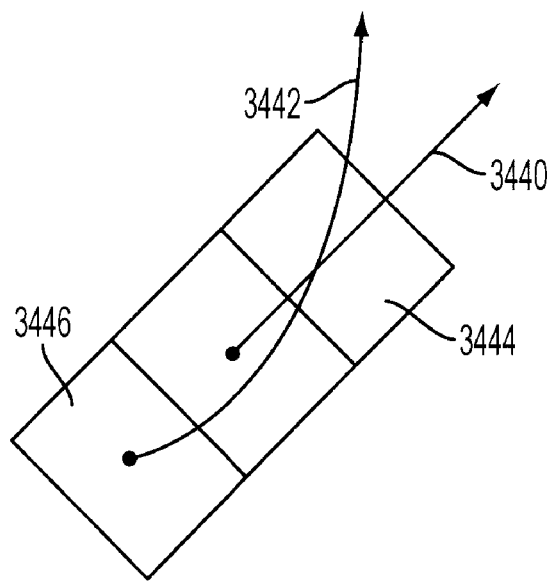
FIGS. 30A and 30B illustrate an embodiment of a cruise control behavior.
Figure 30B:
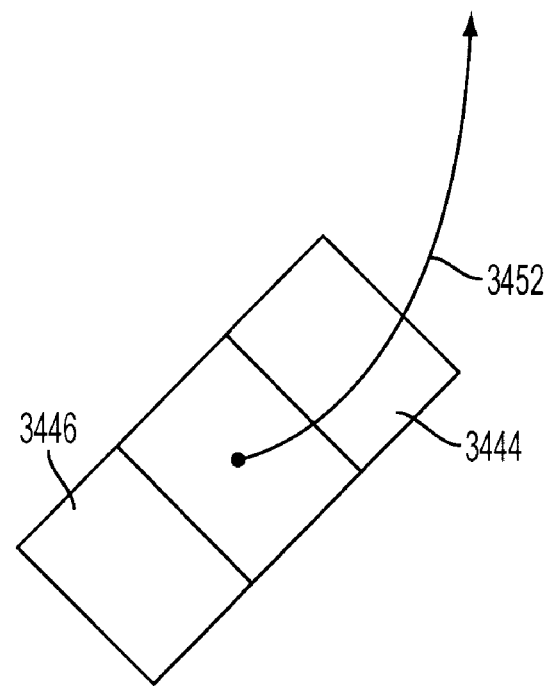

Further illustrative of an exemplary embodiment of cruise control, FIGS. 30A and 30B display a robot 3444 that responds to new heading commands to change direction. The robot 3444 moves forward in a particular direction 3440. Once the operator retrieves video feedback of the robot's position, the robot's position has changed from its position at the time the video information was captured 3446 to its current position 3444. Thus, the robot has continued along its current path 3440 during the time between when the robot collects video information of its position at that time 3446 and the time when the robot receives new heading commands from the operator. When the operator sends the heading information to the robot 10, the heading information 3442 is relative to the robot's previous position 3446. FIG. 30B shows how the robot uses the heading 3442 generated in relation to the robot's previous position 3446 to determine a new heading 3452 calculated in relation to the robot's current position 3444.

Figure 31:
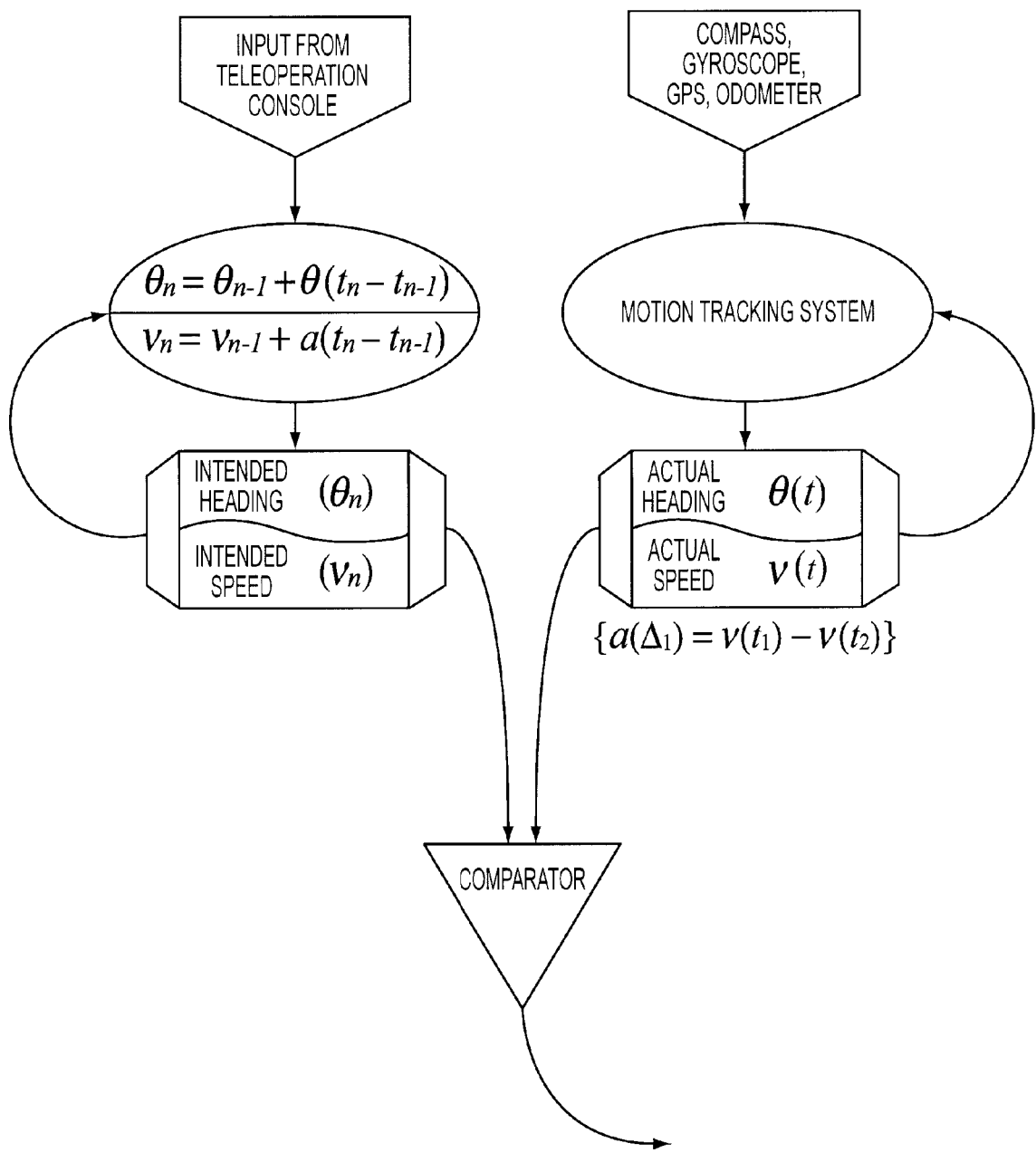
FIG. 31 illustrates an embodiment of a flow of information in a cruise control behavior.

FIG. 31 illustrates an exemplary embodiment of a flow of information in the cruise control behavior. Input from the control system is received and processed to produce an updated current intended heading and speed $\theta_n$, $v_n$. In the equations displayed, $\theta_{n-1}$ is the intended heading of the preceding cycle, $t_n$ is the time of the current cycle, $t_{n-1}$ is the time of the preceding cycle, $\theta (t_n - t_{n-1})$ is the angular difference between the heading of the current cycle and the heading of the preceding cycle, $v_{n-1}$ is the intended speed of the preceding cycle, and $(v_n - v_{n-1})$ is the difference between the speed of the current cycle and the speed of the preceding cycle.

Simultaneously, input from position reckoning systems (such as a compass, IMU, or GPS) are fed to a motion tracking system, which updates the reckoned actual heading and speed. The reckoned actual heading and speed of the mobile robot 10, as well as the updated intended heading and speed, are passed to a comparator, which generates an appropriate output (such as turn rate and drive motor current) to control the drive system.

Figure 32:
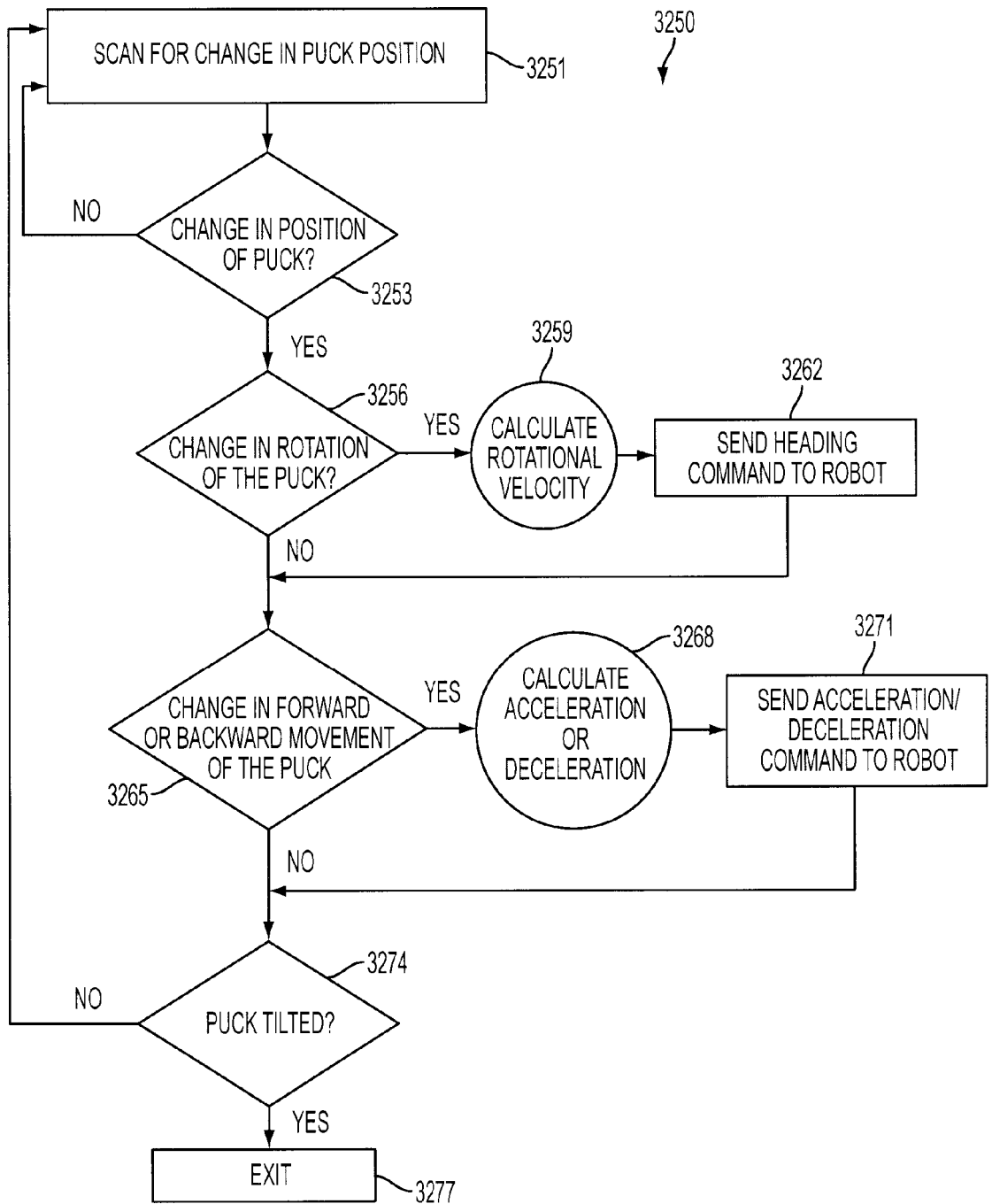
FIG. 32 illustrates an embodiment of a routine to generate cruise control commands.

FIG. 32 illustrates an exemplary embodiment of a routine carried out by the control system (using, e.g., a puck for cruise control activation) to generate cruise control commands. The routine scans a puck designated for activating and controlling the cruise control behavior 3251. Upon detecting a change in the position of the puck 3253, the routine determines whether the change included a rotation of the puck about a vertical axis 3256. If not, the routine will continue to scan the puck's position. If the change included a rotation of the puck about a vertical axis 3256, the routine calculates a rotational velocity proportional to the rotation of the puck and indicative of the direction the puck was rotated 3259, and the control system sends the new drive heading to the robot 10, where the heading is relayed to the cruise control behavior.

The routine then determines whether or not the puck was translated about a horizontal axis 3265. If this has occurred, the routine calculates an acceleration/deceleration command 3268 representative of the puck's movement, and the control system sends the acceleration/deceleration command 3271 to the robot 10 where the acceleration/deceleration command is relayed to the cruise control behavior. In the illustrated embodiment, if the routine detects a tilting of the puck 3274, the routine exits 3277 because such a movement of the puck indicates flipper movement which is controlled by a behavior other than the cruise control-activation of another behavior causes cruise control to halt. If the routine does not detect a tilting of the puck 3274, the routine continues to scan the puck's position 3251.

Figure 33:
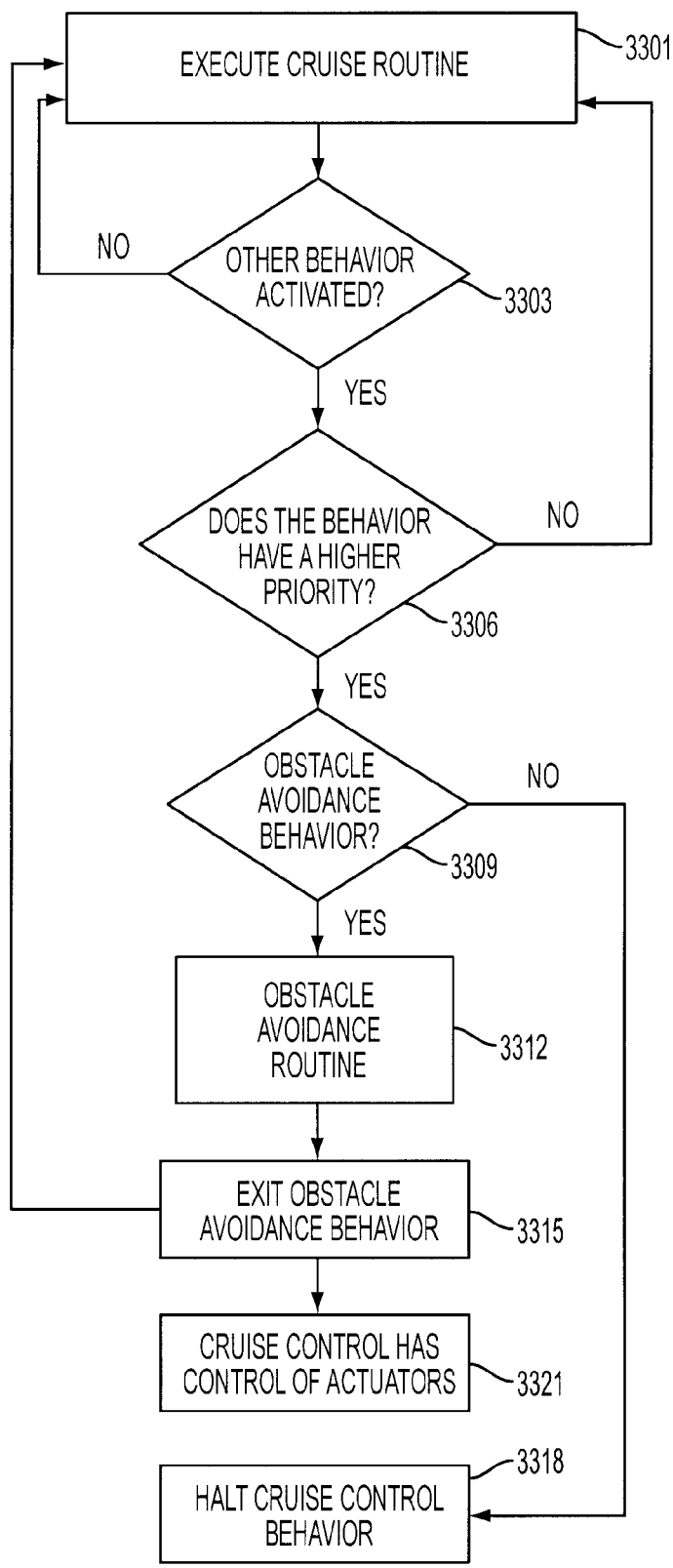
FIG. 33 illustrates an embodiment of an interaction between a cruise control behavior and other behaviors.

FIG. 33 illustrates an exemplary embodiment of the interaction between the cruise control behavior and other behaviors that could be installed on the robot's single board computer. When the cruise control behavior has control of the robot's actuators, it executes its cruise routine 3301. However, if a coordinator indicates that another behavior has been activated 3303 and that behavior has a higher priority 3306 than the cruise control behavior, the cruise control behavior is halted and the cruise routine exited 3318. Otherwise, if the coordinator does not indicate that another behavior has been activated 3303, or if a behavior has been activated but that behavior does not have a priority 3306 greater than the cruise control behavior, the cruise control routine will continue to execute 3301. In certain embodiments of the present teachings, when a behavior with a higher priority than cruise control is activated, the coordinator checks whether this behavior is the obstacle avoidance behavior 3309, and if true, allows the obstacle avoidance behavior to have control of the actuators without halting the cruise control behavior. Otherwise, if the obstacle avoidance behavior is not identified and the behavior has a higher priority than the cruise control behavior, the cruise control behavior will exit the cruise routine and halt 3318.

Should the obstacle avoidance behavior gain control of the actuators, an obstacle avoidable routine is executed 3312 by the obstacle avoidance behavior. Once the obstacle avoidance behavior is executed and exited, cruise control may regain control of the actuators 3321. Once in control of the actuators, the cruise control will pick up where it left off and begin executing the cruise control routine 3301. Within the cruise routine 3200 (see FIG. 29), a check is made of the robot's real-time travel vector 3203. Since the obstacle avoidance routine caused the robot to veer away from the chosen travel vector, the cruise control routine will detect the change in travel vector and correct the robot's heading and velocity 3221 using past odometry values so that the robot returns to the chosen travel vector.

An exemplary embodiment of the interaction between the cruise control behavior and the obstacle avoidance behavior is illustrated in FIGS. 34A-34D. Obstacle avoidance can be a persistent behavior, but is discussed here based on its interactions with cruise control. FIG. 34A shows the robot's 3458 movement along the chosen travel vector 3456 dictated by the cruise control behavior, where the vector 3456 points the robot toward an obstacle 3454. FIG. 34B illustrates the robot's response to the obstacle 3454 by commanding the robot to drive to a position 3460 not included within the chosen travel vector, which is the result of an avoidance travel vector 3462 instituted by the obstacle avoidance behavior to cause the robot 10 to avoid the obstacle 3454.

Once the obstacle 3454 is avoided, the cruise control behavior re-assumes control of the actuators and, as shown in FIG. 34C, begins to adjust the robot's direction of travel so that the robot returns to a path included within the chosen travel vector 3456. To do this, the cruise control behavior alters the robot's heading so that the robot drives along a path included within a translational vector 3462 calculated to cause the robot 3460 to return to the chosen travel vector 3456. FIG. 34D displays the final effect of the translational vector 3462. The robot 3458 moves from a path included within the avoidance travel vector 3462 to a path within the chosen travel vector 3456.

Figure 35:
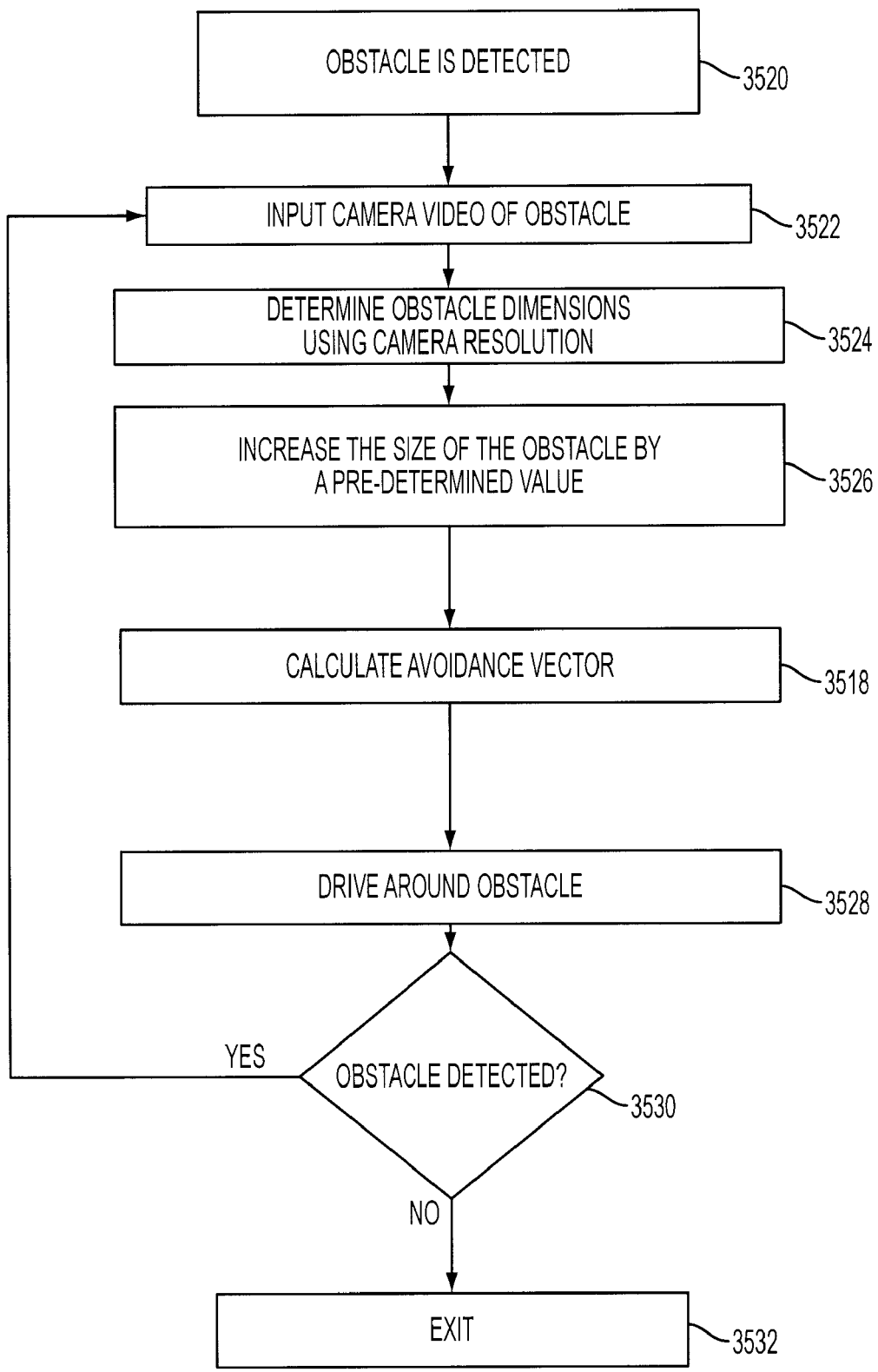
FIG. 35 illustrates an embodiment of an obstacle avoidance routine for an obstacle avoidance behavior.

The obstacle avoidance behavior can include an embodiment of an obstacle avoidance routine as illustrated in FIG. 35. Once an obstacle is detected 3520 and the obstacle avoidance behavior regains control of the actuators, the obstacle avoidance routine begins to execute. The routine first inputs camera video output of the obstacle detected 3522 and uses the camera's resolution to determine the dimensions of the obstacle. To ensure proper clearance, the routine can bloat the obstacle by a pre-determined value so that an avoidance vector can be calculated 3518. The avoidance vector allows the robot 10 to drive along a path that avoids the obstacle 3528. As the robot 10 drives forward 3528, the routine continually checks for obstacles 3530. If an obstacle is detected, the robot 10 then inputs the video image of the obstacle 3522, determines its dimensions 3524, bloats the obstacle 3526 and calculates a new avoidance vector 3518. These steps occur until no obstacle is detected, at which point the obstacle avoidance routine is exited 3532 and the cruise control behavior regains control of the actuators.

In certain embodiments of the present teachings, the cruise control behavior assumes that the robot is moving at a velocity of 0 m/s, and considers the robot's position to be the normal position. Subsequent rotational velocities and accelerations/decelerations are an alteration of the robot's 0 m/s velocity and normal position. Alternatively, the cruise control behavior could include cruise routines that allow for acceleration and/or deceleration of a robot with a velocity other than 0 m/s. In such an embodiment, an additional actuator may be included in the control system so that the user can control activation of cruise control with an actuator separate from the puck.

Other possible features of the cruise control behavior include fail safe conditions that cause the cruise control behavior to halt. These conditions include: (1) actuating brakes included within the drive system; (2) actuating a button, switch, puck, or other input device not designated to control the cruise control behavior; (3) depressing a stop actuator included of the control system; (4) changing the drive mode; or (5) dropping communication between the control system and the robot 10. Additionally, there is a maximum speed at which the robot can go and the robot is configured not to drive at a speed higher than the maximum speed.

Certain embodiments of the present teachings can include setting a destination point and driving toward that point so that when a behavior like obstacle avoidance interrupts, the cruise control behavior can do one of calculating a path from the robot's current position back to the original cruise path and calculating a new path from the robot's current position to the destination point Certain embodiments of the present teachings can include tracking odometry and adjusting the robot's current path using a translational vector calculated from the odometry values so that when obstacle avoidance interrupts, the cruise control behavior calculates a translational vector from the past odometry values and applies the vector to the robot's current path—so that the robot will return to the cruise path.

Certain embodiments of the present teachings can include setting a start waypoint and end waypoint when a behavior like obstacle avoidance interrupts cruise, meaning that two waypoints are stored while the robot is still on the cruise control path and at the point in time when obstacle avoidance is initiated, the first waypoint being representative of the robot's position when obstacle avoidance interrupts an the second waypoint being representative of a point much farther down the path from the first waypoint (far enough that the point will exist at a position beyond the obstacle). After obstacle avoidance finishes, the cruise control behavior uses the two waypoints to calculate a path back to the original cruise control path.

In certain embodiments of the present teachings, the cruise control behavior can send an "operator attention required" alert to the operator. Alert conditions may include, for example: a hard bump to the manipulator arm, indicating contact with a solid object; repeated drifting off course, indicating uneven ground; tilt or roll approaching tip-over limits; increased motor torque indicating the presence of an obstruction; and/or time-out situations to prevent over-travel.

Various embodiments of the cruise control behavior include a cruise behavior that can be used while drive is in control, the user actuating a cruise control button of the control system. The cruise control behavior can also be activated such that the robot will cruise for a predetermined period of time, or a predetermined distance. Alternatively, the cruise control behavior could include a hybrid where such an action would happen unless the user instructs the normal cruise to take over indefinitely.

Obstacle Avoidance

In accordance with certain embodiments of the present teachings, ways of implementing an obstacle avoidance behavior can include the following. Path planning—the robot detects obstacles & bloats them, then calculates a path around the obstacle. Path planning may be carried out while the robot is traversing the path to ensure that the robot remains on the path. Continuous obstacle detection where there are obstacle detection sensors installed along the sides of the robot. The robot turns a predetermined angle and moves a predetermined distance in response to a forward obstacle detection. Once the forward sensor no longer detects the obstacle and if the side sensors detect the obstacle, obstacle detect moves forward until the side sensors no longer detect the obstacle.

In accordance with the present teachings, iRobot's Aware 2.0 behavior system can be employed, which uses a randomized, real-time search algorithm to select commands compatible with a set of active behaviors. The Action Selection Engine generates dynamically limited motion commands that include randomization to quickly search the feasible action space of the robot system. These commands are propagated forward in time by a dynamic model of the robot system. This generates expected, feasible outcomes for each feasible course of action over a short time horizon. Each behavior is then given an opportunity to score the outcome for feasible motion commands and then these scores are combined with a weighting policy (or other plug-in policies). The motion command associated with the best overall outcome is then sent to the servo control layer of the architecture. As an example, a waypoint following behavior such as retro traverse will score outcomes highly when they approach or represent progress towards the desired destination and an obstacle avoidance behavior will reduce scoring for any outcomes that result in a predicted collision. The blended preferences of the two behaviors allow the system to select actions that represent a tradeoff between following waypoints and avoiding obstacles and the result is smooth waypoint following with dynamic obstacle avoidance.

While the present invention has been disclosed in terms of preferred embodiments in order to facilitate better understanding of the invention, it should be appreciated that the invention can be embodied in various ways without departing from the principle of the invention. Therefore, the invention should be understood to include all possible embodiments which can be embodied without departing from the principle of the invention set out in the appended claims.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein.

It is noted that, as used in this specification and the appended claims, the singular forms "a," "an," and "the," include plural referents unless expressly and unequivocally limited to one referent. Thus, for example, reference to "a restraint device" includes two or more different restraint devices. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the display of the present disclosure without departing from the scope its teachings. Other embodiments of the disclosure will be apparent to those skilled in the art from consideration of the specification and practice of the teachings disclosed herein. It is intended that the specification and examples be considered as exemplary only.

What is claimed is:

1. A method for performing a retrotraverse behavior for a remote vehicle, the method comprising:
   determining, by a processor, whether the retrotraverse is active;
   if the retrotraverse behavior is active;
      erasing previously-used waypoints;
      determining a current position of the remote vehicle and a current time, and pre-pending the current position and the current time to a list of time stamped waypoints;
      generating additional waypoints and adding them to the list of time stamped waypoints;
      storing the list of time stamped waypoints;
      determining whether a control signal has been received from an operator control unit;
      if the control signal has not been received from the operator control unit;
         setting a retrotraverse start time to the current time;
         generating a return path interconnecting previously-traversed waypoints in reverse order of timestamps;
         navigating the remote vehicle along the return path until the control signal is received from the operator control unit; and
         setting a retrotraverse end time to the current time.

2. The method of claim 1, wherein the time stamped waypoints are separated by at least a minimum difference in time and distance.

3. The method of claim 1, further comprising maintaining a list of previously-performed retrotraverses by recording a list of start time and end time pairs for each retrotraverse period of time.

4. The method of claim 3, further comprising excluding waypoints recorded during previously-performed retrotraverses from the return path.

5. The method of claim 4, further comprising excluding waypoints recorded during previously-performed retrotraverses by excluding waypoints recorded between the start time and end time pairs for each previously-performed retrotraverse.

6. The method of claim 3, further comprising excluding waypoints traversed during previously-performed retrotraverses from the return path.

7. The method of claim 1, further comprising determining the remote vehicle's position using odometry.

8. The method of claim 1, further comprising determining the remote vehicle's position using one or more of a global positioning system or navigation beacon points.

* * * * *